(12) United States Patent
Cannata

(10) Patent No.: US 12,442,398 B2
(45) Date of Patent: Oct. 14, 2025

(54) CYLINDER ON DEMAND HYDRAULIC DEVICE

(71) Applicant: TONAND INC., London (CA)

(72) Inventor: Antonio Cannata, London (CA)

(73) Assignee: TONAND INC., London (CA)

( * ) Notice: Subject to any disclaimer, the term of this patent is extended or adjusted under 35 U.S.C. 154(b) by 418 days.

(21) Appl. No.: 17/727,392

(22) Filed: Apr. 22, 2022

(65) Prior Publication Data

US 2022/0325729 A1 Oct. 13, 2022
US 2023/0228284 A9 Jul. 20, 2023

Related U.S. Application Data

(63) Continuation of application No. PCT/CA2020/051427, filed on Oct. 23, 2020, which is a continuation of application No. 16/663,967, filed on Oct. 25, 2019, now Pat. No. 11,118,611.

(51) Int. Cl.
| | |
|---|---|
| *F04B 1/06* | (2020.01) |
| *F04C 2/10* | (2006.01) |
| *F15B 15/14* | (2006.01) |
| *F15B 15/20* | (2006.01) |
| *F15B 1/26* | (2006.01) |
| *F15B 5/00* | (2006.01) |

(52) U.S. Cl.
CPC .............. *F15B 15/204* (2013.01); *F04B 1/06* (2013.01); *F04C 2/10* (2013.01); *F15B 15/1404* (2013.01); *F15B 15/149* (2013.01); *F15B 1/26* (2013.01); *F15B 5/003* (2013.01); *F15B 2211/422* (2013.01)

(58) Field of Classification Search
CPC .... F04B 13/02; F04B 1/26; F04B 1/34; F04B 1/06; F04B 49/14; F15B 1/26; F15B 15/204
USPC ......................................................... 417/270
See application file for complete search history.

(56) References Cited

U.S. PATENT DOCUMENTS

| | | | | |
|---|---|---|---|---|
| 1,263,401 A | * | 4/1918 | Fraser | F04B 5/02 92/6 R |
| 3,588,285 A | * | 6/1971 | Moon | F04B 49/08 417/206 |
| 3,995,973 A | * | 12/1976 | Ring | F04B 49/007 417/252 |
| 4,378,200 A | * | 3/1983 | Edwards | F16H 61/465 60/449 |
| 2011/0236225 A1 | * | 9/2011 | Leugemors | F04B 47/02 166/53 |

* cited by examiner

*Primary Examiner* — Philip E Stimpert

(57) ABSTRACT

A hydraulic device having: a plurality of main piston-cylinder arrangements, each of the respective pistons having a fixed stroke length and configured for axial reciprocation within their respective cylinder; a plurality of flow control valves for switching between a lockdown state and an unlocked state of one or more of the plurality of main piston cylinder arrangements during operation of the hydraulic device; and one or more control valves for directing the plurality of flow control valves between their respective unlock and lock positions.

16 Claims, 20 Drawing Sheets

CYLINDER ON DEMAND HYDRAULIC DEVICE

CROSS-REFERENCE TO RELATED APPLICATION

This application is continuation of International Patent Application no. PCT/CA2020/051427 filed Oct. 23, 2020 which claims priority to U.S. patent application Ser. No. 16/663,967 filed Oct. 25, 2019, the entirety of which is herein incorporated by reference.

FIELD

The present disclosure relates to hydraulic devices.

BACKGROUND

Hydraulic pumps and motors are used predominantly in industry when mechanical actuation is desired to convert hydraulic pressure and flow into torque and angular (rotation). Examples of hydraulic application can be in braking systems, propulsion systems (e.g. automotive, drilling) as well as in electrical energy generation systems (e.g. windmills). Other common uses of hydraulic devices as a direct drive system can be in drilling rigs, winches and crane drives, wheel motors for vehicles, cranes, and excavators, conveyor and feeder drives, mixer and agitator drives, roll mills, drum drives for digesters, kilns, trench cutters, high-powered lawn trimmers, and plastic injection machines. Further, hydraulic pumps, motors, can be combined into hydraulic drive systems, for example one or more hydraulic pumps coupled to one or more hydraulic motors constituting a hydraulic transmission.

Due to currently available configurations, there exists disadvantages with hydraulic devices when operated in systems exhibiting dynamic variation fluid flow requirements. For example, the torque requirements of a load in a hydraulic system can dynamically change, such that the hydraulic device must instantaneously react to the changing flow conditions dictated by the dynamic change in the torque.

In terms of current axial piston pump configurations, there exists mechanical complications in the design and use of variable angle rotating drive plates (i.e. wobble plate), in order to dynamically change the fluid flow in response to the changing torque conditions. As such, current axial piston pump designs tend to have higher than desired maintenance costs and issues, are considered operationally inefficient as compared to other reciprocating piston pump designs, and more importantly, current axial piston pumps and motors produce vibration/noise (e.g. Fluidborne noise and Structuralborne Noise). Considered by the industry as the two primary, potentially unsolvable and unwanted problems.

SUMMARY

It is an object of the present invention to provide a hydraulic device to obviate or mitigate at least some of the above presented disadvantages.

A first aspect provided is a variable flow hydraulic device having a plurality of cylinders for varying a flow of hydraulic fluid between a reservoir and a load, the device comprising: a housing having the plurality of cylinders with a plurality of corresponding pistons configured for axial reciprocation of a constant stroke length; an input port of the housing fluidly connected to each cylinder of the plurality of cylinders, the input port facilitating introduction of the hydraulic fluid into said each cylinder; an output port of the housing connected to said each cylinder, the output port facilitating the ejection of the hydraulic fluid from said each cylinder during the axial reciprocation, the output port configured for fluidly coupling said each cylinder to the load; a respective flow control valve for said each cylinder, said respective flow control valve for facilitating or inhibiting the axial reciprocation of the respective piston for said each cylinder depending upon a respective lock position or a respective unlock position of said respective flow control valve; and a respective fluid conduit coupled between the output port and each said respective flow control valve, the respective fluid conduits for supplying a pressure signal representing a fluid pressure of the output port to each said respective flow control valve for operating said respective flow control valve between the respective lock position and the respective unlock position; wherein when the pressure signal represents the fluid pressure as exceeding a specified maximum pressure threshold of the respective flow control valve, each said respective flow control valve is operated from the respective lock position to the respective unlock position in order to facilitate the axial reciprocation of the respective piston within the respective cylinder, such that each said respective flow control valve has a different one of the specified maximum pressure threshold.

A second aspect provided is a hydraulic device having: a plurality of main piston-cylinder arrangements, each of the respective pistons having a fixed stroke length and configured for axial reciprocation within their respective cylinder; a plurality of flow control valves for switching between a lockdown state and an unlocked state of one or more of the plurality of main piston cylinder arrangements during operation of the hydraulic device; one or more control valves for directing the plurality of flow control valves between their respective unlock and lock positions; wherein once operated, the one or more control valves switches an operational mode of the plurality of main piston cylinder arrangements from a variable displacement mode to a fixed displacement mode such that in the fixed displacement mode all of the respective pistons are reciprocating.

A further aspect is a variable flow hydraulic device having a plurality of cylinders for varying a flow of hydraulic fluid between a reservoir and a load, the device comprising: a housing having the plurality of cylinders with a plurality of corresponding pistons; an input port of the housing fluidly connected to each cylinder of the plurality of cylinders, the input port facilitating introduction of the hydraulic fluid to said each cylinder; a first output port of the housing connected to said each cylinder, the first output port facilitating the ejection of the hydraulic fluid from said each cylinder, the first output port configured for fluidly coupling said each cylinder to the load; a respective flow control valve for said each cylinder, said respective flow control valve positioned between at least one of a) the input port and said each cylinder and b) the first output port and said each cylinder, said respective flow control valve for facilitating or inhibiting the flow of the hydraulic fluid between the input port and the first output port for said each cylinder depending upon a respective open state or a respective closed state of said respective flow control valve; and a fluid pressure sensing device coupled between downstream of the first output port and said respective flow control valve, the fluid pressure sensing device for supplying a pressure signal generated from a fluid pressure of the first output port to said respective flow control valve for operating said respective flow control valve between the open state and the closed state; wherein when the pressure signal represents the fluid pressure as exceeding a specified maximum pressure threshold, said respective flow control valve is operated from the closed state to the open state in order to facilitate the flow of the hydraulic fluid between the input port and the first output port via said each cylinder, such that said each cylinder of the plurality of cylinders has a different one of the specified maximum pressure threshold.

A further aspect, wherein the input port is connected to a common input gallery of the housing, the common input gallery fluidly coupled to said each cylinder of the plurality of cylinders.

A further aspect, wherein the input port is connected to a common input gallery of the housing, the common input gallery fluidly coupled to said respective flow control valve of said each cylinder of the plurality of cylinders, such that said respective flow control valve is positioned between the input port and said each cylinder.

A further aspect, wherein the first output port is connected to a common output gallery of the housing, the common output gallery fluidly coupled to said each cylinder of the plurality of cylinders.

A further aspect, wherein the first output port is connected to a common output gallery of the housing, the common output gallery fluidly coupled to said respective flow control valve of said each cylinder of the plurality of cylinders, such that said respective flow control valve is positioned between the first output port and said each cylinder.

A further aspect, wherein the fluid pressure sensing device includes a pressure transducer for sensing the fluid pressure and generating an electronic signal as the pressure signal for use by said respective flow control valve to operate from the closed state to the open state.

A further aspect, wherein said respective flow control valve includes a solenoid operated by the electronic signal when received.

A further aspect further comprising said respective flow control valve having: a control cylinder having one end and a biasing element positioned at another end opposite the one end, the biasing element biasing a valve in the control cylinder towards the one end thereby placing said respective fluid control valve in the closed state; the valve configured for reciprocation within the control cylinder between the one end and the another end, such that presence of the electronic signal as indicative of the fluid pressure exceeding the specified maximum pressure threshold for said each cylinder causes the valve to act against said biasing in order to place said respective fluid control valve in the open state; and a port in a body of the valve, the port positioned in the control cylinder during the open state to facilitate the hydraulic fluid a) flowing from the input port to said each cylinder when said respective flow control valve is positioned between the input port and said each cylinder or b) flowing from said each cylinder to the output port when said respective flow control valve is positioned between the first output port and said each cylinder.

A further aspect, wherein the fluid pressure sensing device is a hydraulic fluid conduit for supplying a portion of the hydraulic fluid from the first output port to said respective flow control valve as the pressure signal for use by said respective flow control valve to operate from the closed state to the open state A further aspect further comprising said respective flow control valve having: a control cylinder hydraulically coupled at one end to the hydraulic fluid conduit and having a biasing element positioned at another end opposite the one end, the biasing element biasing a valve in the control cylinder towards the one end thereby placing said respective fluid control valve in the closed state; the valve configured for reciprocation within the control cylinder between the one end and the another end, such that presence of the portion of the hydraulic fluid at the one end as indicative of the fluid pressure exceeding the specified maximum pressure threshold for said each cylinder causes the valve to act against said biasing in order to place said respective fluid control valve in the open state; and a port in a body of the valve, the port positioned in the control cylinder during the open state to facilitate the hydraulic fluid a) flowing from the input port to said each cylinder when said respective flow control valve is positioned between the input port and said each cylinder or b) flowing from said each cylinder to the output port when said respective flow control valve is positioned between the first output port and said each cylinder.

A further aspect further comprising said respective flow control valve having a trigger device, the trigger device having: a trigger valve fluidly positioned between the one end and the hydraulic fluid conduit; a trigger input port of the trigger valve fluidly coupled to the hydraulic fluid conduit in order to receive the portion of the hydraulic fluid; a trigger output port of the trigger valve coupled to the one end in order to output the portion of the hydraulic fluid to the one end when the trigger device is in a trigger on state; the trigger valve biased by a trigger biasing element towards a trigger off state; wherein receipt of the portion of the hydraulic fluid by the trigger device as indicative of the fluid pressure exceeding the specified maximum pressure threshold for said each cylinder causes the trigger valve to act against the trigger biasing element in order to facilitate flow of the portion from the trigger input port to the one end via the trigger output port, the trigger device in the trigger on state.

A further aspect, the trigger device further comprising: the trigger valve being a trigger shuttle valve positioned for reciprocation in a trigger cylinder, the trigger shuttle valve having a trigger port in a trigger body; the trigger biasing element positioned at one end of the trigger shuttle valve opposite the trigger input port; the trigger biasing element sized according to the specified maximum pressure threshold for said each cylinder, such that a) when the portion of the hydraulic fluid is at the fluid pressure less than the specified maximum pressure threshold for said each cylinder, the trigger device is in the trigger off state as the trigger body blocks fluid communication of the portion between the trigger input port and the trigger output port or b) when the portion of the hydraulic fluid is at the fluid pressure exceeding the specified maximum pressure threshold for said each cylinder, the trigger device is in the trigger on state as the trigger body acts against the trigger biasing element in order to move the trigger port between the trigger input port and the trigger output port in order to facilitate fluid communication of the portion to the one end of the control cylinder.

A further aspect, wherein said each cylinder is provided as: a first cylinder, the first cylinder having a corresponding first flow control device and a corresponding first fluid pressure sensing device correlated to a first maximum pressure threshold, the first pressure sensing device for supplying a first pressure signal; a second cylinder, the second cylinder having a corresponding second flow control device and a corresponding second fluid pressure sensing device correlated to a second maximum pressure threshold, the second pressure sensing device for supplying a second pressure signal, the first maximum pressure threshold less than the second maximum pressure threshold; wherein when the fluid pressure reaches the first maximum pressure threshold while also being less than the second maximum pressure threshold, the first pressure signal causes the first flow control valve to be positioned in the open state while the second pressure signal causes the second flow control valve to remain in the closed state, whereby the flow of the hydraulic fluid from the input port to the first output port by the first cylinder is facilitated while the flow of the hydraulic fluid from the input port to the first output port by the second cylinder is inhibited.

A further aspect, wherein said each cylinder is provided as: a first cylinder, the first cylinder having a corresponding first flow control device and a corresponding first fluid pressure sensing device correlated to a first maximum pressure threshold, the first pressure sensing device for supplying a first pressure signal; a second cylinder, the second cylinder having a corresponding second flow control device and a corresponding second fluid pressure sensing device correlated to a second maximum pressure threshold, the second pressure sensing device for supplying a second pressure signal, the first maximum pressure threshold less than the second maximum pressure threshold; wherein when the fluid pressure surpasses the second maximum pressure threshold while, the first pressure signal maintains the first flow control valve as positioned in the open state while the second pressure signal causes the second flow control valve to be positioned from the closed state to the open state, whereby the flow of the hydraulic fluid from the input port to the first output port by the second cylinder joins a current flow of the hydraulic fluid from the input port to the first output port by the first cylinder.

A further aspect, wherein when the pressure signal represents the fluid pressure as exceeding a specified first maximum pressure threshold of a first cylinder of the plurality of cylinders but not a specified second maximum pressure threshold of a second cylinder of the plurality of cylinders, such that a first flow control valve of the first cylinder is operated from the closed state to the open state in order to facilitate the flow of the hydraulic fluid between the input port and the first output port via the first cylinder while a second flow control valve of the second cylinder remains in the closed state in order to inhibit the flow of the hydraulic fluid between the input port and the first output port via the second cylinder, the specified first maximum pressure threshold less than the specified second maximum pressure threshold.

A further aspect, wherein when the pressure signal represents the fluid pressure as exceeding a specified second maximum pressure threshold of a second cylinder of the plurality of cylinders after already exceeding a specified first maximum pressure threshold of a first cylinder of the plurality of cylinders, such that a second flow control valve of the second cylinder is operated from the closed state to the open state in order to facilitate the flow of the hydraulic fluid between the input port and the first output port via the second cylinder while a first flow control valve of the first cylinder remains in the open state in order to continue flow of the hydraulic fluid between the input port and the first output port via the first cylinder, the specified first maximum pressure threshold less than the specified second maximum pressure threshold.

A further aspect further comprising a second output port fluidly coupled to said each cylinder, wherein said respective flow control valve is positioned between a) the first output port and said each cylinder and b) the second output port and said each cylinder.

A further aspect, wherein when said respective flow control valve is in the closed state the pressure signal represents the fluid pressure as below the specified maximum pressure threshold, said respective flow control valve in the closed state facilitates the flow of the hydraulic fluid between the input port and the second output port via a said each cylinder, the second output port connected to a second common output gallery coupled to each of the plurality of cylinders, such that the flow of the hydraulic fluid in the second common output gallery bypasses the load by at least one of a) flowing to a fluid input of another cylinder of the plurality of cylinders and b) flowing via a fluid communication path coupled to the reservoir.

A further aspect, wherein the fluid communication path is coupled to a heat exchanger positioned between the second common output gallery and the reservoir.

A further aspect is a variable flow hydraulic device having a first cylinder and a second cylinder for varying a flow of hydraulic fluid from a reservoir to a load, the device comprising: a housing having the first cylinder and the second cylinder, the first cylinder and the second cylinder each having a corresponding piston for guiding the hydraulic fluid into and out of the respective cylinder; an input port of the housing fluidly connected to each of the first cylinder and the second cylinder, the input port facilitating introduction of the hydraulic fluid to the first cylinder and the second cylinder; a first common output port of the housing connected to the first cylinder and the second cylinder, the first common output port facilitating the ejection of the hydraulic fluid from the first cylinder and the second cylinder, the first common output port configured for fluidly coupling the first cylinder and the second cylinder to the load; a first flow control valve for the first cylinder, said first flow control valve positioned between at least one of a) the input port and the first cylinder and b) the first common output port and the first cylinder, the first flow control valve for facilitating or inhibiting the flow of the hydraulic fluid between the input port and the first common output port for the first cylinder depending upon an open state or a closed state of the first flow control valve, movement of the first flow control valve from the closed state to the open state dependent upon a fluid pressure of the common output port exceeding a first maximum pressure threshold; a second flow control valve for the second cylinder, said second flow control valve positioned between at least one of a) the input port and the second cylinder and b) the first common output port and the second cylinder, the second flow control valve for facilitating or inhibiting the flow of the hydraulic fluid between the input port and the first common output port for the second cylinder depending upon an open state or a closed state of the second flow control valve, movement of the second flow control valve from the closed state to the open state dependent upon the fluid pressure of the common output port exceeding a second maximum pressure threshold, the second maximum pressure threshold less that the first maximum pressure threshold; a first fluid pressure sensing device coupled between the first common output port and the first flow control valve, the first fluid pressure sensing device for supplying a first pressure signal generated from the fluid pressure to the first flow control valve for operating the first flow control valve between the open state and the closed state; a second fluid pressure sensing device coupled between the first common output port and the second flow control valve, the second fluid pressure sensing device for supplying a second pressure signal generated from the fluid pressure to the second flow control valve for operating the second flow control valve between the open state and the closed state; wherein when the first pressure signal represents the fluid pressure as exceeding the first maximum pressure threshold while the second pressure signal represents the fluid pressure as not exceeding the second maximum pressure threshold, the first flow control valve is operated from the closed state to the open state in order to facilitate the flow of the hydraulic fluid between the input port and the first common output port via the first cylinder and the second flow control valve remains in the closed state in order to inhibit the flow of the hydraulic fluid between the input port and the first common output port via the second cylinder.

A further aspect, wherein the device is a pump.

BRIEF DESCRIPTION OF THE DRAWINGS

The foregoing and other aspects will now be described by way of example only with reference to the attached drawings, in which.

DETAILED DESCRIPTION

Figure 1:
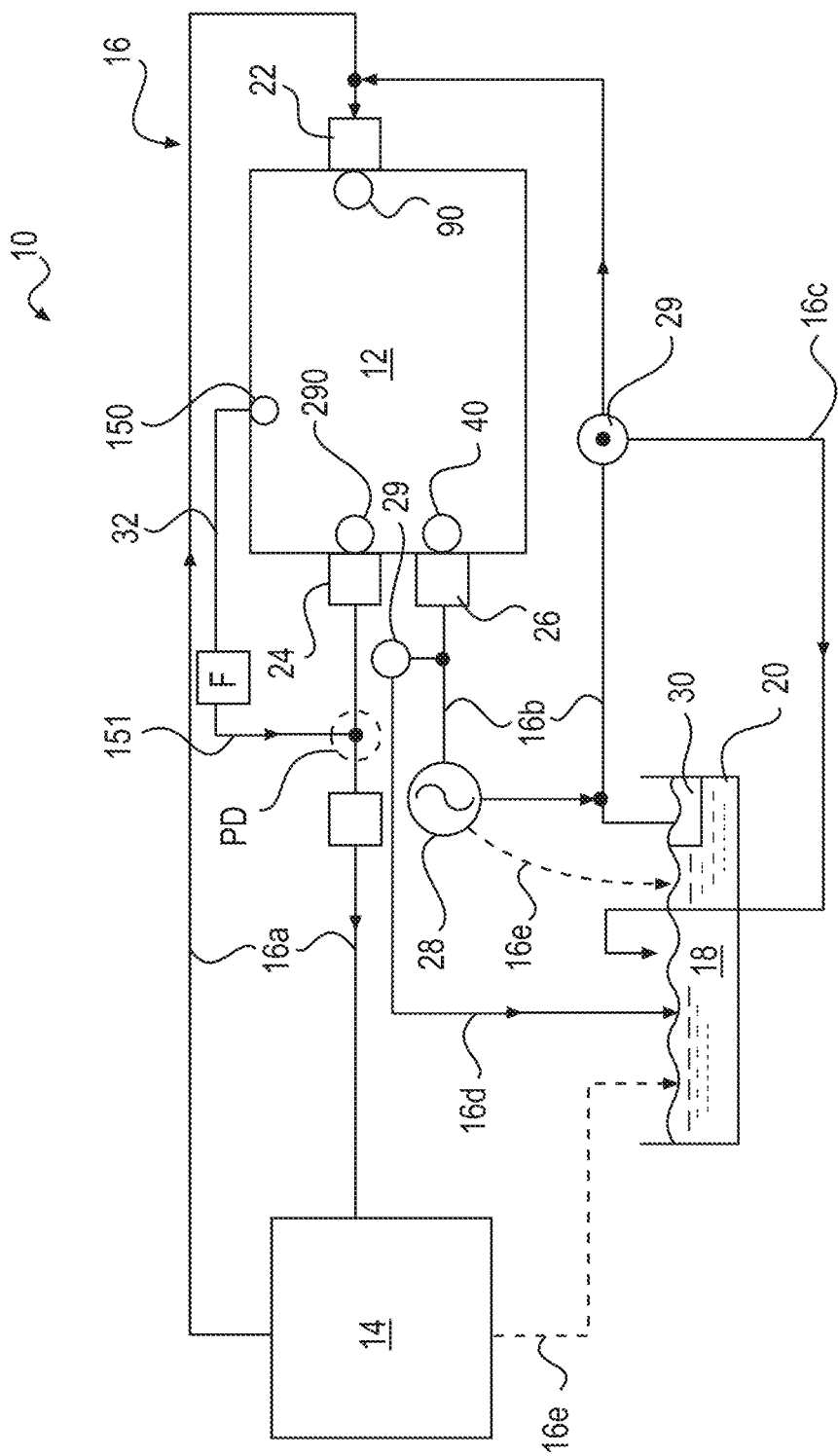
FIG. 1 refers to a schematic for a hydraulic system coupling a hydraulic device to a load.

Referring to FIG. 1, shown is a hydraulic system 10 having a hydraulic device 12 (e.g. pump) connected to a load 14 (e.g. a hydraulic motor) by a plurality of hydraulic fluid conduits 16. The hydraulic device 12 receives hydraulic fluid 18 from a reservoir 20 via input port 22. The hydraulic device has a plurality of cylinders 120 with corresponding pistons 110 (see FIG. 2) for receiving the hydraulic fluid from the input port 22 and outputting the hydraulic fluid via reciprocation of the pistons 110 within their respective cylinders 120. The output of the hydraulic fluid from the hydraulic device 10 can be via a first output port 24 and/or a second output port 26, as further described below. The reciprocation of the pistons 110 within their respective cylinders 120 can be driven by a cam 122 mounted on a crankshaft 123, see FIG. 2. It is recognized that the pistons 110 (see also MP of FIG. 13) have a fixed stroke length when reciprocating in their respective bores (i.e. cylinders 120). As such, a distance between a Top Dead Center TDC and Bottom Dead Center BDC (see FIG. 2) remains constant when flow control valves 36 are operated between a closed state and an open state. The position TDC can be defined as when the piston 110 reaches the end of the exhaust stroke for ejecting fluid out of the cylinder 120, and thus the beginning of the intake stroke for injecting fluid into the cylinder 120. The position BDC can be defined as when the piston 110 reaches the end of the intake stroke for injecting fluid into the cylinder 120, and thus the beginning of the exhaust stroke for ejecting fluid out of the cylinder 120. The configuration of the piston 110-cylinder 120 arrangements can be referred to as an axial configuration. It is recognized that other versions and features of the hydraulic device 12 can be as provided in the hydraulic device 12a (e.g. see FIGS. 13-20). It is recognized that other versions and features of the hydraulic device 12a can be as provided in the hydraulic device 12 (e.g. see FIGS. 1-12). For example, the main pistons can be referred to as MP or 110 interchangeably. For example, the main cylinders can be referred to as MC or 120 interchangeably. Further, for example, the hydraulic device 12a can also have triggers as described with reference to the hydraulic device 12 in combination with the flow control valves 36 (also referred to as flow control valve 36 in FIGS. 1-12).

Referring again to FIG. 1, the first output port 24 is fluidly coupled by the hydraulic fluid conduits 16 to the load 14, such that hydraulic fluid leaving the first output port 24 is used to hydraulically drive the load 14 (e.g. to drive reciprocation of pistons when the load is a hydraulic motor). Once the hydraulic fluid has done work with the load 14, the hydraulic fluid can return to the input port 22 as shown by example as a closed loop system. Alternatively, the hydraulic fluid could be returned from the load 14 to the reservoir 20, as shown in ghosted line 16e, i.e. as an open loop system. Further, the second output port 26 is connected by the hydraulic conduits 16 to the fluid reservoir 20, by way of a heat exchanger 28. It is recognized that the arrows associated with the hydraulic conduits 16 represent direction of fluid flow. Accordingly, any hydraulic fluid output by the hydraulic device 12 by way of the second output port 26 would be cooled via the heat exchanger 28 and then returned to the input port 22, for example via the fluid reservoir 20 as shown. It is recognized that the fluid reservoir 20 can employ a charge pump 30 (e.g. a gerotor pump or gear pump as desired) in order to supply the hydraulic device 12 with the hydraulic fluid 18 from the reservoir 20 as shown. It is also recognized that the charge pump 30 (e.g. a gerotor pump or gear pump as desired) can be coupled directly to the shaft (e.g. shaft 123) of the hydraulic device 12, e.g. internal to the housing 34, in order to supply the hydraulic device 12 with the hydraulic fluid 18 from the reservoir 20 as shown.

Accordingly, as shown in FIG. 1, any hydraulic fluid leaving the hydraulic device 12 can be through a work leg 16a (via output port 24) of the hydraulic fluid conduits 16 (e.g. via the load 14) or can be through a cooling (also referred to as bypass) leg 16b (via output port 26) of the hydraulic fluid conduits 16 (e.g. via the heat exchanger 28). The heat exchanger 28 can be connected directly between the secondary output port 26 and the input port 22, such that any fluid flowing through the heat exchanger 28 exits the hydraulic device 12 via the secondary output port 26 and flows directly back to the input port 22 via the bypass leg 16b as shown, i.e. in this case bypassing the load 14 as well as bypassing the reservoir 20. As further described below, the pressure relief valve 29 connected to the relief line 16c can be used when there is a considered oversupply of hydraulic fluid to the hydraulic device 12 (i.e. when the additive flows of fluid from both the heat exchanger 28—as exiting a common secondary output gallery 40, see FIG. 2—combine with the fluid flow from the charge pump 30 as obtained from the reservoir 20).

A fluid pressure sensing line 32, as further described below, is connected to the work leg 16a between the load 14 and the first output port 24, in order to provide sensing of the fluid pressure of the hydraulic fluid being supplied to the load 14 (via the first output port 24). As shown, the charge pump 30 supplies hydraulic fluid to the input port 22 of the hydraulic device 12, such that any excess pressure (e.g. pressure greater than a set pressure) of the hydraulic fluid in the hydraulic conduit 16b leading to the input port 22 can be released to the reservoir 20 by pressure relief valve 29 (configured by the set pressure) connected by relief hydraulic conduit 16c to the reservoir 20. Further, in the event that there is an excess of fluid pressure (e.g. pressure greater than a set pressure) in the cooling leg 16b between the secondary output port 26 and the heat exchanger 28, a further pressure relief valve 29 can be used to direct via relief conduit 16d the fluid (exiting the pressure relief valve 29) to the reservoir 20.

Figure 2:
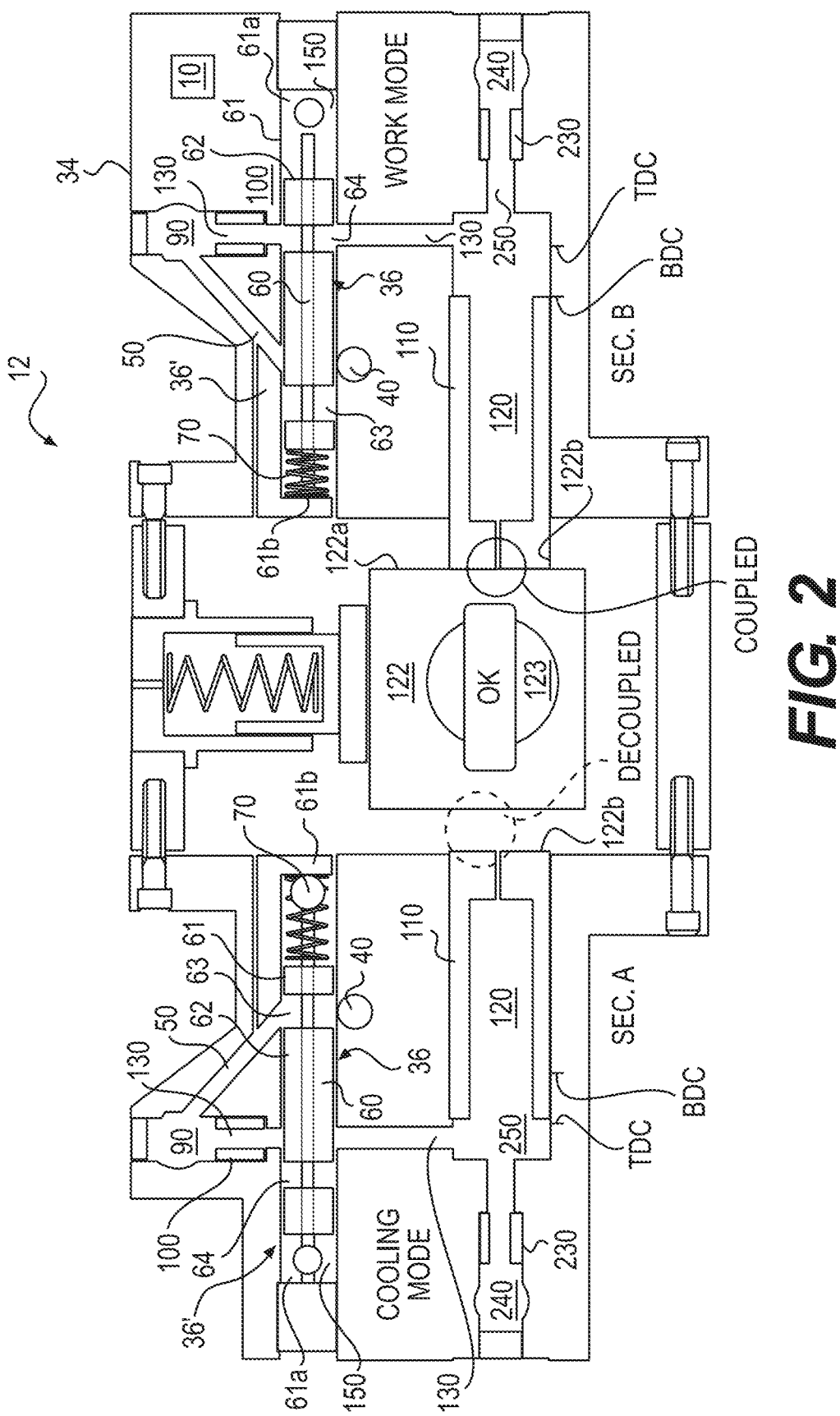
FIG. 2 is a first embodiment of the hydraulic device of FIG. 1 without trigger devices.

Referring to FIGS. 1 and 2, shown is one embodiment of the hydraulic device 12 having a plurality of cylinders 120 and corresponding pistons 110. For example, it is envisioned that the hydraulic device 12 can have any number of piston 110-cylinder 120 arrangements, e.g. 5, 7, 9, etc. However for illustration purposes only, a pair of piston 110-cylinder 120 arrangements is shown. The hydraulic device 12 (also referred to as device 12) has a housing 34 for containing the plurality of piston 110-cylinder 120 arrangements, as driven by the cam 122 having a cam surface 122a for driving a piston surface 122b of the pistons 110. As discussed above, reciprocation of the pistons 110 within their cylinders 120, when driven by the cam 122, will provide for entry of the hydraulic fluid via input passage 130 into the cylinder 120 (volume), and for exit of the hydraulic fluid via output passage 250 out of the cylinder 120 (volume).

Further, as by example, each of the output passages 250 is fluidly connected to a first output gallery 240 (e.g. by way of a check valve 230 in order to facilitate a one way flow of hydraulic fluid out of the output passages 250), which is fluidly connected to the first output port 24 (see FIG. 1). As such, each of the piston 110-cylinder 120 arrangements can output their hydraulic fluid to the first output gallery 240 common to all piston 110-cylinder 120 arrangements. Further, as by example, each of the input passages 130 is fluidly connected to an input gallery 90 (e.g. by way of a check valve 110 in order to facilitate a one way flow of hydraulic fluid into the input passages 130), which is fluidly connected to the input port 22 (see FIG. 1). As such, each of the piston 110-cylinder 120 arrangements can have their hydraulic fluid input from the input gallery 90 common to all piston 110-cylinder 120 arrangements. It is recognized that any fluid flowing through input passage 130 would be subsequently received by the cylinder 120. Similarly, it is recognized that any fluid flowing through the output passage 250 would be subsequently received by the common output gallery 240. Similarly, any fluid flowing in the bypass passage 50 would be subsequently received by the common second output gallery 40 (e.g. bypass gallery 40). Further, the common input gallery 90 can also be fluidly connected by respective bypass passages 50 to a bypass gallery 40 that is commonly associated with all of the piston 110-cylinder 120 arrangements.

A flow control valve 36 (for each piston 110-cylinder 120 arrangement) can be positioned between the common input gallery 90 (across bypass passage 50) and the common bypass gallery 40, and also between the common input gallery 90 (across input passage 130) and the cylinder 120. As further described below, depending upon the operational state of the flow control valve 36 (e.g. an open state or a closed state), the flow control valve 36 can 1) inhibit flow of the hydraulic fluid between common input gallery 90 and the first output gallery 240 (i.e. by way of the piston 110-cylinder 120 arrangement); allow flow of the hydraulic fluid between common input gallery 90 and the first output gallery 240 (i.e. by way of the piston 110-cylinder 120 arrangement); inhibit flow of the hydraulic fluid between common input gallery 90 and the second output gallery 40 (i.e. by way of the bypass passage 50); and allow flow of the hydraulic fluid between common input gallery 90 and the second output gallery 40 (i.e. by way of the bypass passage 50).

In FIG. 2, by example, the flow control valve 36 associated with the piston 110-cylinder 120 arrangement labelled SEC A would be considered in the closed state. The valve components 36' (described by example below) of the flow control valve 36 are blocking flow of the fluid between the common input gallery 90 and the cylinder 120 (e.g. blocking input passage 130), while allowing the flow of fluid between the common input gallery 90 and the common second output gallery 40 (e.g. via open bypass passage 50). Accordingly, as shown by example for the hydraulic device 12 embodiment of FIG. 2. During cyclic operation of the cam 122, the arrangement SEC A is configured by the closed state of its respective flow control valve 36 to send fluid from the common input gallery 90 directly to the common bypass gallery 40. Thus the arrangement SEC A does not send fluid out of the first output port 24 while the cam 122 rotates, rather any fluid input to the arrangement SEC A flows straight to the second common output gallery 40. As further described below, any fluid entering the common second output gallery 40 can be directed within the housing 34 (e.g. by passage 41) back to the common input gallery 90 (or directed by the passage 41 back to the input port 22), for use by other piston 110-cylinder 120 arrangements (e.g. arrangement SEC B). Alternatively, or in addition to, any fluid entering the common second output gallery 40 can be delivered to the second output port 26 for delivery to the heat exchanger 28 via the hydraulic fluid conduits of leg 16b.

In FIG. 2, by example, the flow control valve 36 associated with the piston 110-cylinder 120 arrangement labelled SEC B would be considered in the open state. The valve components 36' (described by example below) of the flow control valve 36 are allowing flow of the fluid between the common input gallery 90 and the cylinder 120 (e.g. via open input passage 130), while blocking the flow of fluid between the common input gallery 90 and the common second output gallery 40 (e.g. blocking bypass passage 50). Accordingly, as shown by example for the hydraulic device 12 embodiment of FIG. 2. During cyclic operation of the cam 122, the arrangement SEC B is configured by the open state of its respective flow control valve 36 to send fluid from the common input gallery 90 to the common first output gallery 240 by way the input passage 130 and output passage 250. Thus the arrangement SEC B does send fluid out of the first output port 24, while the cam 122 rotates, and thus powers or otherwise hydraulically drives the load 14. It is also recognized that the open state can be referred to as a first state and the closed state can be referred to as a second state. As such, the first state can refer to the flow control valve 36 as positioned to direct hydraulic fluid from the input gallery 90 to the first output gallery 240 and the second state can refer to the flow control valve 36 as positioned to direct hydraulic fluid from the input gallery 90 to the second output gallery 40, depending upon the configuration of the various fluid passages of the housing 34. Alternatively, the first state can refer to the flow control valve 36 as positioned to direct hydraulic fluid from the input gallery 90 to the second output gallery 40 and the second state can refer to the flow control valve 36 as positioned to direct hydraulic fluid from the input gallery 90 to the first output gallery 240, depending upon the configuration of the various fluid passages of the housing 34.

Thus, as described above, the hydraulic device 12 embodiment shown in FIG. 2 would have only one piston 110-cylinder 120 arrangement SEC B supplying the load 14 via the first output port 24 (i.e. the flow control valve 36 associated with the arrangement SEC B is in the open state). As discussed, the piston 110-cylinder 120 arrangement SEC A would be inhibited from supplying the first output port 24 by the respective flow control valve 36 (in the closed state) associated with the arrangement SEC A. In other words, the input passage 130 of arrangement SEC A is blocked from supplying fluid from the common input gallery 90 to the common first output gallery 240, while the input passage 130 of arrangement SEC B is allowed to supply fluid from the common input gallery 90 to the common first output gallery 240, thus configuring the hydraulic device 12 as having only one of a pair of piston 110-cylinder 120 arrangements (i.e. SEC A and SEC B) supplying output hydraulic fluid to the first output port 24 (which subsequently supplies the load 14 via the work leg 16a of the hydraulic fluid conduits 16). As shown in FIG. 2, the piston 110 of the arrangement SEC A is decoupled from the cam 122, i.e. piston surface 122b and cam surface 122a are out of contact with one another and as such the piston 110 of arrangement SEC A does not reciprocate within its cylinder 120.

Figure 3:
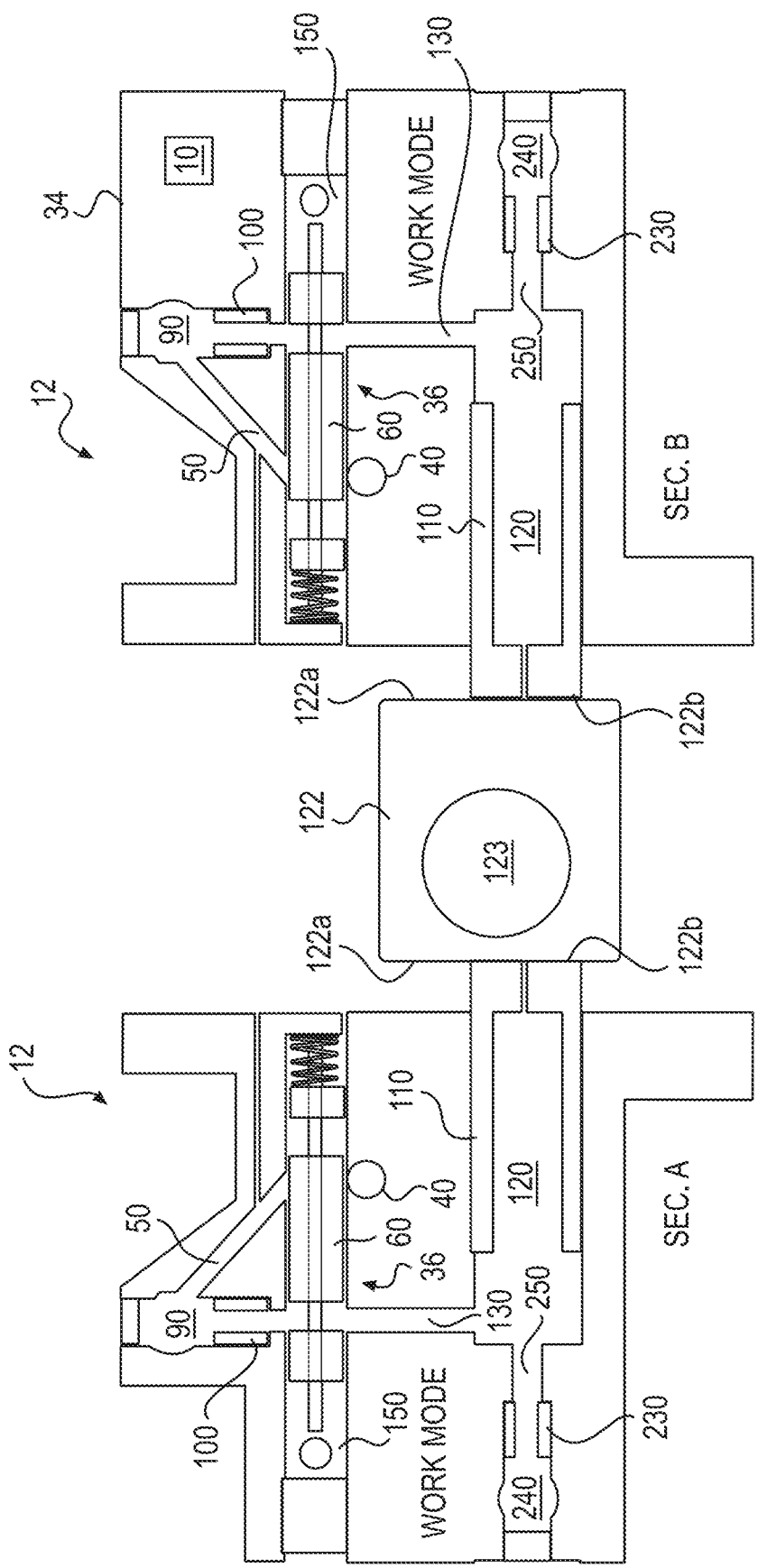
FIG. 3 is a view of the hydraulic device of FIG. 2 with both arrangements in an open mode.

Referring to FIG. 3, shown is a further operational mode of the hydraulic device of FIG. 2, such that both the arrangement SEC A and the arrangement SEC B are supplying hydraulic fluid to the first output port 24, in view of the flow control valve 36 of the arrangement SEC A is in the open state, as is the flow control valve 36 of the arrangement SEC B. Accordingly, it is recognized that in the operational mode of FIG. 3 provides double the flow of hydraulic fluid out of the first output port 24, as compared to the operational mode shown in FIG. 2.

In view of FIGS. 2 and 3, these can be used to describe two different case scenarios. The first case scenario is where the hydraulic device is operating at a reduced output mode (as shown by FIG. 2) and then the hydraulic device 12 gets a pressure signal P (via fluid pressure sensing line—see FIG. 1) that changes the state of the flow control valve 36 of arrangement SEC A from the closed state to the open state. Once that change of state occurs, then the hydraulic fluid would flow via input passage 130 of arrangement SEC A into the corresponding cylinder 120. Fluid filling the cylinder 120 of arrangement SEC A would push the corresponding piston 110 down onto the cam surface 122a of cam 122, in order for both the pistons 110 of the arrangements SEC A and SEC B to reciprocate as directed by the rotating cam 122. Both pistons 110 would now be coupled to the cam 122 motion. This would, in effect transform the operational mode of the hydraulic device 12 from that shown in FIG. 2 to that shown in FIG. 3. Accordingly, the receipt of the pressure signal P, and resulting change in state of the flow control valve 36 of arrangement SEC A, provides for an increase in volume output of fluid via the first output port 24, as the flow of fluid from arrangement SEC A is now joined to that of the flow of fluid from arrangement SEC B to the common first output gallery 240. The second case scenario is where the hydraulic device 12 is operating at an increased output mode (as shown by FIG. 3) and then the hydraulic device 12 gets the reduced pressure signal P indicating a reduction in fluid pressure (via fluid pressure sensing line 32—see FIG. 1), which then changes the state of the flow control valve 36 of arrangement SEC A from the open state to the closed state, i.e. representing the fact that the pressure magnitude of the fluid pressure sensing line 32 is insufficient to maintain the open position of the flow control valve 36 of SEC A. Once that change of state occurs, then the hydraulic fluid would flow via bypass passage 50 (instead of input passage 130) of arrangement SEC A into the corresponding common second output gallery 40.

Any fluid exiting the cylinder 120 of arrangement SEC A would allow for the corresponding piston 110 to move away from the cam surface 123 of cam 122, in order for the piston 110 of the arrangement SEC A to become decoupled from the rotating cam 122. As such, only the piston 110 of the arrangement SEC B would remain coupled to the cam 122 motion. This would, in effect transform the operational mode of the hydraulic device 12 from that shown in FIG. 3 to that shown in FIG. 2. Accordingly, the receipt of the pressure signal P, representing a decrease in the fluid pressure as per the fluid pressure sensing line 32, and resulting change in state of the flow control valve 36 of arrangement SEC A, provides for a decrease in volume output of fluid via the first output port 24. It is recognized that for a multi piston 110-cylinder 120 arrangement hydraulic device 12 (i.e. having more than 2 piston 110-cylinder 120 arrangements) the number of piston 110-cylinder 120 arrangements operating (i.e. coupled to the cam 122 and thus their output connected to the common first output gallery 240) or inactive (i.e. decoupled from the cam 122 and thus their output connected to the common second output gallery 40) can be two or more, depending upon the number of piston 110-cylinder 120 arrangements available. For an example 5 arrangement hydraulic device 12 (e.g. 2 arrangements operating and 3 arrangements decoupled, 1 arrangement operating and 4 arrangements decoupled, 5 arrangements operating and 0 arrangements decoupled, etc.). Depending upon the pressure signal P, respective ones of the arrangements can be either coupled to the cam 122 (thus directing output to the first output port 24 by way of the common first output gallery 240) or decoupled from the cam 122 (thus directing output towards the second output port 26 by way of the common second output gallery 40).

As discussed above, the flow of hydraulic fluid directed towards the second output port 26, by way of the common second output gallery 40, can 1) exit via the second output port 26 through cooling leg 16b (see FIG. 1) and redirected into the common input gallery 90 for subsequent use by any of the piston 110-cylinder 120 arrangements coupled to the motion of the cam 122. For example, for any decoupled piston 110-cylinder 120 arrangements (see arrangement SEC A), any fluid flowing out of the common second output gallery 40 (unless allowed out of the bypass leg by pressure relief valve(s) 29 back to the reservoir 20) would be able to flow via the bypass leg 16b to the common input gallery 90 (and thus available to any of the other piston 110-cylinder 120 arrangements considered in the open state (i.e. the piston 110 is coupled to the motion of the cam 122). In this way, subject to any excessive pressure in the bypass leg 16b, any hydraulic fluid exiting (via the common secondary output gallery 40) would be cooled and thus fed back to the input port 22 of the hydraulic device 12, recognizing that any hydraulic fluid flowing in the bypass leg 16b bypasses the load 14 when exiting (via the secondary output port 26) and subsequently reentering (via the input port 22) the hydraulic device 12.

In view of the above, it is recognized that any hydraulic fluid flowing between the output port(s) 24,26 and the input port 22 in a path that bypasses the fluid reservoir 20 would be considered as a closed loop operation of the hydraulic device 12. Further, it is recognized that any hydraulic fluid flowing between the output port(s) 24,26 and the input port 22 in a path that goes through the fluid reservoir 20 would be considered as an open loop operation of the hydraulic device 12. Accordingly, it is recognized that, except when the pressure relief valves 29 are utilized, the hydraulic device of FIGS. 1,2 can be operated as a closed loop hydraulic device 12.

Further to the above, it is also recognized that the common input gallery 90 (of the input port 22) of the hydraulic device 12 can be supplied (or otherwise supplemented) by a combination of fluid flows, i.e. fluid flow from the work leg 16a that is leaving the load 14, fluid flow supplied from the reservoir 20 by the charge pump 30, and/or fluid flow from the bypass (or cooling) leg 16b exiting the heat exchanger 28. An advantage of this multi stream fluid flow to the input port 22 is that the charge pump 30 volume output can be reduced, as the flow from the charge pump 30 will be supplemented by the fluid flows exiting the output port(s) 24,26 that bypass the reservoir 20 as described above and shown with reference to FIG. 1. In other words, depending upon the configuration of the system 10 (including the pressure and fluid flow demands of the load 14, the size of the charge pump 30 can be reduced and thus provide cost savings for the equipment and operation of the system 10. It is also recognized that there can be more than one charge pump 30, to account for when there is not enough closed loop flow of the fluid to the input port 22 via the leg(s) 16a,b and thus the difference must be made up from that fluid available from the reservoir 20.

Referring again to FIGS. 1 and 2, the operation of the flow control valves 36 is now described, in view of the sensed pressure signal P received via the pressure sensing line 32.

One embodiment of the flow control valve 36 is as a spool valve, such that the valve components 36' include a control cylinder 61 having a shuttle valve 60 having a body 62. The shuttle valve 60 is configured to reciprocate within the control cylinder 61, dependent upon a pressure signal P available at common sensing gallery 150, which is fluidly connected to the work leg 16a (between the load 14 and the first output port 24) by pressure sensing line 32—see FIG. 1. The body 62 is also biased by biasing element 70 in order to block the input passage 130 (thus providing a closed state of the flow control valve 36). The body 62 has a bypass port 63 and a work port 64, such that the common input gallery 90 is fluidly coupled to the common second output gallery 40 when the bypass port 63 is aligned with the bypass passage 50—see arrangement SEC A of FIG. 2. Further, when the bypass port 63 is aligned, then the work port 64 is misaligned with the input passage 130 and therefore the common input gallery 90 is fluidly blocked from fluid communication with the common first output gallery 240 (via the reciprocating piston 110-cylinder 120 arrangement)—see arrangement SEC A. Alternatively, the body 62 has the bypass port 63 and the work port 64, such that the common input gallery 90 is fluidly blocked from the common second output gallery 40 when the bypass port 63 is misaligned with the bypass passage 50—see arrangement SEC B of FIG. 2. Further, when the bypass port 63 is misaligned, then the work port 64 is aligned with the input passage 130 and therefore the common input gallery 90 is fluidly coupled for fluid communication with the common first output gallery 240 (via the reciprocating piston 110-cylinder 120 arrangement)—see arrangement SEC B.

In terms of how the ports 63, 64 switch between aligned and misaligned, this depends upon the strength of the pressure signal P in view of the strength of the bias exerted by the biasing element 70, as provided by a pressure sensing device 151. In a first embodiment, the pressure sensing device 151 can be provided hydraulically, such that the pressure sensing device 151 includes the pressure sensing line 32 connected between the work leg 16a and the common sensing gallery 150. As such, the hydraulic fluid from the work leg 16a (as positioned between the load 14 and the first output port 24) would pressurize the pressure sensing line 32 and fill the common sensing gallery 150. If the magnitude of the pressure of the hydraulic fluid in the common sensing gallery 150 is greater than the magnitude of the bias provided by the biasing element 70, the body 62 would shift in the control cylinder 61 against the bias and thus allow a portion of the fluid from the common sensing gallery 150 (as obtained from the work leg 16a) to fill the control cylinder 61 until the ports 63, 64 are aligned.

For example, if the pressure signal P at the common sensing gallery 150 is greater than the strength of the biasing element 70 for the flow control valve 36, then the body 62 would be forced against the bias of the biasing element 70 and this would result in a shift of the body 62 within the control cylinder 61 in a direction towards the biasing element 70. If the magnitude of the pressure signal P is large enough to overcome the bias exerted by the biasing element 70, then the body 62 would shift in the control cylinder 61 such that the work port 64 would become aligned with the input passage 130 and the bypass port 63 would become misaligned with the bypass passage 50 (see SEC B of FIG. 2). Referring further to FIG. 2, the same pressure signal P (experienced by the arrangement SEC B) is also present at the common sensing gallery 150 for the control cylinder 61 of the arrangement SEC A. In this case, the magnitude of the pressure signal P is less than the bias exerted by the biasing element 70 on the body 62 of the arrangement SEC A, and as such the body 62 remains shifted in the control cylinder 61 away from the biasing element 70 and towards the common sensing gallery 150. In this biased position for the arrangement SEC A, the work port 64 is (e.g. remains/becomes) misaligned with the input passage 130 and the bypass port 63 is (e.g. remains/becomes) aligned with the bypass passage 50. In terms of the pair of biasing elements 70 shown in FIG. 2, the biasing element 70 of arrangement SEC A can be of a stronger magnitude (i.e. stronger biasing force) than the biasing element 70 of arrangement SEC B. In other words, each of the plurality of biasing elements for the respective piston 110-cylinder 120 arrangements (of the hydraulic device 12) would have different biasing strengths. In this example, the operation of the flow control valves 36 is coordinated without use of triggering devices 601 (further described below).

Accordingly, in the embodiment described in FIG. 2, the biasing elements 70 are of differing strengths (reflective of different magnitudes of the pressure signal P provided by the common sensing gallery 150 during differing operational/load states of the load 14), such that it is recognized that as the magnitude of the pressure signal P increases (say from a lower fluid pressure towards a higher pressure), serially more and more of the biasing elements 70 will be overcome and thus their corresponding flow control valves 36 will change from the closed state to the open state. Similarly, as the biasing elements 70 are of differing strengths (reflective of different magnitudes of the pressure signal P provided by the common sensing gallery 150 during differing operational/load states of the load 14), it is recognized that as the magnitude of the pressure signal P decreases (say from a higher fluid pressure towards a lower pressure), serially more and more of the biasing elements 70 will be released and thus their corresponding flow control valves 36 will change from the open state to the closed state. In this manner, the hydraulic device 12 is operated as a "cylinder on demand" hydraulic device 12, depending upon the states of the respective flow control valves 36 associated with each of the piston 110-cylinder 120 arrangements of the multi-piston 110-cylinder 120 hydraulic device 12. As discussed above, it is recognized that the operation states of the flow control valves 36 are dependent upon the fluid pressure (of the load 14), as sensed via the pressure sending line 32 (reflected by the pressure signal P).

For example, for a 5 arrangement hydraulic device 12, a biasing element 70 for the first arrangement would have a biasing strength less than a biasing element 70 for the second arrangement, the biasing element 70 for the second arrangement would have the biasing strength less than a biasing element 70 for the third arrangement, the biasing element 70 for the third arrangement would have the biasing strength less than a biasing element 70 for the fourth arrangement, and the biasing element 70 for the fourth arrangement would have the biasing strength less than a biasing element 70 for the fifth arrangement. In other words, the biasing element 70 for the fifth arrangement would have the strongest bias force and the biasing element 70 for the first arrangement would have the weakest bias force. In this 5 arrangement example, the as the pressure signal P increased progressively from a strength only just greater than the biasing force of the first arrangement towards a strength equal to or greater than the biasing force for the fifth arrangement, the hydraulic device 12 would have the first arrangement coupled to the first output port 24 and then iteratively the second arrangement followed by the third arrangement followed by the fourth arrangement followed by the fifth arrangement becoming coupled to the first output port 24 until the hydraulic device 12 had all 5 arrangements combined to pump their respective cylinder 120 volumes to the common first output gallery 240, and thus out of the first output port 24 and to the load 14 via the work leg 16a. In other words, each of the piston 110-cylinders 120 would become "on demand", as their respective flow control valves 36 changed from the closed state to the open state.

For the operation of the flow control valves 36, in terms of the body 62 of the control valve 60 shifting back towards the common sensing gallery 150, as the magnitude of the pressure signal P drops, any fluid present in the control cylinder 61 (used in the earlier displacement of the body 62 against the bias of the biasing element 70) would be forced to return to the common sensing gallery 150 and ultimately back into the work leg 16a via the pressure sensing line 32. This return of the fluid back into the common sensing gallery 150 would be caused by the bias of the biasing element 70 overcoming the relatively weaker pressure (i.e. reflective of pressure signal P) of the hydraulic fluid in the control cylinder 61.

Referring again to FIG. 2, as one embodiment of the flow control valve, the control cylinder 61 has one end 61a having the common sensing gallery 150 and another end 61b having the biasing element 70, such that the body 62 is positioned in the control cylinder 61 between the common sensing gallery 150 and the biasing element 70.

Referring again to FIG. 1, in an alternative embodiment, the fluid pressure sensing device 151 can include a pressure transducer PD (see ghosted view) for sensing the fluid pressure in the work leg 16a and generating an electronic signal P as the pressure signal P for use by the respective flow control valve 36 to operate from the closed state to the open state. For example, the flow control valve 36 could include a solenoid 608 (for example see FIG. 4) operated by the electronic signal P, when received. In this example, the flow control valve 36 would be operated electronically, rather than hydraulically as shown in FIGS. 2 through 11.

Figure 4:
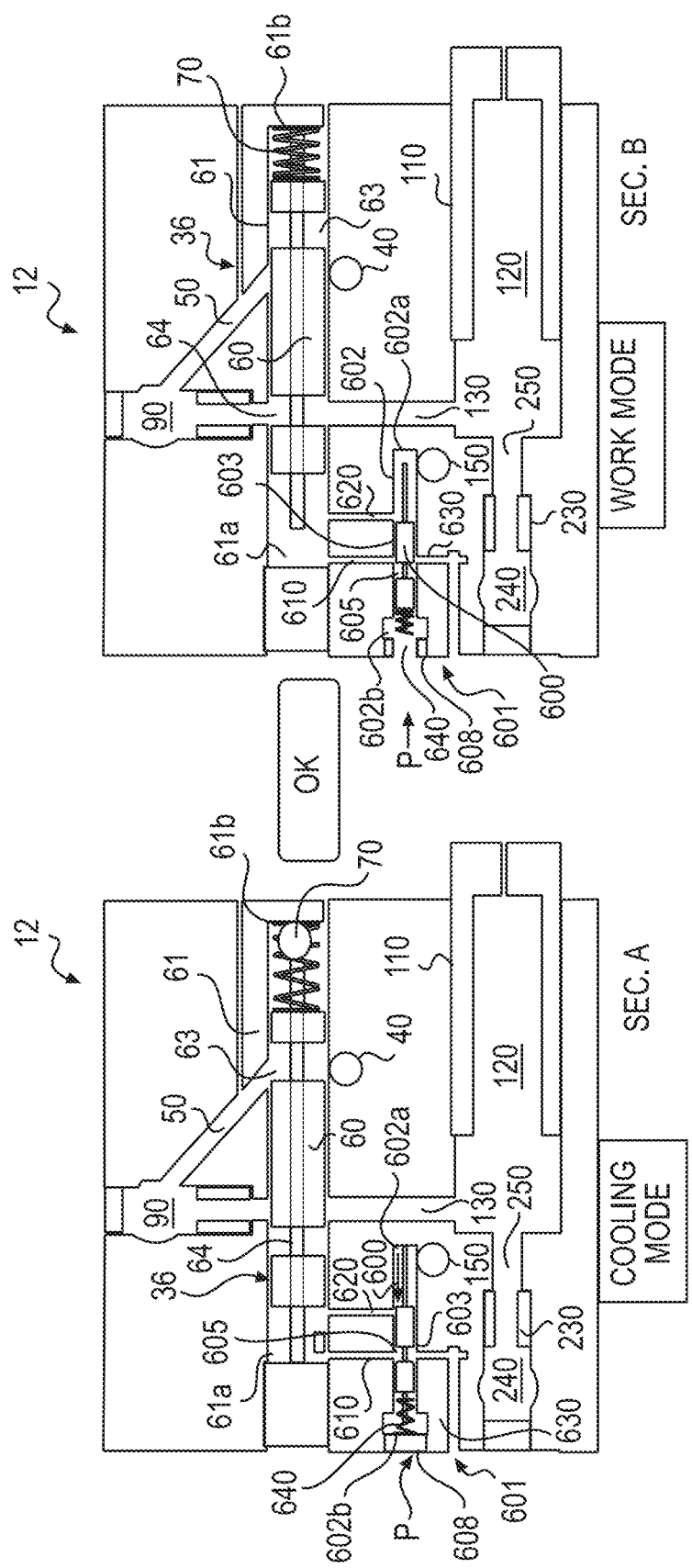
FIG. 4 is a further embodiment of the hydraulic device of FIG. 2 with trigger devices.

Referring to FIG. 4, shown is a further embodiment of the hydraulic device 12, such that the flow control valve 36 has a trigger device 601. The trigger device 601 is responsible for acting as a trigger for making the respective flow control valve 36 change from a closed state to an open state or from an open state to a closed state. The trigger device 601 has a trigger cylinder 602 with a trigger valve 600 (having a trigger body 603) configured for reciprocation within a trigger cylinder 602. The common sensing gallery 150 is positioned at one end 602a of the trigger cylinder 602 and a trigger biasing element 640 is positioned at another end 602b of the trigger cylinder 602. The body 603 is positioned between the common sensing gallery 150 and the trigger biasing element 640. In this case, the trigger biasing elements 640 would have the graduated strengths (i.e. different strengths) proportional to the expected pressure rise/decrease of the pressure signal P of the work leg 16a. In turn, the biasing elements 70 would be relatively weak (as compared to the trigger biasing elements 640), such that effectively any pressure of the hydraulic fluid allowed to enter the control cylinder 61 by the trigger device 601 would overcome the bias of the biasing element 70 for any of the fluid control valves 36 of the hydraulic device 12. Similarly, in turn, the biasing elements 70 would only be strong enough (as compared to the trigger biasing elements 640), such that any pressure of the hydraulic fluid allowed to leave the control cylinder 61 by the trigger device 601 would facilitate the bias of the biasing element 70 to return any of the fluid control valves 36 of the hydraulic device 12 to their closed state.

In other words, the trigger devices 601 are configured, i.e. the trigger biasing elements 640 are each respectively calibrated for different magnitudes of the pressure signal P, such that if any of them are triggered and thus allow a portion of the hydraulic fluid from the common sensing gallery 150 into the control cylinder 61, then the corresponding flow control valve 36 would change state from the closed state to the open state (i.e. the body 62 would move against the bias of the biasing element 70 and thus cause the work port 64 to become (or otherwise maintain) aligned and the bypass port 63 to become (or otherwise maintain) misaligned—see arrangement SEC B of FIG. 4). Similarly, the trigger devices 601 are configured, such that if any of them are triggered and thus allow the portion of the hydraulic fluid to leave the control cylinder 61 (e.g. to drain back into the common sensing gallery 150 as one embodiment, or to drain back to the reservoir 20 as a second embodiment), then the corresponding flow control valve 36 would change state from the open state to the closed state (i.e. the body 62 would move with the bias of the biasing element 70 and thus cause the work port 64 to become misaligned and the bypass port 63 to become aligned—see arrangement SEC A of FIG. 4).

Accordingly, in the embodiment described in FIG. 4, the biasing elements 640 are of differing strengths (reflective of different magnitudes of the pressure signal P provided by the common sensing gallery 150 during differing operational/load states of the load 14), such that it is recognized that as the magnitude of the pressure signal P increases (say from a lower fluid pressure towards a higher pressure), serially more and more of the biasing elements 640 will be overcome and thus their corresponding flow control valves 36 will change from the closed state to the open state. Similarly, as the biasing elements 640 are of differing strengths (reflective of different magnitudes of the pressure signal P provided by the common sensing gallery 150 during differing operational/load states of the load 14), it is recognized that as the magnitude of the pressure signal P decreases (say from a higher fluid pressure towards a lower pressure), serially more and more of the biasing elements 640 will be released and thus their corresponding flow control valves 36 will change from the open state to the closed state. In this manner, the hydraulic device 12 is operated as a "cylinder on demand" hydraulic device 12, depending upon the states of the respective flow control valves 36 associated with each of the piston 110-cylinder 120 arrangements of the multi-piston 110-cylinder 120 hydraulic device 12. As discussed above, it is recognized that the operation states of the flow control valves 36 are dependent upon the fluid pressure (generated by the load 14), as sensed via the fluid pressure sensing line 32 (reflected by the pressure signal P).

Referring again to FIG. 4, the trigger device 601 of the arrangement SEC B has had the biasing force of the trigger biasing element 640 overcome by the pressure signal P exhibited by the common sensing gallery 150. In other words, the body 603 of the trigger valve 600 has been forced against the bias and towards the another end 602b. This has allowed for the portion of the hydraulic fluid to exit the common sensing gallery 150 and enter pressure passage 620 and into the control cylinder 61. As the biasing element 70 of the arrangement SEC B has a relative bias force for the body 62 less than the bias force for the body 603, the body 62 shifts against the bias of the bias element 70 and changes the flow control valve 36 from the closed state to the open state. Referring to arrangement SEC A of FIG. 4, the pressure signal P of the common sensing gallery 150 is not strong enough to overcome the bias of the respective trigger biasing element 640. Thus, a drain port 605 of the body 603 is aligned with a drain passage 610, in order to allow any hydraulic fluid in the control cylinder 61 to leave and thus allow the bias for the biasing element 70 to shift (or otherwise maintain) the body 62 towards the end 61a (thereby aligning the bypass port 63 and misaligning the work port 64 in order to put the flow control valve in the closed state). Accordingly, an output passage 630 is aligned with the drain passage 610 when the drain aperture 605 is aligned with the drain passage 610. The output passage 630 can be fluidly coupled to the reservoir 20, as in this case with the trigger device 601, as the biasing element 70 may not have enough bias force to counteract the pressure of the hydraulic fluid in the common sensing gallery 150. An advantage of using the triggering device 610 in combination with the flow control valve 36 is that the opening of the flow control valve 36 (i.e. shifting of the body 62 against the biasing element 70) will be more of an instantaneous rather than of a graduated affair, as the pressure of the hydraulic fluid entering the control cylinder 61 will be much greater (e.g. one or more orders of magnitude greater) than the biasing strength of the biasing element 70. This is a consequence of the bias strength of the trigger biasing elements 640 (for a respective flow control valve) 36 is set for a higher pressure signal P magnitude than that of the bias strength of the respective biasing element 70 associated with the triggering device 601. In other words, the hydraulic fluid pressure P first shifts trigger body 603 against biasing element 640 in order to open pressure passage 620 for hydraulic fluid to then shift body 60 against the biasing element 70. The benefit of employing the trigger device 601 with the flow control valve 36 is that primarily full flow (e.g. continuous flow) of the hydraulic fluid will occur from the common sensing gallery 150 to the pressure passage 620 with little to no bypass losses through the drain passage 610. It is also recognized that the cross sectional area of passage 260 can be greater than the cross sectional area of passage 620. It is also recognized that the cross sectional area of passage 160 can be greater than the cross sectional area of passage 620. Further, passage 641 can be a machined passage for connected pressure passage 620 with the control cylinder 61.

In terms of the embodiment shown in FIG. 4, for example, for a 5 arrangement hydraulic device 12, a biasing element 640 for the first arrangement would have a biasing strength less than a biasing element 640 for the second arrangement, the biasing element 640 for the second arrangement would have the biasing strength less than a biasing element 640 for the third arrangement, the biasing element 640 for the third arrangement would have the biasing strength less than a biasing element 640 for the fourth arrangement, and the biasing element 640 for the fourth arrangement would have the biasing strength less than a biasing element 640 for the fifth arrangement. In other words, the biasing element 640 for the fifth arrangement would have the strongest bias force and the biasing element 640 for the first arrangement would have the weakest bias force. In this 5 arrangement example, as the pressure signal P increased progressively from a strength only just greater than the biasing force of the first arrangement towards a strength equal to or greater than the biasing force for the fifth arrangement, the hydraulic device 12 would have the first arrangement coupled to the first output port 24 and then iteratively the second arrangement followed by the third arrangement followed by the fourth arrangement followed by the fifth arrangement becoming coupled to the first output port 24 until the hydraulic device 12 had all 5 arrangements combined to pump their respective cylinder 120 volumes to the common first output gallery 240, and thus out of the first output port 24 and to the load 14 via the work leg 16a.

Figure 5:
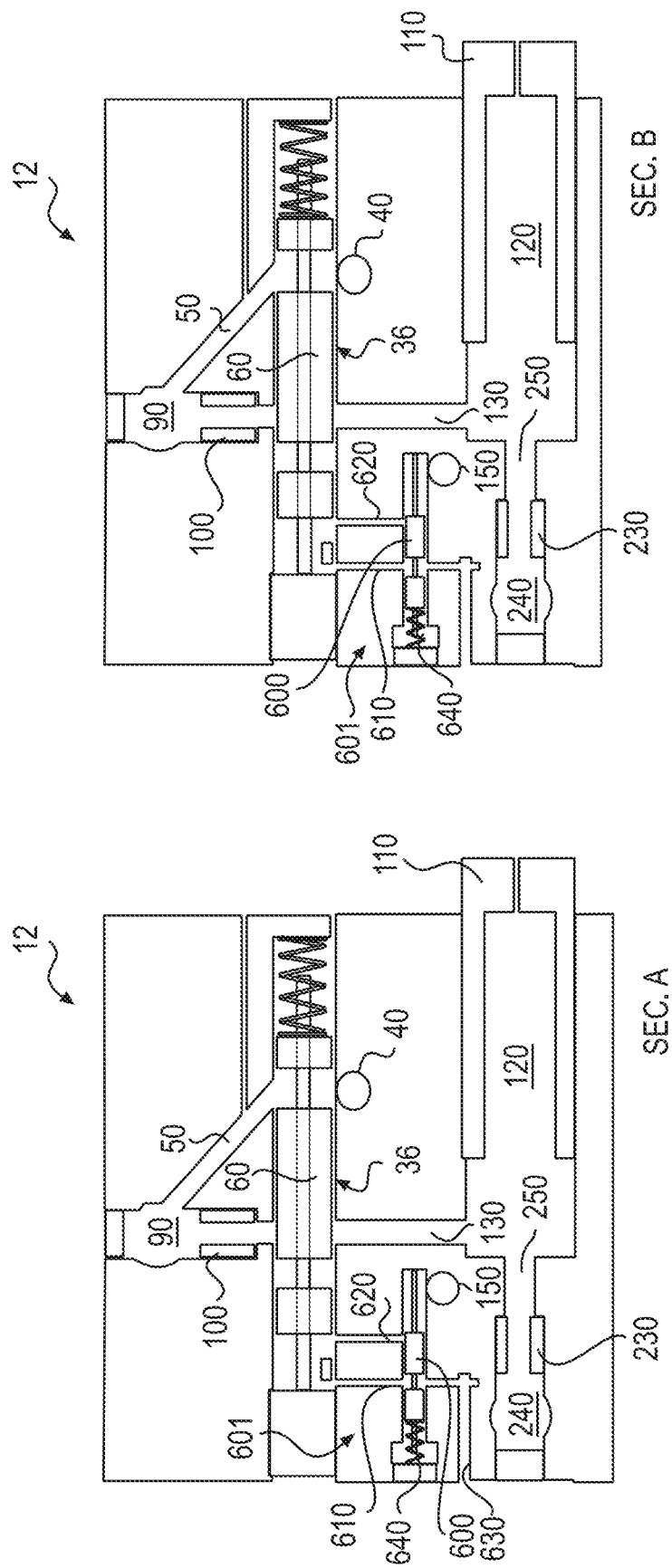
FIG. 5 is a view of the hydraulic device of FIG. 4 with both arrangements in an open mode.

Referring to FIG. 5, shown is a similar mode to that shown in FIG. 3, whereby both of the trigger devices 601 for the pair of arrangements SEC A and SEC B have been forced against the bias of their respective trigger biasing element 640, thus placing (or otherwise maintaining) both of the flow control valves 36 of the arrangements in the open state.

Referring to again to FIG. 4, it is recognized that an alternative embodiment of the trigger device 601 can be such that the element 608 can be an electronically controlled solenoid 608, with the biasing element 640 simply configured as a return spring of the solenoid 608. In this manner, each of the solenoids would be considered collectively as the plurality of "biasing elements 640", such that activation of each of the solenoids 608 would be set for a certain magnitude of the pressure signal P (as an electronic signal supplied by a pressure transducer PD—see FIG. 1). As such, the pressure sensing line 32 can be used to supply both the electronic pressure signal P as well as the portion of the hydraulic fluid used to flow into the control cylinder 61 of the flow control valve 36, as described above. In other words, as the trigger device 601 is electronically activated by the solenoid 608, for a flow control valve 36 in the closed state, the trigger body 603 would be shifted by the solenoid operation in order to block the drain passage 610 and open the pressure passage 620, thus proving for the portion of the hydraulic fluid from the common sensing gallery 150 to enter the control cylinder 61. Similarly, as the solenoid 608 is electronically controlled by the pressure signal P (e.g. in the absence of an electronic signal), for a flow control valve 36 in the open state, the trigger body 603 would be shifted by the solenoid operation in order to open the drain passage 610 and block the pressure passage 620, thus proving for the portion of the hydraulic fluid to exit the control cylinder 61 via the drain passage 630.

Figure 6:
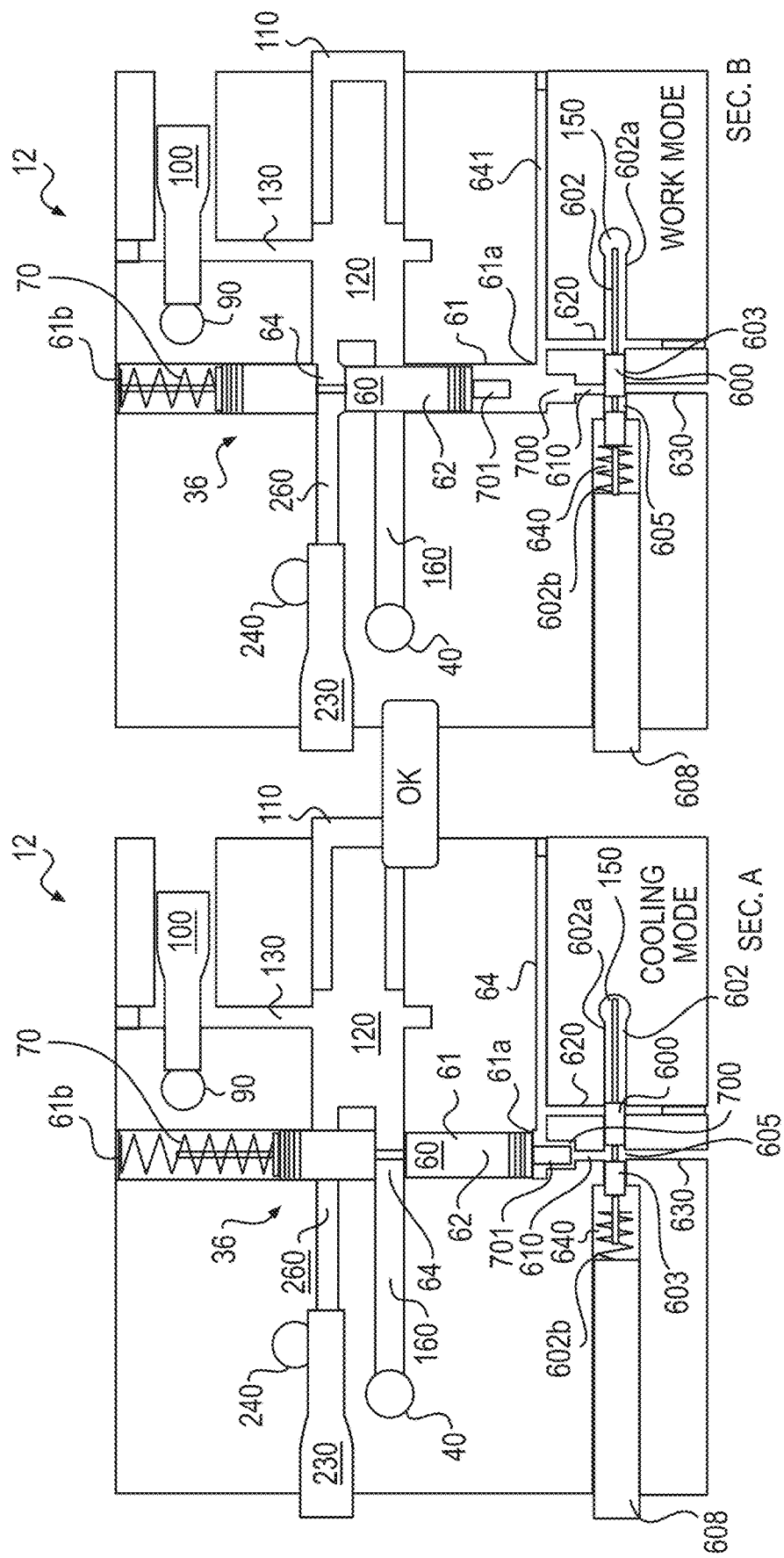
FIG. 6 is a further embodiment of the hydraulic device of FIG. 1 with trigger devices.

Referring to FIG. 6, shown is a further embodiment of the hydraulic device 12, such that that flow control valve 36 is positioned between the cylinder 120 and both of the common first output gallery 240 and the common second output gallery 40. In this case, the optional trigger devices 601 are present. The control valve 36 has the body 62 for reciprocation within the control cylinder 61. Similarly, the body 62 is acted upon by a bias of a biasing element 70 in order to shift the body 62 in the control cylinder 61 towards the end 61*a*. In the event that the trigger device 601 is triggered and allows the portion of the hydraulic fluid from the common sensing gallery 150 to enter the one end 61*a* of the control cylinder 61, then the fluid pressure of the portion of the hydraulic fluid acts against the bias of the biasing element 70 and shifts the body 62 towards the another end 61*b* (see arrangement SEC B of FIG. 6).

In terms of the work port 64 in the body 62 of the flow control valve 36, when the body 62 is under the influence of the bias (i.e. is pushed towards the one end 61*a*), then the work port 64 is aligned with a bypass passage 160 and therefore any output of hydraulic fluid from the cylinder 120 is fluidly communicated to the common second output gallery 40. Further, in this bypass mode (where the flow control valve 36 is in the closed state), the body 62 can block work passage 260 and thus inhibit any flow of hydraulic fluid out of the control cylinder 61 and into the common first output gallery 240 (see arrangement SEC A of FIG. 6).

Figure 8:
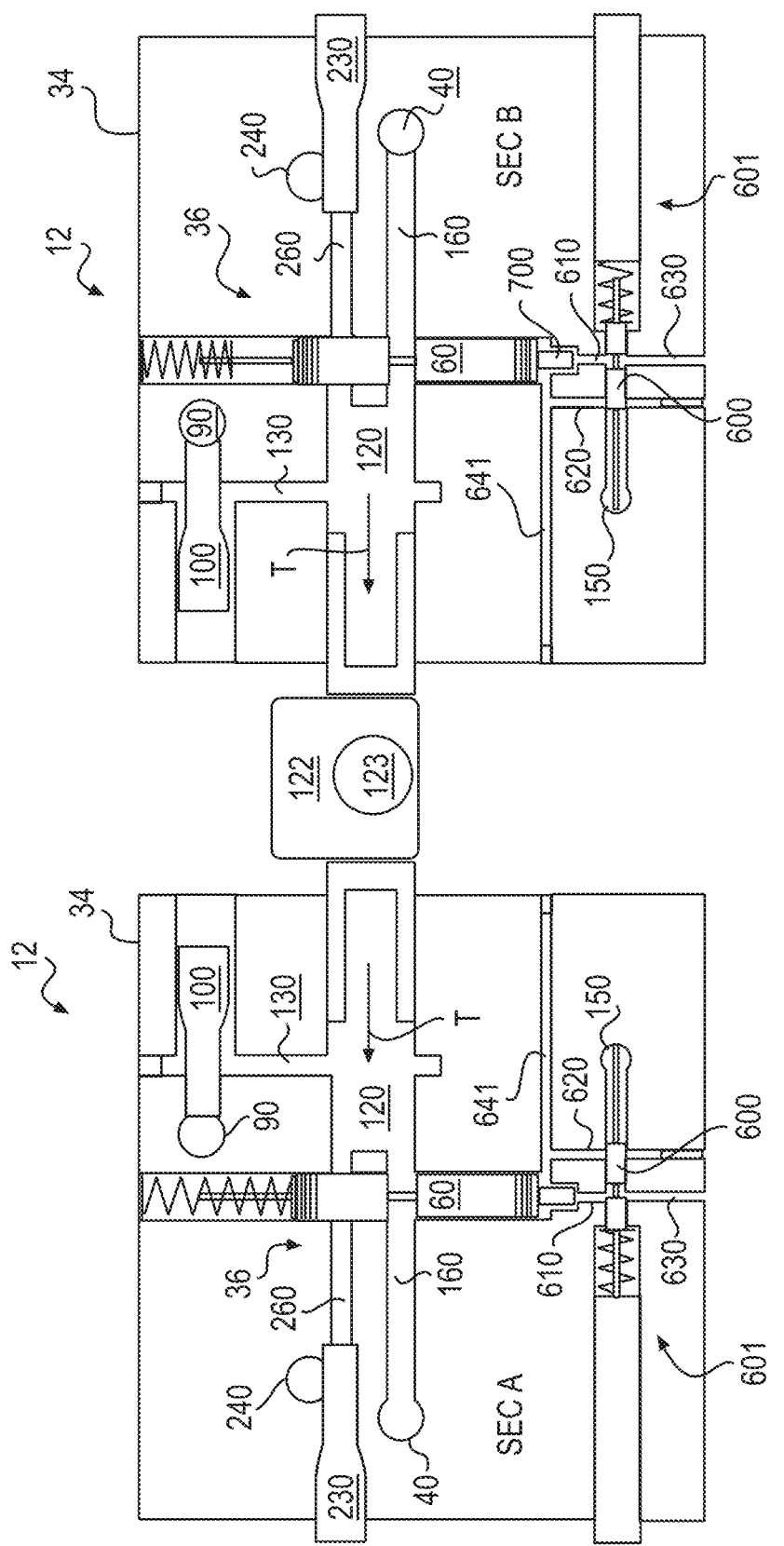
FIG. 8 is a view of the hydraulic device of FIG. 6 with both arrangements in a closed mode.

Referring to FIG. 8, shown is the configuration where a pair of the piston 110-cylinder 120 arrangements are sequentially coupled (e.g. via the motion of the cam 122) to the common second output gallery 40, such that each is associated with their flow control valve 36 in the closed state. For example, the piston 110 of arrangement SEC A is in the process completing its travel T in the cylinder 120 (e.g. travelling towards top dead center towards the bypass passage 160) and thus outputting fluid from its cylinder 120 via bypass passage 160 to the common second output gallery 40. In turn, the piston 110 of arrangement SEC B is in the process of beginning its travel T in the cylinder 120 (e.g. travelling towards bottom dead center away from the bypass passage 160) and thus inputting fluid to its cylinder 120 via bypass passage 160 from the common second output gallery 40. In other words, as both of the pistons 110 of the arrangements SEC A and SEC B are coupled to the motion of the cam 122, the fluid output of one cylinder 120 becomes the fluid input (i.e. is recycled internally within the housing 34) of the another cylinder 120 via the common secondary output gallery 40, for those cylinders 120 in sequence with one another as coupled via the cam 122.

In this manner, it is recognized that as shown in FIG. 1, any hydraulic fluid leaving the hydraulic device 12 can be through the work leg 16*a* of the hydraulic fluid conduits 16 (e.g. via the load 14) or can be through the cooling (also referred to as bypass) leg 16*b* of the hydraulic fluid conduits 16 (e.g. via the heat exchanger 28). In the embodiment shown in FIG. 6, it is further recognized that not all of the fluid entering the common second output gallery 40 would leave the housing 34 via the second output port 26, rather some of the fluid entering the common secondary output gallery 40 would be recycled internally in the housing 34 between sequential piston 110-cylinder 120 arrangements (for those considered in the closed state) via this same common secondary output gallery 40 (see FIG. 8). As discussed above, the heat exchanger 28 can be connected directly between the secondary output port 26 and the input port 22, such that any fluid flowing through the heat exchanger 28 can exit the hydraulic device 12 via the secondary output port 26 and flow directly back to the input port 22 via the bypass leg 16*b* as shown, i.e. in this case bypassing the load 14 as well as bypassing the reservoir 20. Further, it is recognized that the output of the heat exchanger 28 can be dumped directly to the reservoir 20 first (see optional ghosted conduit 16*e*), before being fed back to the input port 22 via the charge pump 30. As before, the pressure relief valve 29 can be connected to the relief line 16*c*, for use when there is a considered oversupply of hydraulic fluid to the hydraulic device 12 (i.e. when the additive flows of fluid from both the heat exchanger 28—as exiting a common secondary output gallery 40, see FIG. 2—combine with the fluid flow from the charge pump 30 as obtained from the reservoir 20).

As discussed above, the flow of hydraulic fluid directed towards the second output port 26, by way of the common second output gallery 40, can exit via the second output port 26 through cooling leg 16*b* (see FIG. 1) and redirected into the common input gallery 90 for subsequent use by any of the piston 110-cylinder 120 arrangements coupled to the motion of the cam 122. For example, for any decoupled piston 110-cylinder 120 arrangements (see arrangement SEC A and SEC B of FIG. 8 having their flow control valves 36 in the closed state), any fluid flowing first in and then out of the common second output gallery 40 would be able to flow in a recycled fashion (internal to the housing 34) via the passage 160 towards the cylinder 120 considered just downstream of the cylinder 120 that just emptied into the common secondary output gallery 40. In other words, referring again to FIG. 8, the arrangement SEC A would first begin/continue discharge of fluid from its cylinder 120 via its passage 160 to the common secondary output gallery 40. Simultaneously, the cylinder 120 of arrangement SEC B (also in the close state) downstream of the arrangement of SEC A would draw fluid from the common secondary output gallery 40, via its passage 160, and thus into its cylinder 120. It is recognized that if the amount of fluid entering the cylinder 120 of arrangement SEC B is less than what is required via movement of the piston 110, fluid can also be inputted into the cylinder 120 of arrangement SEC B via its passage 130 coupled to the common input gallery 90.

In this way, subject to any excessive pressure in the bypass leg 16*b*, any hydraulic fluid exiting (via the common secondary output gallery 40) by the secondary output port 26 would be cooled and thus fed back to the input port 22 (via common input gallery 90) of the hydraulic device 12, recognizing that any hydraulic fluid flowing in the bypass leg 16*b* bypasses the load 14 in when exiting (via the secondary output port 26) and subsequently reentering (via the input port 22) the hydraulic device 12.

In view of the above, it is recognized that any hydraulic fluid flowing between the output port(s) 24,26 and the input port 22 in a path that bypasses the fluid reservoir 20 would be considered as a closed loop operation of the hydraulic device 12. Further, it is recognized that any hydraulic fluid flowing between the output port(s) 24,26 and the input port 22 in a path that goes through the fluid reservoir 20 would be considered as an open loop operation of the hydraulic device 12. Further, it is recognized that any hydraulic fluid flowing between adjacent/sequential arrangements (see FIG. 8) in a path that bypasses the secondary output port 26 altogether (i.e. does not exit the housing 34 and instead is recycled internally) would be considered as a closed loop operation of the hydraulic device 12. Accordingly, it is recognized that, except when the pressure relief valves 29 are utilized, the hydraulic device of FIGS. 1,2 can be operated as a closed loop hydraulic device 12.

Further to the above, it is also recognized that the common input gallery 90 (of the input port 22) of the hydraulic device 12 can be supplied or otherwise supplemented by a combination of fluid flows, i.e. fluid flow from the work leg 16a that is leaving the load 14, fluid flow supplied from the reservoir 20 by the charge pump 30, fluid flow from the bypass (or cooling) leg 16b exiting the heat exchanger 28 and/or fluid flow that is recycled via the common secondary output gallery 40 for sequential piston 110-cylinder 120 arrangements having their flow control valves 36 in the closed state. An advantage of this multi stream fluid flow to any of the piston 110-cylinder 120 arrangements coupled to the common input gallery 90 is that the charge pump 30 volume output can be reduced, as the flow from the charge pump 30 will be supplemented by the fluid flows exiting the output port(s) 24,26 that bypass the reservoir 20, as described above and shown with reference to FIG. 1, as well as those that are fed recycled fluid via the common secondary output gallery 40 as descried above. In other words, depending upon the configuration of the system 10 (including the pressure and fluid flow demands of the load 14, the size of the charge pump 30 can be reduced and thus provide cost savings for the equipment and operation of the system 10. It is also recognized that there can be more than one charge pump 30, to account for when there is not enough closed loop flow of the fluid to the piston 110-cylinder 120 arrangements via the leg(s) 16a,b and/or the common secondary output gallery 40, and thus the difference must be made up from that fluid available from the reservoir 20.

Referring again to FIG. 6, the triggering devices 601 function similarly to those described for the hydraulic device 12 embodiment of FIG. 4. In other words, shown is an embodiment of the hydraulic device 12, such that the flow control valve 36 has a trigger device 601. The trigger device 601 is responsible for acting as a trigger for making the respective flow control valve 36 change from a closed state to an open state or from an open state to a closed state. The trigger device 601 has a trigger cylinder 602 with a trigger valve 600 (having a trigger body 603) configured for reciprocation within a trigger cylinder 602. The common sensing gallery 150 is positioned at one end 602a of the trigger cylinder 602 and a trigger biasing element 640 is positioned at another end 602b of the trigger cylinder 602. The body 603 is positioned between the common sensing gallery 150 and the trigger biasing element 640. In this case, the trigger biasing elements 640 would have the graduated strengths (i.e. different strengths) proportional to the expected pressure rise/decrease of the pressure signal P of the work leg 16a. In turn, the biasing elements 70 would be relatively weak (as compared to the trigger biasing elements 640), such that effectively any pressure of the hydraulic fluid allowed to enter the control cylinder 61 by the trigger device 601 would overcome the bias of the biasing element 70 for any of the fluid control valves 36 of the hydraulic device 12. Similarly, in turn, the biasing elements 70 would only be strong enough (as compared to the trigger biasing elements 640), such that any pressure of the hydraulic fluid allowed to leave the control cylinder 61 by the trigger device 601 would facilitate the bias of the biasing element 70 to return any of the fluid control valves 36 of the hydraulic device 12 to their closed state.

In other words, the trigger devices 601 are configured, i.e. the trigger biasing elements 640 are each respectively calibrated for different magnitudes of the pressure signal P, such that if any of them are triggered and thus allow a portion of the hydraulic fluid from the common sensing gallery 150 into the control cylinder 61, then the corresponding flow control valve 36 would change state from the closed state to the open state (i.e. the body 62 would move against the bias of the biasing element 70 and thus cause the work port 64 to become (or otherwise maintain) aligned and the bypass port 63 to become (or otherwise maintain) misaligned—see arrangement SEC B of FIG. 6). Similarly, the trigger devices 601 are configured, such that if any of them are triggered and thus allow the portion of the hydraulic fluid to leave the control cylinder 61 (e.g. to drain back into the common sensing gallery 150 as one embodiment, or to drain back to the reservoir 20 as a second embodiment), then the corresponding flow control valve 36 would change state from the open state to the closed state (i.e. the body 62 would move with the bias of the biasing element 70 and thus cause the work port 64 to become misaligned and the bypass port 63 to become aligned—see arrangement SEC A of FIG. 6).

Accordingly, in the embodiment described in FIG. 6, the biasing elements 640 are of differing strengths (reflective of different magnitudes of the pressure signal P provided by the common sensing gallery 150 during differing operational/load states of the load 14), such that it is recognized that as the magnitude of the pressure signal P increases (say from a lower fluid pressure towards a higher pressure), serially more and more of the biasing elements 640 will be overcome and thus their corresponding flow control valves 36 will change from the closed state to the open state. Similarly, as the biasing elements 640 are of differing strengths (reflective of different magnitudes of the pressure signal P provided by the common sensing gallery 150 during differing operational/load states of the load 14), it is recognized that as the magnitude of the pressure signal P decreases (say from a higher fluid pressure towards a lower pressure), serially more and more of the biasing elements 640 will be released and thus their corresponding flow control valves 36 will change from the open state to the closed state. In this manner, the hydraulic device 12 is operated as a "cylinder on demand" hydraulic device 12, depending upon the states of the respective flow control valves 36 associated with each of the piston 110-cylinder 120 arrangements of the multi-piston 110-cylinder 120 hydraulic device 12. As discussed above, it is recognized that the operation states of the flow control valves 36 are dependent upon the fluid pressure (of the load 14), as sensed via the pressure sending line 32 (reflected by the pressure signal P).

Referring again to FIG. 6, the trigger device 601 of the arrangement SEC B has had the biasing force of the trigger biasing element 640 overcome by the pressure signal P exhibited by the common sensing gallery 150. In other words, the body 603 of the trigger valve 600 has been forced against the bias and towards the another end 602b. This has allowed for the portion of the hydraulic fluid to exit the common sensing gallery 150 and enter pressure passage 620 and into the control cylinder 61. As the biasing element 70 of the arrangement SEC B has a relative bias force for the body 62 less than the bias force for the body 603, the body 62 shifts against the bias of the bias element 70 and changes the flow control valve 36 from the closed state to the open state. Referring to arrangement SEC A of FIG. 6, the pressure signal P of the common sensing gallery 150 is not strong enough to overcome the bias of the respective trigger biasing element 640. Thus, a drain port 605 of the body 603 is aligned with a drain passage 610, in order to allow any hydraulic fluid in the control cylinder 61 to leave and thus allow the bias for the biasing element 70 to shift (or otherwise maintain) the body 62 towards the end 61*a* (thereby aligning the bypass port 63 and misaligning the work port 64 in order to put the flow control valve in the closed state). Accordingly, an output passage 630 is aligned with the drain passage 610 when the drain aperture 605 is aligned with the drain passage 610. The output passage 630 can be fluidly coupled to the reservoir 20, as in this case with the trigger device 601, as the biasing element 70 may not have enough bias force to counteract the pressure of the hydraulic fluid in the common sensing gallery 150. An advantage of using the triggering device 610 in combination with the flow control valve 36 is that the opening of the flow control valve 36 (i.e. shifting of the body 62 against the biasing element 70) will be more of an instantaneous rather than of a graduated affair, as the pressure of the hydraulic fluid entering the control cylinder 61 will be much greater (e.g. one or more orders of magnitude greater) than the biasing strength of the biasing element 70. This is a consequence of the bias strength of the trigger biasing elements 640 (for a respective flow control valve) 36 is set for a higher pressure signal P magnitude than that of the bias strength of the respective biasing element 70 associated with the triggering device 601.

In terms of the embodiment shown in FIG. 6, for example, for a 5 arrangement hydraulic device 12, a biasing element 640 for the first arrangement would have a biasing strength less than a biasing element 640 for the second arrangement, the biasing element 640 for the second arrangement would have the biasing strength less than a biasing element 640 for the third arrangement, the biasing element 640 for the third arrangement would have the biasing strength less than a biasing element 640 for the fourth arrangement, and the biasing element 640 for the fourth arrangement would have the biasing strength less than a biasing element 640 for the fifth arrangement. In other words, the biasing element 640 for the fifth arrangement would have the strongest bias force and the biasing element 640 for the first arrangement would have the weakest bias force. In this 5 arrangement example, as the pressure signal P increased progressively from a strength only just greater than the biasing force of the first arrangement towards a strength equal to or greater than the biasing force for the fifth arrangement, the hydraulic device 12 would have the first arrangement coupled to the first output port 24 and then iteratively the second arrangement followed by the third arrangement followed by the fourth arrangement followed by the fifth arrangement becoming coupled to the first output port 24 until the hydraulic device 12 had all 5 arrangements combined to pump their respective cylinder 120 volumes to the common first output gallery 240, and thus out of the first output port 24 and to the load 14 via the work leg 16*a*.

Referring to again to FIG. 6, it is recognized that an alternative embodiment of the trigger device 601 can be such that the element 608 can be an electronically controlled solenoid 608, with the biasing element 640 simply configured as a return spring of the solenoid 608. In this manner, each of the solenoids would be considered collectively as the plurality of "biasing elements 640", such that activation of each of the solenoids 608 would be set for a certain magnitude of the pressure signal P (as an electronic signal supplied by a pressure transducer PD—see FIG. 1). As such, the pressure sensing line 32 can be used to supply both the electronic pressure signal P as well as the portion of the hydraulic fluid used to flow into the control cylinder 61 of the flow control valve 36, as described above. In other words, as the trigger device 601 is electronically activated by the solenoid 608, for a flow control valve 36 in the closed state, the trigger body 603 would be shifted by the solenoid operation in order to block the drain passage 610 and open the pressure passage 620, thus proving for the portion of the hydraulic fluid from the common sensing gallery 150 to enter the control cylinder 61. Similarly, as the solenoid 608 is electronically controlled by the pressure signal P (e.g. in the absence of an electronic signal), for a flow control valve 36 in the open state, the trigger body 603 would be shifted by the solenoid operation in order to open the drain passage 610 and block the pressure passage 620, thus proving for the portion of the hydraulic fluid to exit the control cylinder 61 via the drain passage 630.

An additional component of the triggering device 601 as shown in FIG. 6, over that of FIG. 4, is a stem 701 connected to an end of the body 62 adjacent to the one end 61*a* and a corresponding recess 700 adjacent to an opening of the drain passage 610 connected to the control cylinder 61. As can be seen in the arrangement SEC A, when the body 62 of the flow control valve 36 is in position (as a close state), the stem 701 is received by the recess 700, however the stem 701 is longer than the recess 700 in order to position an end of the body away from the one end 61*a* of the control cylinder 61 (see arrangement SEC A). This spaced apart orientation allows for the portion of the hydraulic fluid from the trigger device 601 (when triggered by an increase in the pressure signal P) to flow into the control cylinder 61 and thus shift the body 62 against the bias of the biasing element 70 (see arrangement SEC A). Further, the positioning of the stem 701 in the recess 700 also blocks the drain passage 610 from any fluid exiting the control cylinder 61 via the input passage 620, until the body 603 of the trigger valve 600 is fully pushed against the bias of the trigger biasing element 640, in order to misalign the drain port 605 and thus block any fluid from flowing out of the control cylinder 61 via the drain passage 610 and output passage 630.

Figure 7:
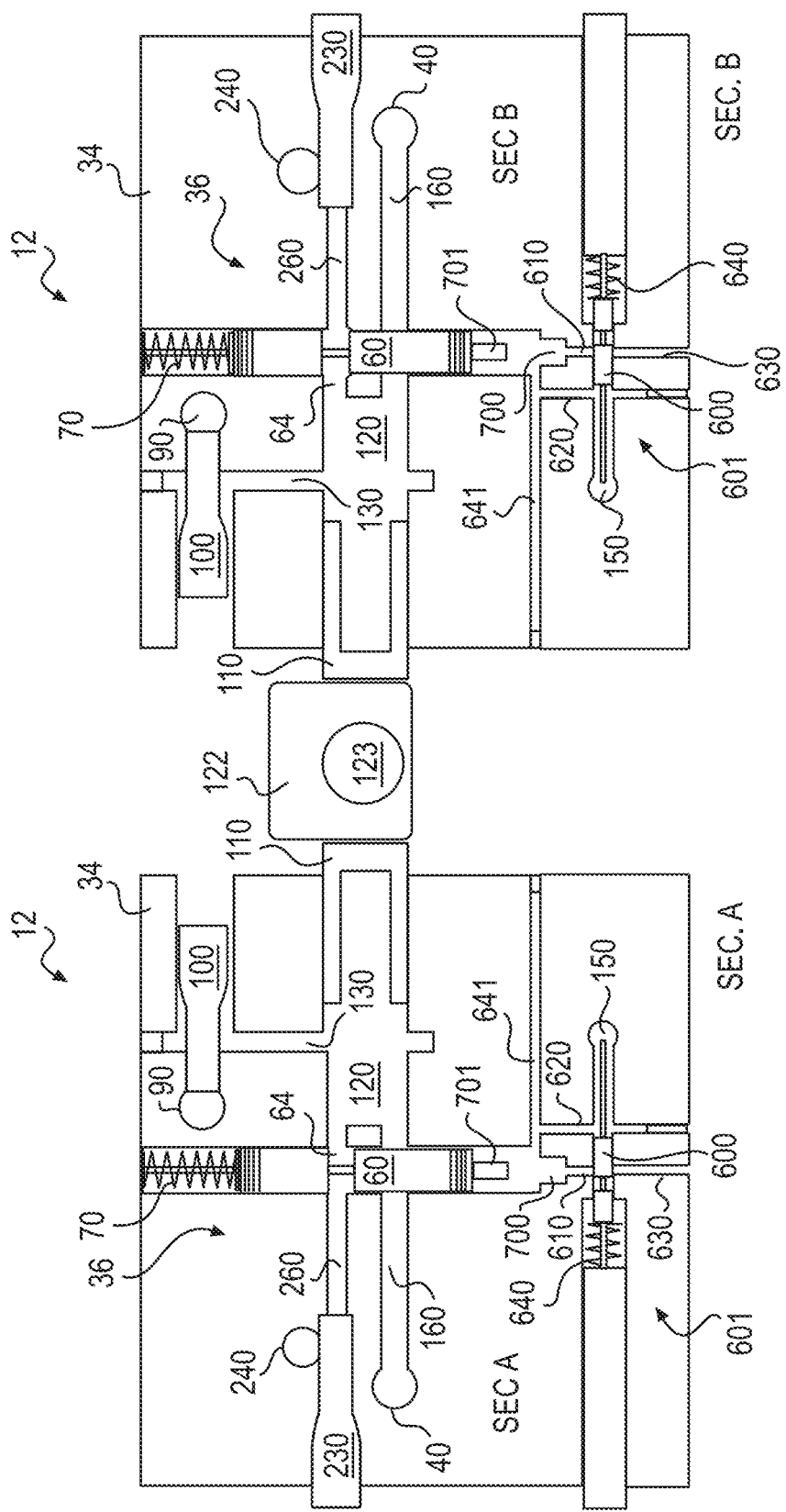
FIG. 7 is a view of the hydraulic device of FIG. 6 with both arrangements in an open mode.

Referring to FIG. 7, shown is a similar mode to that shown in FIG. 5, whereby both of the trigger devices 601 for the pair of arrangements SEC A and SEC B have been forced against the bias of their respective trigger biasing element 640, thus placing (or otherwise maintaining) both of the flow control valves 36 of the arrangements in the open state.

Figure 9:
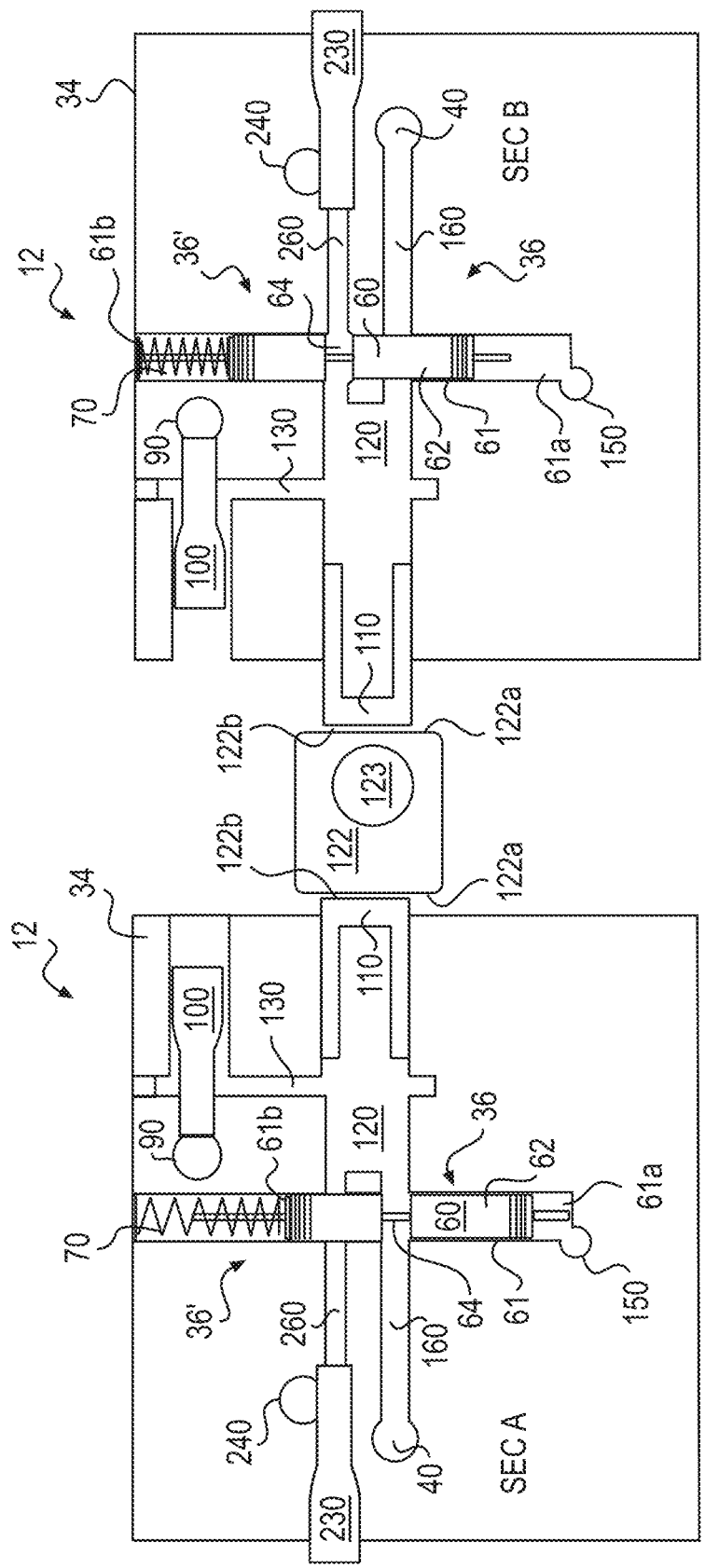
FIG. 9 is a further embodiment of the hydraulic device of FIG. 6 without trigger devices.

Referring to FIGS. 1 and 9, shown is further embodiment of the hydraulic device 12 of FIG. 6 having a plurality of cylinders 120 and corresponding pistons 110. For example, it is envisioned that the hydraulic device 12 can have any number of piston 110-cylinder 120 arrangements, e.g. 5, 7, 9, etc. However for illustration purposes only, a pair of piston 110-cylinder 120 arrangements is shown. The hydraulic device 12 (also referred to as device 12) has the housing 34 for containing the plurality of piston 110-cylinder 120 arrangements, as driven by the cam 122 having a cam surface 122*a* for driving a piston surface 122*b* of the pistons 110 (see FIG. 2 by example for the stated surfaces 122*a,b*). As discussed above, reciprocation of the pistons 110 within their cylinders 120, when driven by the cam 122, will provide for entry of the hydraulic fluid via input passage 130 into the cylinder 120 (volume), and for exit of the hydraulic fluid via output passage(s) 160,260 out of the cylinder 120 (volume).

Further, as by example, each of the output passages 260 is fluidly connected to a first output gallery 240 (e.g. by way of a check valve 230 in order to facilitate a one way flow of hydraulic fluid out of the output passages 260), which is fluidly connected to the first output port 24 (see FIG. 1). As such, each of the piston 110-cylinder 120 arrangements can output their hydraulic fluid to the first output gallery 240 common to all piston 110-cylinder 120 arrangements. Further, as by example, each of the output passages 160 is fluidly connected to a second output gallery 40, which is fluidly connected to the second output port 26 (see FIG. 1). As such, each of the piston 110-cylinder 120 arrangements can output their hydraulic fluid to the second output gallery 40 common to all piston 110-cylinder 120 arrangements.

Further, as by example, each of the input passages 130 is fluidly connected to an input gallery 90 (e.g. by way of a check valve 110 in order to facilitate a one way flow of hydraulic fluid into the input passages 130), which is fluidly connected to the input port 22 (see FIG. 1). As such, each of the piston 110-cylinder 120 arrangements can have their hydraulic fluid input from the input gallery 90 common to all piston 110-cylinder 120 arrangements. As discussed above, it is also recognized that each of the cylinders 120 (when their flow control valve 36 is in the closed state) can also be supplied fluid from the common secondary output gallery 40 (for when recycling of fluid via the common secondary output gallery 40 is enabled as discussed by example with reference to FIG. 11). It is recognized that any fluid flowing through passage 160 towards the cylinder 120 would be subsequently received by the cylinder 120. Similarly, it is recognized that any fluid flowing through passage 160 away from the cylinder 120 would be subsequently received by the common secondary output gallery 40.

It is recognized that any fluid flowing through input passage 130 would be subsequently received by the cylinder 120. Similarly, it is recognized that any fluid flowing through the output passage 260 would be subsequently received by the common first output gallery 240. Further, the common input gallery 90 can also be fluidly connected by respective bypass passages 160 to the bypass gallery 40 (i.e. the common secondary output gallery 40) that is commonly associated with all of the piston 110-cylinder 120 arrangements.

A flow control valve 36 (for each piston 110-cylinder 120 arrangement) can be positioned between the piston 110-cylinder 120 arrangement (across bypass passage 160 and output passage 260) and the common bypass gallery 40. As further described below, depending upon the operational state of the flow control valve 36 (e.g. an open state or a closed state), the flow control valve 36 can: 1) inhibit flow of the hydraulic fluid between piston 110-cylinder 120 arrangement and the first output gallery 240; 2) allow flow of the hydraulic fluid between common input gallery 90 and the first output gallery 240 (i.e. by way of the piston 110-cylinder 120 arrangement); 3) inhibit flow of the hydraulic fluid between the piston 110-cylinder 120 arrangement and the second output gallery 40 (i.e. by way of the bypass passage 160); and 4) allow flow of the hydraulic fluid between the piston 110-cylinder 120 arrangement and the second output gallery 40 (i.e. by way of the bypass passage 160).

In FIG. 9, by example, the flow control valve 36 associated with the piston 110-cylinder 120 arrangement labelled SEC A would be considered in the closed state. The valve components 36' (described by example above) of the flow control valve 36 are blocking flow of the fluid between the cylinder 120 and the common first output gallery 240 and (e.g. blocking passage 260), while allowing the flow of fluid between the cylinder 120 and the common second output gallery 40 (e.g. via open bypass passage 160). Accordingly, as shown by example for the hydraulic device 12 embodiment of FIG. 9, during cyclic operation of the cam 122, the arrangement SEC A is configured by the closed state of its respective flow control valve 36 to send fluid from the common input gallery 90 directly to the common bypass gallery 40. Thus the arrangement SEC A does not send fluid out of the first output port 24 while the cam 122 rotates, rather any fluid input to the arrangement SEC A flows straight to the second common output gallery 40. As further described, any fluid entering the common second output gallery 40 can be directed within the housing 34 (e.g. by the second common output gallery 40) back to a downstream cylinder 120, for use by other piston 110-cylinder 120 arrangements (e.g. arrangement SEC B—see FIG. 8). Alternatively, or in addition to, any fluid entering the common second output gallery 40 can be delivered to the second output port 26 for delivery to the heat exchanger 28 via the hydraulic fluid conduits of leg 16b—see FIG. 1.

In FIG. 9, the flow control valve 36 associated with the piston 110-cylinder 120 arrangement labelled SEC B would be considered in the open state. The valve components 36' (described by example above) of the flow control valve 36 are allowing flow of the fluid between the common first output gallery 240 and the cylinder 120 (e.g. via open passage 260), while blocking the flow of fluid between the cylinder 120 and the common second output gallery 40 (e.g. blocking bypass passage 160). Accordingly, as shown by example for the hydraulic device 12 embodiment of FIG. 9, during cyclic operation of the cam 122, the arrangement SEC B is configured by the open state of its respective flow control valve 36 to send fluid from the common input gallery 90 to the common first output gallery 240 by way the input passage 130 and the passage 260. Thus the arrangement SEC B does send fluid out of the first output port 24, while the cam 122 rotates, and thus powers or otherwise hydraulically drives the load 14. In other words, arrangement SEC B of FIG. 9, as it is in the open state, would be considered as one of the arrangements of the hydraulic device 12 that is a cylinder 120 "in demand". Similarly, arrangement SEC A of FIG. 9, as it is in the closed state, would be considered as one of the arrangements of the hydraulic device 12 that is a cylinder 120 not "in demand".

Thus, as described above, the hydraulic device 12 embodiment shown in FIG. 9 would have only one piston 110-cylinder 120 arrangement SEC B supplying the load 14 (see FIG. 1) via the first output port 24 (i.e. the flow control valve 36 associated with the arrangement SEC B is in the open state). As discussed, the piston 110-cylinder 120 arrangement SEC A would be inhibited from supplying the first output port 24 by the respective flow control valve 36 (in the closed state) associated with the arrangement SEC A. In other words, the passages 130,260 of arrangement SEC A are inhibited from supplying fluid from the common input gallery 90 to the common first output gallery 240, while the input passages 130,160 of arrangement SEC B are allowed to supply fluid from the common input gallery 90 to the common first output gallery 240, thus configuring the hydraulic device 12 as having only one of a pair of piston 110-cylinder 120 arrangements (i.e. SEC A and SEC B) supplying output hydraulic fluid to the first output port 24 (which subsequently supplies the load 14 via the work leg 16a of the hydraulic fluid conduits 16). As shown in FIG. 9, the piston 110 of the arrangement SEC A is coupled to the cam 122, i.e. piston surface 122b and cam surface 122a are in contact with one another and as such the piston 110 of arrangement SEC A does reciprocate within its cylinder 120, however its cylinder output is directed to the common secondary output gallery 40. Further, the piston 110 of the arrangement SEC B is coupled to the cam 122, i.e. piston surface 122b and cam surface 122a are in contact with one another and as such the piston 110 of arrangement SEC B does reciprocate within its cylinder 120, however its cylinder output is directed to the common first output gallery 240.

Figure 10:
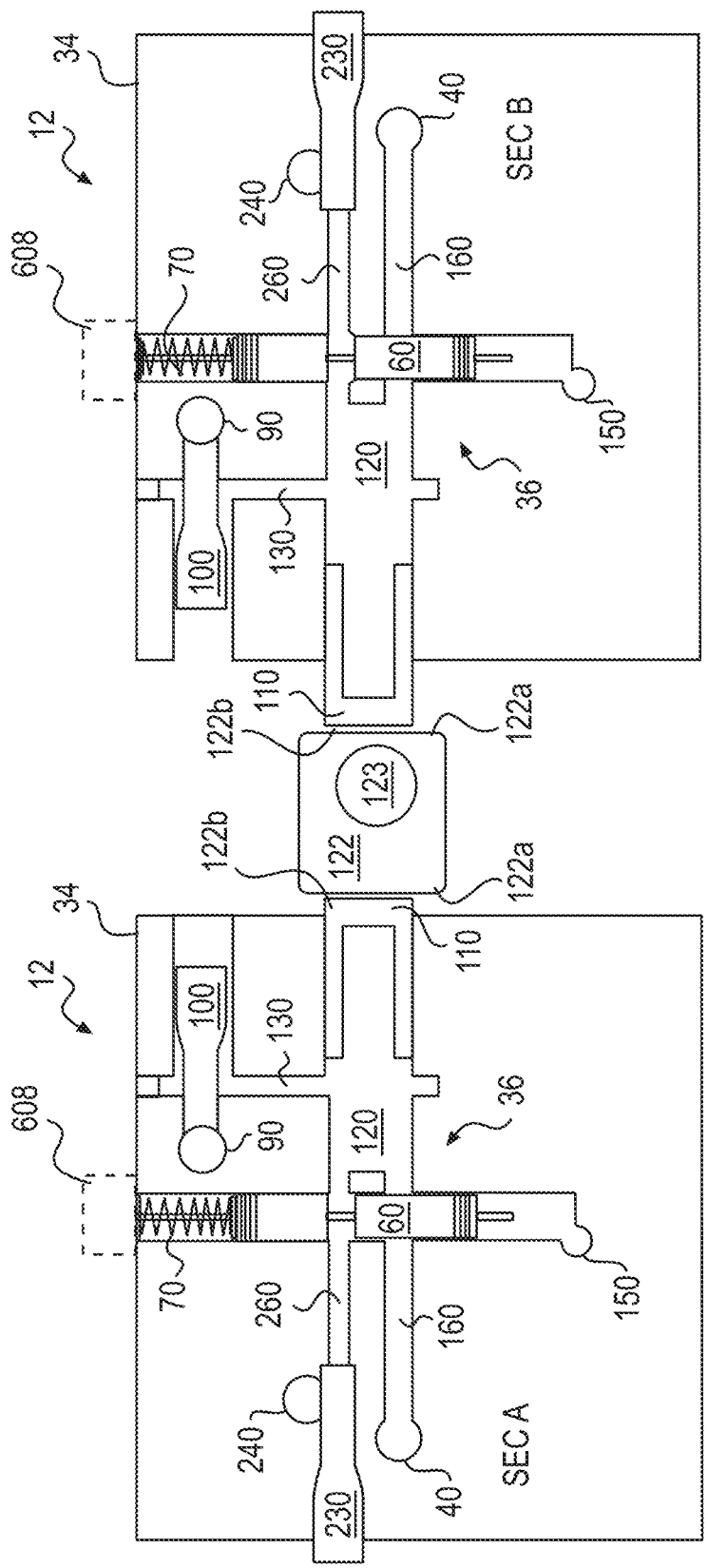
FIG. 10 is a view of the hydraulic device of FIG. 9 with both arrangements in an open mode.

Referring to FIG. 10, shown is a further operational mode of the hydraulic device of FIG. 9, such that both the arrangement SEC A and the arrangement SEC B are supplying hydraulic fluid to the first output port 24 (see FIG. 1), in view of the flow control valve 36 of the arrangement SEC A is in the open state, as is the flow control valve 36 of the arrangement SEC B. Accordingly, it is recognized that in the operational mode of FIG. 10 provides double the flow of hydraulic fluid out of the first output port 24, as compared to the operational mode shown in FIG. 9.

In view of FIGS. 9 and 10, these can be used to describe two different case scenarios. The first case scenario is where the hydraulic device 12 is operating at a reduced output mode (as shown by FIG. 9) and then the hydraulic device 12 gets a pressure signal P (via fluid pressure sensing line—see FIG. 1) that changes the state of the flow control valve 36 of arrangement SEC A from the closed state to the open state. Once that change of state occurs, then the hydraulic fluid would flow via input passage 130 of arrangement SEC A into the corresponding cylinder 120 and then out of the passage 260 into the common first output gallery 240. Fluid filling the cylinder 120 of arrangement SEC A would push the corresponding pistons 110 against the cam surfaces 122a of cam 122, in order for both the pistons 110 of the arrangements SEC A and SEC B to reciprocate as directed by the rotating cam 122. This would, in effect transform the operational mode of the hydraulic device 12 from that shown in FIG. 9 to that shown in FIG. 10. Accordingly, the receipt of the pressure signal P, and resulting change in state of the flow control valve 36 of arrangement SEC A, provides for an increase in volume output of fluid via the first output port 24, as the flow of fluid from arrangement SEC A is now joined to that of the flow of fluid from arrangement SEC B to the common first output gallery 240. The second case scenario is where the hydraulic device 12 is operating at an increased output mode (as shown by FIG. 10) and then the hydraulic device 12 gets the pressure signal P (via fluid pressure sensing line 32—see FIG. 1) that changes the state of the flow control valve 36 of arrangement SEC A from the open state to the closed state. Once that change of state occurs, then the hydraulic fluid would flow via bypass passage 160 (instead of passage 260) of arrangement SEC A into the corresponding common second output gallery 40.

This would, in effect transform the operational mode of the hydraulic device 12 from that shown in FIG. 10 to that shown in FIG. 9. Accordingly, the receipt of the pressure signal P, and resulting change in state of the flow control valve 36 of arrangement SEC A, provides for a decrease in volume output of fluid via the first output port 24. It is recognized that for a multi piston 110-cylinder 120 arrangement hydraulic device 12 (i.e. having more than 2 piston 110-cylinder 120 arrangements) the number of piston 110-cylinder 120 arrangements operating (i.e. coupled to the cam 122 and thus their output connected to the common first output gallery 240) or inactive (i.e. also coupled to the cam 122 while their output connected to the common second output gallery 40) can be two or more, depending upon the number of piston 110-cylinder 120 arrangements available. For an example 5 arrangement hydraulic device 12 (e.g. 2 arrangements outputting to common first output gallery 240 and 3 arrangements outputting to common second output gallery 40, 1 arrangement outputting to common first output gallery 240 and 4 arrangements outputting to common second output gallery 40, 5 arrangements outputting to common first output gallery 240 and 0 arrangements outputting to common second output gallery 40, etc.). Depending upon the pressure signal P, respective ones of the arrangements can be either coupled to the common first output gallery 240 (thus directing output to the first output port 24) or coupled to the common second output gallery 40 (thus directing output towards the second output port 26 or recycling between sequential cylinders 120 via the common second output gallery 40).

Figure 11:
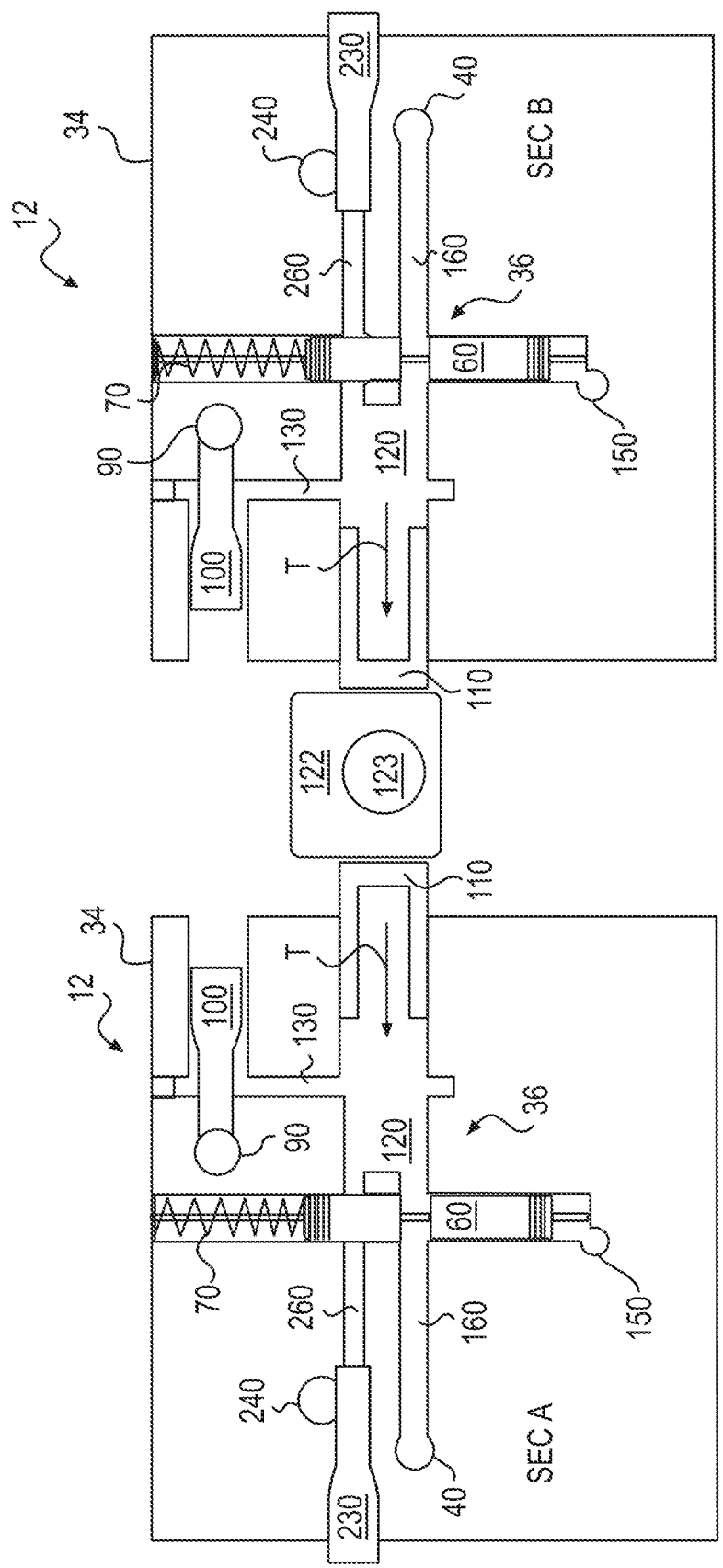
FIG. 11 is a view of the hydraulic device of FIG. 9 with both arrangements in a closed mode.

Referring to FIG. 11, shown is the configuration where a pair of the piston 110-cylinder 120 arrangements are sequentially coupled (e.g. via the motion of the cam 122) to the common second output gallery 40, such that each is associated with their flow control valve 36 in the closed state. For example, the piston 110 of arrangement SEC A is in the process completing its travel T in the cylinder 120 (e.g. travelling towards top dead center towards the bypass passage 160) and thus outputting fluid from its cylinder 120 via bypass passage 160 to the common second output gallery 40. In turn, the piston 110 of arrangement SEC B is in the process of beginning its travel T in the cylinder 120 (e.g. travelling towards bottom dead center away from the bypass passage 160) and thus inputting fluid to its cylinder 120 via bypass passage 160 from the common second output gallery 40. In other words, as both of the pistons 110 of the arrangements SEC A and SEC B are coupled to the motion of the cam 122, the fluid output of one cylinder 120 becomes the fluid input (i.e. is recycled internally within the housing 34) of the another cylinder 120 via the common secondary output gallery 40, for those cylinders 120 in sequence with one another as coupled via the cam 122.

In this manner, it is recognized that as shown in FIG. 1, any hydraulic fluid leaving the hydraulic device 12 can be through the work leg 16a of the hydraulic fluid conduits 16 (e.g. via the load 14) or can be through the cooling (also referred to as bypass) leg 16b of the hydraulic fluid conduits 16 (e.g. via the heat exchanger 28). In the embodiment shown in FIG. 9, it is further recognized that not all of the fluid entering the common second output gallery 40 would leave the housing 34 via the second output port 26, rather some of the fluid entering the common secondary output gallery 40 would be recycled internally in the housing 34 between sequential piston 110-cylinder 120 arrangements (for those considered in the closed state) via this same common secondary output gallery 40 (see FIG. 11). As discussed above, the heat exchanger 28 can be connected directly between the secondary output port 26 and the input port 22, such that any fluid flowing through the heat exchanger 28 can exit the hydraulic device 12 via the secondary output port 26 and flow directly back to the input port 22 via the bypass leg 16b as shown, i.e. in this case bypassing the load 14 as well as bypassing the reservoir 20. Further, it is recognized that the output of the heat exchanger 28 can be dumped directly to the reservoir 20 first (see optional ghosted conduit 16e), before being fed back to the input port 22 via the charge pump 30. As before, the pressure relief valve 29 can be connected to the relief line 16c, for use when there is a considered oversupply of hydraulic fluid to the hydraulic device 12 (i.e. when the additive flows of fluid from both the heat exchanger 28—as exiting a common secondary output gallery 40, see FIG. 9—combine with the fluid flow from the charge pump 30 as obtained from the reservoir 20).

As discussed above, the flow of hydraulic fluid directed towards the second output port 26, by way of the common second output gallery 40, can exit via the second output port 26 through cooling leg 16b (see FIG. 1) and redirected into the common input gallery 90 for subsequent use by any of the piston 110-cylinder 120 arrangements coupled to the motion of the cam 122. For example, for any coupled piston 110-cylinder 120 arrangements (see arrangement SEC A and SEC B of FIG. 9,11 having their flow control valves 34 in the closed state), any fluid flowing first in and then out of the common second output gallery 40 would be able to flow in a recycled fashion (internal to the housing 34) via the passage 160 towards the cylinder 120 considered just downstream of the cylinder 120 that just emptied into the common secondary output gallery 40. In other words, referring again to FIG. 11, the arrangement SEC A would first begin/continue discharge of fluid from its cylinder 120 via its passage 160 to the common secondary output gallery 40. Simultaneously, the cylinder 120 of arrangement SEC B (also in the close state) downstream of the arrangement of SEC A would draw fluid from the common secondary output gallery 40, via its passage 160, and thus into its cylinder 120. It is recognized that if the amount of fluid entering the cylinder 120 of arrangement SEC B is less than what is required via movement of the piston 110, fluid can also be inputted into the cylinder 120 of arrangement SEC B via its passage 130 coupled to the common input gallery 90.

In this way, subject to any excessive pressure in the bypass leg 16b, any hydraulic fluid exiting (via the common secondary output gallery 40) by the secondary output port 26 would be cooled and thus fed back to the input port 22 (via common input gallery 90) of the hydraulic device 12, recognizing that any hydraulic fluid flowing in the bypass leg 16b bypasses the load 14 in when exiting (via the secondary output port 26) and subsequently reentering (via the input port 22) the hydraulic device 12.

In view of the above, it is recognized that any hydraulic fluid flowing between the output port(s) 24,26 and the input port 22 in a path that bypasses the fluid reservoir 20 would be considered as a closed loop operation of the hydraulic device 12. Further, it is recognized that any hydraulic fluid flowing between the output port(s) 24,26 and the input port 22 in a path that goes through the fluid reservoir 20 would be considered as an open loop operation of the hydraulic device 12. Further, it is recognized that any hydraulic fluid flowing between adjacent/sequential arrangements (see FIG. 11) in a path that bypasses the secondary output port 26 altogether (i.e. does not exit the housing 34 and instead is recycled internally) would be considered as a closed loop operation of the hydraulic device 12. Accordingly, it is recognized that, except when the pressure relief valves 29 are utilized, the hydraulic device of FIGS. 1,9,10,11 can be operated as a closed loop hydraulic device 12.

Further to the above, it is also recognized that the common input gallery 90 (of the input port 22) of the hydraulic device 12 can be supplied or otherwise supplemented by a combination of fluid flows, i.e. fluid flow from the work leg 16a that is leaving the load 14, fluid flow supplied from the reservoir 20 by the charge pump 30, fluid flow from the bypass (or cooling) leg 16b exiting the heat exchanger 28 and/or fluid flow that is recycled via the common secondary output gallery 40 for sequential piston 110-cylinder 120 arrangements having their flow control valves 36 in the closed state. An advantage of this multi stream fluid flow to any of the piston 110-cylinder 120 arrangements coupled to the common input gallery 90 is that the charge pump 30 volume output can be reduced, as the flow from the charge pump 30 will be supplemented by the fluid flows exiting the output port(s) 24,26 that bypass the reservoir 20, as described above and shown with reference to FIG. 1, as well as those that are fed recycled fluid via the common secondary output gallery 40 as descried above. In other words, depending upon the configuration of the system 10 (including the pressure and fluid flow demands of the load 14, the size of the charge pump 30 can be reduced and thus provide cost savings for the equipment and operation of the system 10. It is also recognized that there can be more than one charge pump 30, to account for when there is not enough closed loop flow of the fluid to the piston 110-cylinder 120 arrangements via the leg(s) 16a,b and/or the common secondary output gallery 40, and thus the difference must be made up from that fluid available from the reservoir 20.

Referring again to FIGS. 1 and 9, the operation of the flow control valves 36 is now described, in view of the sensed pressure signal P received via the pressure sensing line 32.

One embodiment of the flow control valve 36 is as a spool valve, such that the valve components 36' include a control cylinder 61 having a shuttle valve 60 having a body 62. The shuttle valve 60 is configured to reciprocate within the control cylinder 61, dependent upon a pressure signal P available at common sensing gallery 150, which is fluidly connected to the work leg 16a (between the load 14 and the first output port 24) by pressure sensing line 32—see FIG. 1. The body 62 is also biased by biasing element 70 in order to block any of the passages 160,260 (thus providing either a closed state or an open state respectively of the flow control valve 36). The body 62 has a work port 64, such that the common input gallery 90 is fluidly coupled to the common second output gallery 40 when the work port 64 is aligned with the bypass passage 160—see arrangement SEC A of FIG. 9. Further, when the work port 64 is aligned with the bypass passage 160, then the work port 64 is misaligned with the passage 260 and therefore the common input gallery 90 is fluidly blocked from fluid communication with the common first output gallery 240 (via the reciprocating piston 110-cylinder 120 arrangement)—see arrangement SEC A. Alternatively, the body 62 has the work port 64, such that the common input gallery 90 is fluidly blocked from the common second output gallery 40 when the work port 64 is misaligned with the bypass passage 160 and therefore aligned with the passage 260—see arrangement SEC B of FIG. 9. Further, when the work port 64 is misaligned with the bypass passage 160, then the work port 64 is aligned with the input passage 260 and therefore the common input gallery 90 is fluidly coupled for fluid communication with the common first output gallery 240 (via the reciprocating piston 110-cylinder 120 arrangement)—see arrangement SEC B. When the passage 160,260 is blocked, it is the body 62 of the flow control valve 36 that inhibits fluid communication between the cylinder 120 and the respective common output gallery 40,240.

In terms of how the port 64 switches between aligned and misaligned with respect to the passages 160,260, this depends upon the strength of the pressure signal P in view of the strength of the bias exerted by the biasing element 70, as provided by a pressure sensing device 151 (see FIG. 1). In a first embodiment, the pressure sensing device 151 can be provided hydraulically, such that the pressure sensing device 151 includes the pressure sensing line 32 connected between the work leg 16a and the common sensing gallery 150. As such, the hydraulic fluid from the work leg 16a (as positioned between the load 14 and the first output port 24) would pressurize the pressure sensing line 32 and fill the common sensing gallery 150. If the magnitude of the pressure of the hydraulic fluid on the common sensing gallery 150 is greater than the magnitude of the bias provided by the biasing element 70, the body 62 would shift in the control cylinder 61 against the bias and thus allow a portion of the fluid from the common sensing gallery 150 (as obtained from the work leg 16a) to fill the control cylinder 61 until the port 64 switches and becomes aligned with the passage 260 (and thus the body 62 blocks the passage 160).

For example, if the pressure signal P at the common sensing gallery 150 is greater than the strength of the biasing element 70 for the flow control valve 36, then the body 62 would be forced against the bias of the biasing element 70 and this would result in a shift of the body 62 within the control cylinder 61 in a direction towards the biasing element 70. If the magnitude of the pressure signal P is large enough to overcome the bias exerted by the biasing element 70, then the body 62 would shift in the control cylinder 61 such that the work port 64 would become aligned with the passage 260 and would become misaligned with the bypass passage 160 (see SEC B of FIG. 2). Referring further to FIG. 9, the same pressure signal P (experienced by the arrangement SEC B) is also present at the common sensing gallery 150 for the control cylinder 61 of the arrangement SEC A. In this case, the magnitude of the pressure signal P is less than the bias exerted by the biasing element 70 on the body 62 of the arrangement SEC A, and as such the body 62 remains shifted in the control cylinder 61 away from the biasing element 70 and towards the common sensing gallery 150. In this biased position for the arrangement SEC A, the work port 64 is (e.g. remains/becomes) misaligned with the passage 260 and is (e.g. remains/becomes) aligned with the bypass passage 160. In terms of the pair of biasing elements 70 shown in FIG. 9, the biasing element 70 of arrangement SEC A can be of a stronger magnitude (i.e. stronger biasing force) than the biasing element 70 of arrangement SEC B. In other words, each of the plurality of biasing elements for the respective piston 110-cylinder 120 arrangements (of the hydraulic device 12) would have different biasing strengths. In this example, the operation of the flow control valves 36 is coordinated without use of triggering devices 601 (further described above).

Accordingly, in the embodiment described in FIG. 9, the biasing elements 70 are of differing strengths (reflective of different magnitudes of the pressure signal P provided by the common sensing gallery 150 during differing operational/load states of the load 14), such that it is recognized that as the magnitude of the pressure signal P increases (say from a lower fluid pressure towards a higher pressure), serially more and more of the biasing elements 70 will be overcome and thus their corresponding flow control valves 36 will change from the closed state to the open state. Similarly, as the biasing elements 70 are of differing strengths (reflective of different magnitudes of the pressure signal P provided by the common sensing gallery 150 during differing operational/load states of the load 14), it is recognized that as the magnitude of the pressure signal P decreases (say from a higher fluid pressure towards a lower pressure), serially more and more of the biasing elements 70 will be released and thus their corresponding flow control valves 36 will change from the open state to the closed state. In this manner, the hydraulic device 12 is operated as a "cylinder on demand" hydraulic device 12, depending upon the states of the respective flow control valves 36 associated with each of the piston 110-cylinder 120 arrangements of the multi-piston 110-cylinder 120 hydraulic device 12. As discussed above, it is recognized that the operation states of the flow control valves 36 are dependent upon the fluid pressure (of the load 14), as sensed via the pressure sending line 32 (reflected by the pressure signal P).

For example, for a 5 arrangement hydraulic device 12, a biasing element 70 for the first arrangement would have a biasing strength less than a biasing element 70 for the second arrangement, the biasing element 70 for the second arrangement would have the biasing strength less than a biasing element 70 for the third arrangement, the biasing element 70 for the third arrangement would have the biasing strength less than a biasing element 70 for the fourth arrangement, and the biasing element 70 for the fourth arrangement would have the biasing strength less than a biasing element 70 for the fifth arrangement. In other words, the biasing element 70 for the fifth arrangement would have the strongest bias force and the biasing element 70 for the first arrangement would have the weakest bias force. In this 5 arrangement example, the as the pressure signal P increased progressively from a strength only just greater than the biasing force of the first arrangement towards a strength equal to or greater than the biasing force for the fifth arrangement, the hydraulic device 12 would have the first arrangement coupled to the first output port 24 and then iteratively the second arrangement followed by the third arrangement followed by the fourth arrangement followed by the fifth arrangement becoming coupled to the first output port 24 until the hydraulic device 12 had all 5 arrangements combined to pump their respective cylinder 120 volumes to the common first output gallery 240, and thus out of the first output port 24 and to the load 14 via the work leg 16a. In other words, each of the piston 110-cylinders 120 would become "on demand", as their respective flow control valves 36 changed from the closed state to the open state.

For the operation of the flow control valves 36, in terms of the body 62 of the control valve 60 shifting back towards the common sensing gallery 150, as the magnitude of the pressure signal P drops, any fluid present in the control cylinder 61 (used in the earlier displacement of the body 62 against the bias of the biasing element 70) would be forced to return to the common sensing gallery 150 and ultimately back into the work leg 16a via the pressure sensing line 32. This return of the fluid back into the common sensing gallery 150 would be caused by the bias of the biasing element 70 overcoming the relatively weaker pressure (i.e. reflective of pressure signal P) of the hydraulic fluid in the control cylinder 61.

Referring again to FIG. 9, as one embodiment of the flow control valve, the control cylinder 61 has one end 61a having the common sensing gallery 150 and another end 61b having the biasing element 70, such that the body 62 is positioned in the control cylinder 61 between the common sensing gallery 150 and the biasing element 70.

It is recognized as a clear advantage, e.g. in hydraulic device 12 configuration complexity and/or cost (e.g. manufacturing and/or maintenance), that the fluid pressure sensing device 151 is driven by directly sensing the fluid pressure itself, as generated by operation of the load 14. This direct sensing of the actual fluid pressure in the work leg 16a is considered preferential over any other type of non-fluid based measurement (e.g. torque). In particular, the response time of needed changes to the flow output via the output port 24 and/or output port 26 (as dictated by the opening/closing of respective ones (or multiples) of the flow control valves 36) is considered best when the actual fluid pressure of the work leg 16a is sensed (i.e. via fluid pressure sensing line 32), rather than introducing undesirable time lag into the control of the output flow of the hydraulic device 12 operation when using non-fluid based sensing systems. Clearly, it is the ability of the fluid pressure sensing line 32 being directly coupled to the work leg 16a, between the load 14 and the output port 24, that contributes to desired advantages of using the invention as described and claimed herein.

Figure 12:
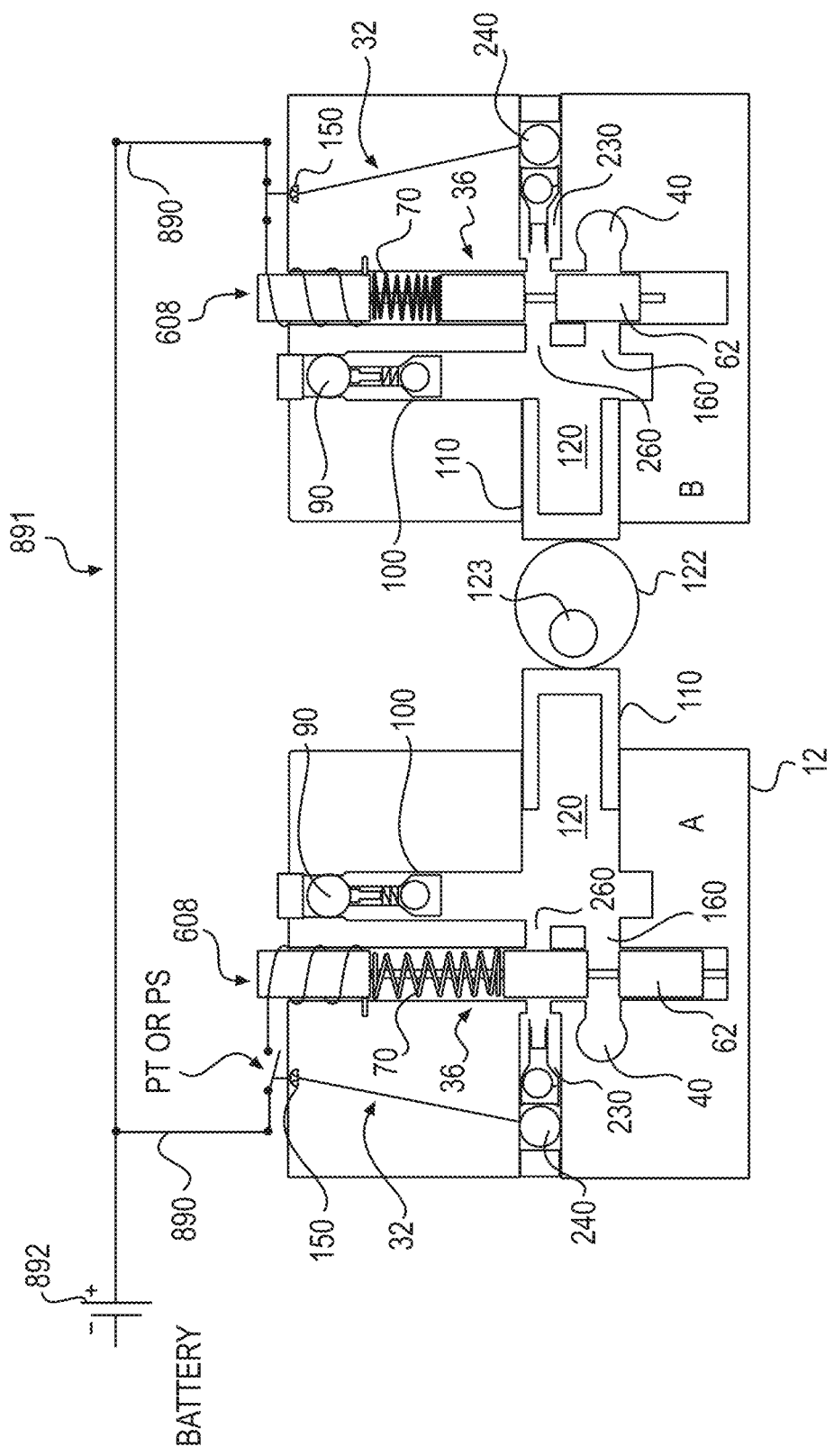
FIG. 12 is a further embodiment of the flow control valve of any of FIGS. 2-11.

Referring to FIG. 12, shown is an example embodiment of the system 10 of FIG. 1. In particular, shown is the hydraulic device 12 having arrangement SEC A with the flow control valve 36 in the closed position and the arrangement SEC B with the flow control valve 36 in the open position. As such, any fluid entering the input gallery 90 of arrangement SEC B will be directed by the reciprocation of its piston 110 via the flow control valve 36 into the first output gallery 240. As such, any fluid entering the input gallery 90 of arrangement SEC A with be directed by the reciprocation of its piston 110 via the flow control valve 36 into the second output gallery 40. In terms of operation of the flow control valves 36, the solenoids 608 are connected to a control circuit 891 having a battery 892 and electrical connections 890 to the battery 892. Also, the control circuit 891 includes the pressure transducers PT or pressure switches PS, which are part of the pressure sensing line 32 coupled to the common sensing gallery 150 (see FIG. 1 also by example). As an embodiment, the control circuit 891 can be considered as part of the fluid pressure sensing device 151 (see FIG. 1).

Upon activation of the pressure transducer PT (or pressure switch PS), the solenoid 608 drives the control body 62 of the flow control valve 36 to the open position (see arrangement SEC B), against the bias of the solenoid return spring 70 (e.g. biasing element 70). In the event that the pressure transducer PT (or pressure switch PS) is not activated, the solenoid 608 retains the control body 62 of the flow control valve 36 in the closed position (see arrangement SEC A), via the bias of the solenoid return spring 70 (e.g. biasing element 70). Thus, activation of the pressure transducer PT or the pressure switch PS, can be used to activate the respective flow control valve 36 and thus place the flow control valve 36 in the open position. The pressure transducer PT (or pressure switch PS) of each of the flow control valves 36 can be set for a different selected pressure threshold, in order to provide for the cylinder on demand operation of the hydraulic device 12 as further described above.

It is also recognized that any of the pressure transducers PT of the hydraulic device 12 can be activated before the fluid pressure in the fluid pressure sensing line 32 reaches the set pressure threshold of the respective pressure transducer PT of the respective flow control valve 36. In this case, the control circuit 891 can be used to activate selected ones of the arrangements SEC A, SEC B, etc., by an operator of the hydraulic device 12, before the fluid pressure in the work leg 16a (see FIG. 1) reaches the particular set pressure threshold of the flow control valve(s) 36. This can be performed, in order to request a particular number of cylinders 120 on demand, e.g. in the event that a "maximum" or otherwise increased flow is desired from the hydraulic device 12 at fluid pressures lower than would otherwise dictate that number of cylinders 120 being demanded, i.e. configured so as to drive hydraulic fluid towards the first output gallery 240 and thus into the work leg 16a (see FIG. 1). For example, in the event that the hydraulic device 12 of FIG. 12 (SEC A closed and SEC B open) is operating at a reduced pressure (i.e. the pressure in the pressure sensing line 32 is less than the set pressure threshold of the flow control valve 36 of SEC A) and the operator decides that more fluid output from the first output port 24 (see FIG. 1) is desired, the operator can active manually (e.g. as an override of the pressure transducer PT of SEC A) the control circuit 891 in order to energize the solenoid 608 of SEC A (see FIG. 10 in ghosted view) and thus change the state of the flow control valve 36 of SEC A from closed to open. Once open, then both of the cylinders 120 of SEC A and SEC B would be directing hydraulic fluid towards the first output gallery 240, as shown in FIG. 10. As such, in the event that the operator of the hydraulic device actives manually (e.g. as the override of the pressure transducer PT), the control circuit 891 can be used to manually energize one or more of the solenoids 608 and thus change the operation of the hydraulic device 12 from that shown in FIG. 12 to that shown in FIG. 10. It is recognized that the change from FIG. 12 to FIG. 10 operation only shows the opening of one flow control valve 36 using the control circuit 891 as an override, however more than one flow control valve 36 can be opened at a time via the manual override capabilities offered by the control circuit 891, as desired.

Similarly, it is also recognized that any of the pressure transducers PT of the hydraulic device 12 can be deactivated after the fluid pressure in the fluid pressure sensing line 32 has reached the set pressure threshold of the respective pressure transducer PT of the respective flow control valve 36. In this case, the control circuit 891 can be used to deactivate selected ones of the arrangements SEC A, SEC B, etc., by an operator of the hydraulic device 12, after the fluid pressure in the work leg 16a (see FIG. 1) has reached the particular set pressure threshold of the flow control valve(s) 36. This can be performed, in order to decommission a particular number of cylinders 120 on demand, e.g. in the event that a "minimum" or otherwise decreased flow is desired from the hydraulic device 12 at fluid pressures higher than would otherwise dictate that number of cylinders 120 being demanded, i.e. configured so as to drive hydraulic fluid towards the second output gallery 40 and thus towards the bypass leg 16b and/or recirculation/recycling from one cylinder 120 to the next cylinder 120 via the bypass gallery 40 (see arrangement SEC A and SEC B of FIG. 9,11 having their flow control valves 36 in the closed state such that any fluid flowing first in and then out of the common second output gallery 40 would be able to flow in a recycled fashion (internal to the housing 34) via the passage 160 towards the cylinder 120 considered just downstream of the cylinder 120 that just emptied into the common secondary output gallery 40). For example, in the event that the hydraulic device 12 of FIG. 10 (SEC A open and SEC B open) is operating at an increased pressure (i.e. the pressure in the pressure sensing line 32 is greater than the set pressure threshold of the flow control valves 36 of SEC A and SEC B) and the operator decides that less fluid output from the first output port 24 (see FIG. 1) is desired, the operator can active manually (e.g. as an override of the pressure transducer PT of SEC A) the control circuit 891 in order to de-energize the solenoid 608 of SEC A (see FIG. 12) and thus change the state of the flow control valve 36 of SEC A from open to closed. Once closed, then only the cylinders 120 of SEC B would be directing hydraulic fluid towards the first output gallery 240, as shown in FIG. 12. As such, in the event that the operator of the hydraulic device activates manually (e.g. as the override of the pressure transducer PT), the control circuit 891 can be used to manually de-energize one or more of the solenoids 608 and thus change the operation of the hydraulic device 12 from that shown in FIG. 10 to that shown in FIG. 12. It is recognized that the change from FIG. 10 to FIG. 12 operation only shows the closing of one flow control valve 36 using the control circuit 891 as an override, however more than one flow control valve 36 can be closed at a time via the manual override capabilities offered by the control circuit 891, as desired.

It is also recognized that hydraulic device 12 can be operated as a motor, rather than as a pump. In this example, the hydraulic device 12 would be operated such that the cam 122 and thus shaft 123 would be driven by the reciprocation of the piston(s) 110 in their corresponding cylinder(s) 120, such that the reciprocation of the piston(s) 110 would be used to receive work from the fluid flowing from the input gallery 90 to the output gallery(ies) 240,40 (i.e. the pistons 110 would be driven by the fluid flow between the galleries 90, 40, 240). For example, as a motor, the hydraulic device 12 could be used as the load 14 in the system 10 of FIG. 1.

It is also recognized that hydraulic device 12 can be operated as a pump, rather than as a motor. In this example, the hydraulic device 12 would be operated such that the cam 122 and thus shaft 123 would drive the reciprocation of the piston(s) 110 in their corresponding cylinder(s) 120, such that the reciprocation of the piston(s) 110 would be used to impart work to the fluid flowing from the input gallery 90 to the output gallery(ies) 240,40 (i.e. the pistons 110 would drive the fluid flow between the galleries 90, 40, 240).

It is also recognized that in an alternative embodiment, the solenoid 608 can be configured so that a deactivation (open pressure switch PS) of the solenoid 608 can provide for the return spring 70 to drive the control body 62 towards the open position, while an activation (closed pressure switch PS) of the solenoid 608 can provide for the return spring 70 to drive the control body 62 towards the closed position, as desired.

It is also recognized that rotation of the shaft 123 can be done clockwise or counterclockwise.

Figure 13:
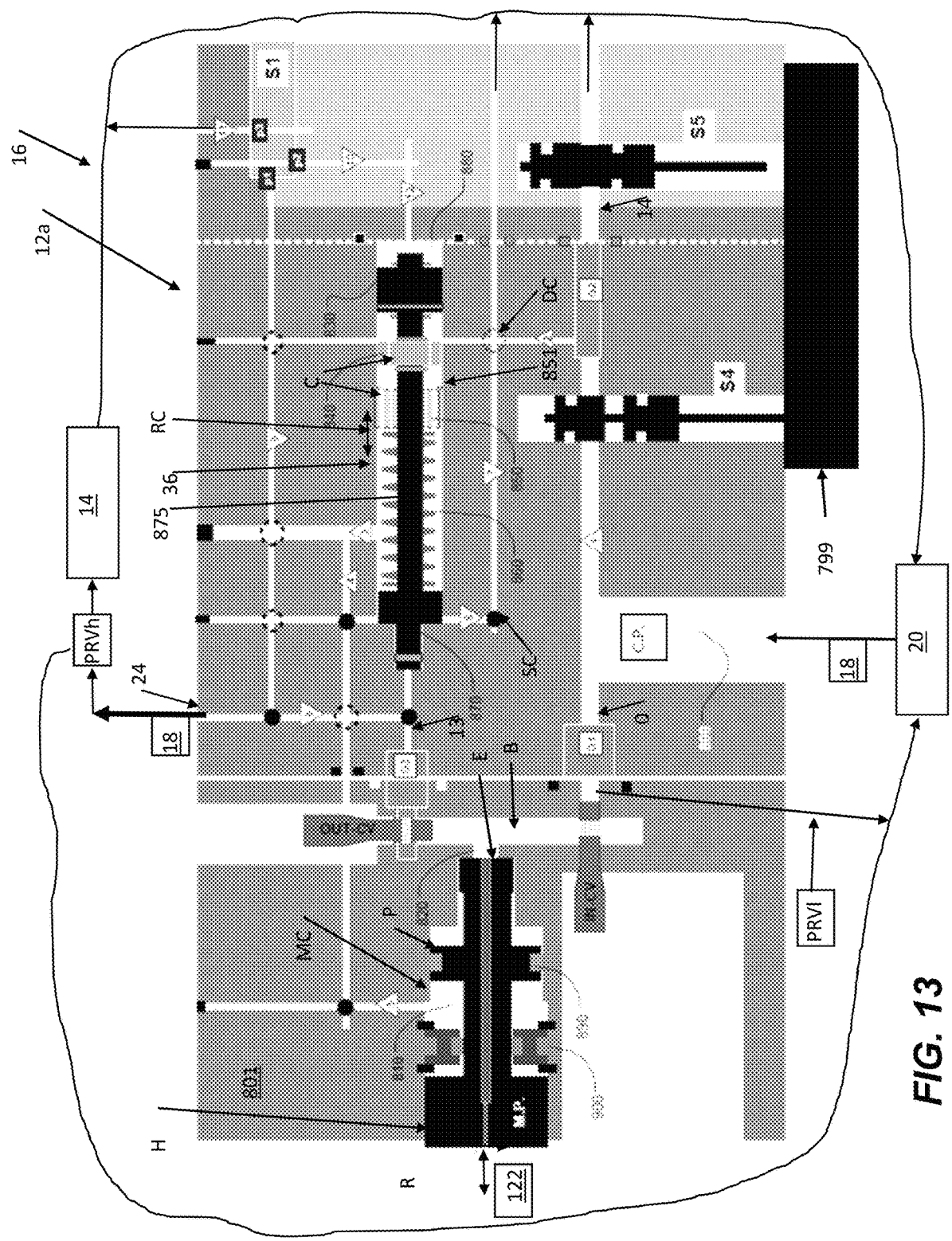
FIGS. 13-17 are further embodiments of the hydraulic device of FIG. 1.

Referring to FIGS. 1 and 13, shown is a further hydraulic device 12a (e.g. pump) connected to the load 14 (e.g. a hydraulic motor—see FIG. 1) by a plurality of hydraulic fluid conduits 16. Referring to FIG. 13, the hydraulic device 12a receives the hydraulic fluid 18 from the reservoir 20 (e.g. containing a charge pump CP) via input port 800 (akin to input port 22 of FIG. 1) of a device housing 801. The output of the hydraulic fluid 18 from the hydraulic device 12a is via the output port 24 connected to a common output gallery G3, via leg 8. It is recognized that contrary to the hydraulic device 12 shown in FIG. 1, the hydraulic device 12a of FIG. 13 only has one output port 24 (of the housing 801) connected to the common output gallery G3. It is assumed that during operation of the hydraulic device 12a, the fluid pressure in the common output gallery G3 will always be higher than the fluid 18 pressure of the reservoir 20 (e.g. the pressure in the reservoir 20 could be atmospheric pressure).

As further described below, the charge pump CP can be fixed to the input shaft 123 so as the main piston(s) MP begin to reciprocate R, a related volume will fill the various sections of the hydraulic device 12a. It is possible to use the charge pump's CP volume at lower pressures to provide the start-up volume of fluid 18 used to produce a head pressure within the common outlet gallery G3 and therefore, actuate at least one main piston MP that is fitted with a low resistance (e.g. calibrated) return spring 860.

At start-up then, if there is no head pressure, charge pump CP volume can return to the reservoir 20 (e.g. also referred to as tank) via outlet port 24. If there is a head pressure at the common outlet gallery G3, one or more of the main pistons MP can be engaged according to head pressure of the fluid 18 to provide a corresponding increase (e.g. proportional to the volume of the main cylinder MC—of the newly engaged main piston MP) in the working outlet volume of the hydraulic device 12a. As such, the hydraulic device 12a can be configured as a cylinder on demand device, such that a working state of any of the main pistons MP (coupled to their corresponding flow control valve 36) depends upon the position (lock or unlock) of each of a plurality of flow control valves 36.

The charge pump CP can be used to provide some nominal flow in the common outlet gallery G3 which results in at least one main piston MP being activated (i.e. reciprocating R), however, the charge pump CP is preferably intended to provide all inlet fluid volume and can operate at some nominal low pressure, while outlet fluid pressure is provided via reciprocation R of the multiple main pistons MP, depending upon the position of their respective control valve 36. It is also possible to have at least one main piston MP active on a fulltime basis, so as the hydraulic device 12a begins to operate so will the charge pump CP and the at least one main piston MP. For example, the at least one full time main piston MP would not need to have any flow control valve 36 associated therewith. It should be noted that, it will be the main piston (s) MP used to provide the working volume of the fluid 18 at increased loads as supplied by the load 14. It is recognized that the charge pump CP provides the inlet or intake stroke volume of the fluid 18 to the common inlet gallery G1, and if solenoid S4 is opened, volume is also sent into the second common gallery G2.

Further to the above, it is recognized that the common inlet gallery G1 is used to supply fluid 18 from the reservoir 20 to all of the respective bores B of the main pistons MP. It is recognized that the common outlet gallery G3 is used to receive fluid 18 from all of the respective bores B of the main pistons MP. It is recognized that the second common gallery G2 is used to supply fluid 18 from the reservoir 20 to all of the respective flow control cylinders 880 of the control valves 36 (recognizing that the position of each support 840 with respect to the corresponding leg 2 can either facilitate or inhibit fluid communication between the second common gallery G2 and the respective flow control cylinder 880).

The hydraulic device 12a has a number of control valves S1, S4, S5 (e.g. solenoids, shuttle valves, etc.), whose operation are further defined below. It is recognized that the control valves S1, S4, S5 can be contained within the housing 801 (e.g. as shown in FIG. 13), can be contained in a separate header 799 attached to the housing (see FIG. 13, 20) or any combination thereof, so long as the function of the control valves S1,S4,S5 is provided as described below. For ease of description only, the control valves S1, S4, S5 are referred to as solenoid valves S1, S4, S5 hereafter.

It is recognized that the housing 801 can have a dedicated corresponding set of solenoid valves S4, S5, such that activation of the dedicated solenoid valves S4, S5 can influence the lock state of any of the flow control valve(s) 36 depending upon the fluid 18 pressure in the common output gallery G3 or the state of one of more solenoid valve(s) S1, as further described below. Further, solenoid valve S4 can influence flow to second common inlet gallery G2 and solenoid valve S5 can influence flow to the reservoir 20 if solenoid valve S5 is open and if solenoid valve S5 closed, then solenoid valve S5 influences flow up leg 2 into the flow control valve 36. All the flow control valves 36 can be put into the locked position by default (due to the biases of the biasing elements 860). As the pressure rises, in the common output gallery G3, then the biases(s) of the flow control valves will be overcome (in sequence) and the respective flow control valves 36 when overcome will move into the unlock position. In other words, when solenoid valve S4 is open and solenoid S5 is closed, then the second output gallery G2 is supplied with fluid 18 and therefore when any of the flow control valves 36 is positioned in the lock position, then fluid 18 will travel from the second output gallery G2 and into the first portion 810 in order to put the main piston MP in the lockdown state. On the contrary, when the flow control valve 36 is moved into the unlock position, leg 2 is blocked and then the fluid in the first portion 810 can be drained via the legs 5,6,7 to the reservoir 20.

It is recognized that each main piston MP can have a dedicated corresponding solenoid valve S1, such that activation of the dedicated solenoid valve S1 influences the lock state of a corresponding control valve 36. It is recognized that a group of main pistons MP (e.g. two or more) can have a shared corresponding solenoid valve S1, such that activation of the shared solenoid valve S1 influences the lock state simultaneously of a plurality of control valves 36. Further, a high (e.g. first) pressure relief valve PRVh can be provided in the fluid circuit of the conduits 16, to limit pressure in the conduits 16 during operation of the hydraulic device 12a.

The hydraulic device 12a has a plurality of main cylinders MC (e.g. see FIG. 17) with corresponding plurality of main pistons MP (e.g. see FIG. 17) for receiving the hydraulic fluid 18 from the input port 800 of the housing 801, via a common input gallery G1, as well as for outputting the hydraulic fluid 18 via the common output gallery G3 to the output port 24 of the housing 801. Each of the main cylinders MC are in fluid communication with a corresponding respective bore B (e.g. an input/output bore). In other words, each of the main cylinders MC is in communication with a respective bore B fluidly linked to the common output gallery G3 (e.g. multiple bores B feed the common output gallery G3). It is noted that FIGS. 13-16 have one main piston MP and one main cylinder MC coupled to their bore B, shown for ease of illustration only, showing changes of operational state for a particular main piston MP and its associated flow control valve 36 (also referred to as control valve 36). Each of the main pistons MP is driven (i.e. reciprocates R) by a corresponding cam 122 (situated on a drive shaft D), when the main piston MP is coupled to its corresponding cam 122 (see FIG. 17). Similarly, when in lockdown mode during rotation of the driveshaft D, each of the lock down state main pistons MP is inhibited from reciprocation R (by the corresponding cam 122) as the main piston MP is decoupled from its corresponding cam 122 (see FIG. 13).

In particular, as described above with reference to the hydraulic device 12, the main pistons MP of the hydraulic device 12a are of a fixed stroke length, thus the magnitude of stroke during reciprocation R remains constant. In other words, the hydraulic device 12a can be referred to as a fixed displacement device on a main piston MP per main piston MP basis. It is only through coupling or decoupling of selected main piston(s) MP from the cam(s) 122 (via actuation of the corresponding control valve(s) 36), that variable displacement (i.e. fluid 18 output) is facilitated. In other words, increased fluid 18 flow from the reservoir 20 through to the output port 24 can be performed by the hydraulic device 12a, depending upon the number of main pistons MP reciprocating in the unlocked state (e.g. see FIG. 14). As discussed, the amount of fluid 18 flow produced at the output port 24 will depend upon the speed (e.g. under influence of the speed of the cam shaft 123) of the reciprocation R of the working main piston(s) MP as well as the number of working main pistons MP (i.e. those main pistons MP which are in their unlock state).

As such, each of the main cylinders MC is fluidly connected to their bore B, which is situated between an input check valve IN-CV and an output check valve OUT-CV. In other words, any fluid 18 entering bore B (via the input check valve IN-CV) from the input common gallery G1 can only exit the bore B (via the output check valve OUT-CV) to the common output gallery G3. As such, any fluid 18 in the common output gallery G3 cannot enter the bore B via the output check valve OUT-CV and any fluid 18 in the bore B cannot enter the common input gallery G1 via the input check valve IN-CV.

The main piston MP axially reciprocates R (when in the unlocked state) within its main cylinder MC. The main cylinder MC is partitioned into a first portion 810 and a second portion 820, such that second portion 820 is in fluid communication with the bore B and the first portion 810 is in fluid communication with a second common input gallery G2, as further described below. A partition wall P is used to separate the first portion 810 from the second portion 820. The partition wall P is connected to the main piston MP and as such reciprocates R in conjunction with the main piston MP. A set of seals 890 can be used to inhibit fluid 18 from communicating between the portions 810, 820 during reciprocation of the main piston MP. Also provided can be a support 900 (e.g. including thrust bearings), for supporting the main piston MP with respect to the main cylinder MC during reciprocation R. Further, the main piston MP has a piston end E exposed to the fluid 18 in the bore B. For example, when reciprocating R (see FIG. 14), the main piston P facilitates the movement (e.g. acting as a pump piston) of fluid 18 into and out of the second portion 820 in conjunction with the fluid 18 present in bore B. Alternately, for example, when not reciprocating R and thus in lockdown mode (see FIG. 13), the main piston P does not facilitate flow of fluid 18 into and out bore B (which is instead driven by the input of fluid 18 through common input gallery G1 via the charge pump CP). As such, during lockdown mode, the main piston MP does not assist the charge pump CP in driving the fluid 18 between common input gallery G1 and common output gallery G3. However, when in the unlocked state and thus reciprocating R, the main piston MP does assist the charge pump CP in driving the fluid 18 between common input gallery G1 and common output gallery G3.

In general reciprocation R of the main piston MP, it is clear that a surface area of the partition P (exposed to fluid 18 in the first portion 810 provided by the charge pump CP via the inlet 800) is greater than the surface area of the piston end E (also exposed to fluid 18 provided by the charge pump CP via the inlet 800 and into the bore B). Thus, as further described below, for equal fluid 18 pressures in the first portion 810 and the second portion 820, as provided by the charge pump CP, the main piston MP will be forced towards the bore B and away from the cam 122 (see FIG. 13) positioned adjacent to a head H of the main piston MP. As such, the main piston MP would be considered in lockdown mode and thus decoupled from the cam 122.

The housing 801 also contains a number of flow control valves 36 for reciprocation/movement RC in a corresponding flow control cylinder 880. For example, each main piston MP/main cylinder MC arrangement would be paired with a corresponding control valve 36/control cylinder 880 arrangement. As further described below, the control valve 36 controls (depending upon its position within the control cylinder 880) the input of fluid 18 between the second common gallery G2 (when the control valve 36 is in a lock position—see FIG. 13) and the first portion 810 of the main cylinder MC or output of fluid 18 between the first portion 810 and the reservoir 20 (when the control valve 36 is in an unlock position—see FIG. 14).

The control valve 36 has a main body 875 having a first end 870 and a second end 830. The first end 870 is fluidly coupled to the common output gallery G3 by leg 13 (e.g. a leg can also be referred to as a fluid conduit). As such, any fluid 18 pressure in the common output gallery G3 (i.e. representative of the fluid 18 pressure present in the output port 24 as experienced by the load 14 via fluid lines 16—see FIG. 1) acts on the first end 870 of the control valve 36. The second end 830 is in fluid communication with fluid pressure presented to the control cylinder 880 via leg 12, as further described below.

The body 875 is supported within the control cylinder 880 by a support 840 and a support 850, such that support 840 can be connected to the body 875 and thus reciprocate RC with the body 875 within the control cylinder 880. The support 850 can be coupled to the walls of the control cylinder 880 (e.g. via retaining ring 851), and thus remain stationary during the reciprocation RC. Positioned between the first end 870 and the support 850 is a biasing element 860 (e.g. spring such as shown by reference numeral 70 in FIG. 2), which biases the position of the body 875 in the control cylinder 880 towards the common output gallery G3 (e.g. the lock position). As further discussed below, fluid pressure (of a sufficient pressure value) in the common output gallery G3 can overcome the bias of the biasing element 860 and thus act to move the first end 870 away from the common output gallery G3 (e.g. the unlock position). Further, the supports 840, 850 have conduits C for facilitating fluid communication of fluid 18 along the control cylinder 880 between leg 3 (fluidly coupled to the first portion 810) and leg 2 (fluidly coupled to the second common gallery G2), as further described below.

Referring again to FIG. 13, in general, solid circles SC denote fluid communication is enabled between adjacent legs (e.g. between leg 7 and leg 6), while dotted circles DC denote fluid communication is blocked between adjacent legs (e.g. between leg 2 and leg 7). For example, as shown in FIG. 13, fluid 18 traveling in leg 2 can only go into and out of the control cylinder 880 and the second common gallery G2, while the fluid 18 is therefore blocked from entering/exiting leg 7. Similarly, as shown in FIG. 13 for example, fluid 18 traveling in leg 3 can only go into and out of the control cylinder 880 and leg 4, while the fluid 18 is therefore blocked from entering/exiting leg 9.

Further to the above, in general the housing 801 has a number of legs, in order to facilitate communication of the fluid 18 between the common input gallery G1, the second common gallery G2, the control cylinder 880, the first portion 810, the common output gallery G3, the output port 24, and the reservoir 20. Depending upon the state of solenoid valves S1, S4, S5 (e.g. open or closed), as well as the position of the control valve 36 in the control cylinder 880 (as further described below), the fluid 18 will be communicated in the leg(s) accordingly in order to place the main piston MP in either the lockdown state or the unlocked state.

Referring again to FIG. 13, the fluid 18 can be communicated between the common output gallery G3 and the first end 870 via leg 13. Further, the fluid 18 can be communicated between the common output gallery G3 and the output port 24 via legs 13, 8. Further, the fluid 18 can be communicated between the common output gallery G3 and the solenoid S1 via legs 13, 8, 9. Further, the fluid 18 can be communicated between the common output gallery G3 and the second end 830 via legs 13, 8, 9, 10,12. Further, the fluid 18 can be communicated between the bore B and the input put port 800 via the common input gallery G1 using leg 0. Further, the fluid 18 can be communicated between the control cylinder 880 (for any fluid 18 between the ends 870, 830) and the first portion 810 via legs 3, 4, 5. Further, the fluid 18 can be communicated between the input port 800 and the second common gallery G2 via leg 1. Further, the fluid 18 can be communicated between the input port 800 and the reservoir 20 (via second common gallery G2) via legs 1, 14. Further, the fluid 18 can be communicated between the control cylinder 880 and the second common gallery G2 via leg 2. Further, the fluid 18 can be communicated between the first portion 810 and the reservoir 20 (via the control cylinder 880) via legs 5, 6, 7.

In view of the above, in terms of enabling or inhibiting flow of the fluid 18 between adjacent legs can be provided based on the position of the control valve 36 in the control cylinder 880. For example, in FIG. 13, the control valve 36 is positioned towards the common output gallery G3 (e.g. the bias of the biasing element 860 overcomes the pressure of the fluid 18 in the common output gallery G3 acting on the first end 870), such that the first end 870 blocks fluid 18 communication between the leg 6 and the leg 4, thus inhibiting any of the fluid 18 from travelling between the first portion 810 and the reservoir 20 via leg 7. For example, further in FIG. 13, the control valve 36 is positioned towards the common output gallery G3 (e.g. the bias of the biasing element 860 overcomes the pressure of the fluid 18 in the common output gallery G3 acting on the first end 870), such that the support 840 does not block fluid 18 communication between the leg 2 and the leg 3 (via the control cylinder 880), thus facilitating travel of the fluid 18 from between the first portion 810 and the second common gallery G2 via legs 2,3,4,5.

Figure 14:
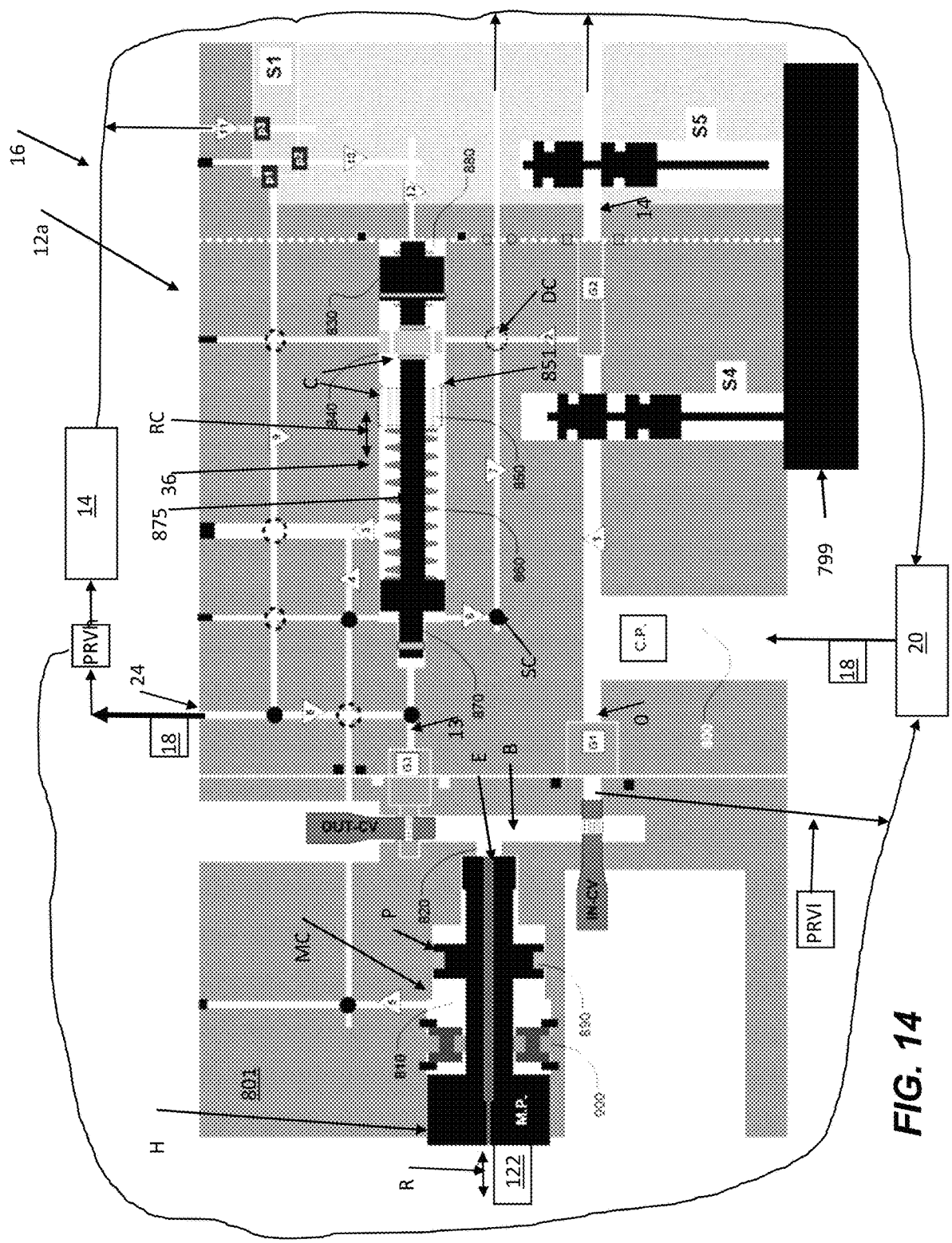

Further, for example, in FIG. 14, the control valve 36 is positioned away from the common output gallery G3 (e.g. the pressure of the fluid 18 in the common output gallery G3 acting on the first end 870 overcomes the bias of the biasing element 860), such that the first end 870 does not block fluid 18 communication between the leg 6 and the leg 4, thus facilitating any of the fluid 18 to travel between the first portion 810 and the reservoir 20 via legs 5,4,6,7. For example, further in FIG. 14, the control valve 36 is positioned away from the common output gallery G3 (e.g. the pressure of the fluid 18 in the common output gallery G3 acting on the first end 870 overcomes the bias of the biasing element 860), such that the support 840 blocks fluid 18 communication between the leg 2 and the leg 3 (via the control cylinder 880), thus inhibiting travel of the fluid 18 from between the first portion 810 and the second common gallery G2 via legs 2,3,4,5. As such, it is recognized that in order to put the main piston MP in the lockdown state, the solenoid S4 would be opened (and solenoid S5 closed) in order to facilitate communication of the fluid 18 from the input port 800 through the second common gallery G2 and via the legs 2,3,4,5 (and conduits C) and into the first portion 810, in order to shift the main piston MP towards the bore B and thus into the lockdown state (e.g. the main piston becomes decoupled from the cam 122—see FIG. 13).

Lockdown State of the Main Piston MP

Accordingly, in view of the above as per FIG. 13, when the control valve 36 is positioned towards the common output gallery G3, fluid 18 communication can be enabled (based on positioning of the solenoids S4, S5) between the second common gallery G2 and the first portion 810. In this manner, the pressure of the fluid 18 in the bore B is the same as the pressure of the fluid 18 in the first portion 810 (i.e. that of the inlet port 880 fluid pressure), and because of the difference in surface areas of the main piston end E and the main partition P, the main piston MP is moved towards the bore B and thus is retained in this position (i.e. locked) while the fluid 18 is retained in the first portion 810 (as facilitated by the position of the control valve 36 in the locked position). In this lockdown state, the reciprocation R of the main piston MP in the main cylinder MC is inhibited. Thus in this lockdown state, the main piston MP of the hydraulic device 12a is in a pressure sensing mode, such that the main piston MP of the hydraulic device 12a remains in this lockdown state until the fluid 18 pressure in the common output gallery G3 rises and thus overcomes the bias of the biasing element 860, see FIG. 14. In the lockdown state, with the reciprocation R inhibited, the fluid 18 can continue to enter bore B via common input gallery G1 (supplied via the input port 800 under influence of the charge pump CP) and then exit out common output gallery G3 (and thus to the output port 24). However, when there are a limited number of working main pistons MP, then the hydraulic device 12a could have excess fluid volume in the first common input gallery G1. In this circumstance, fluid 18 can exit the common input gallery G1 via a low PSI setting (e.g. 200 psi) of a further pressure relief valve PRVI. For example, assuming only 50% of the main pistons MP are working and 50% are not; any charge pump CP extra volume cannot exit via the related outlet check valve CV as the head pressure is assumed higher than what the charge pump CP can deliver. Therefore, the (e.g. 1-200 PSI) pressure relief valve PRVI is overcome and any considered excess fluid 18 of the flow returns to the reservoir 20 from the first common input gallery G1. Further, in the case where there are no main pistons MP working (they are in lockdown state), the solenoids S4 and S5 can be opened and the flow generated by the charge pump CP returns to the reservoir 20. It is recognized that any fluid flow that exits via the pressure relief valve PRVI and/or enters the second common input gallery G2 will therefore not enter the bore(s) B. In order to facilitate entering the lockdown state, e.g. from unlocked to locked, solenoid S4 can be opened and thus facilitate communication of fluid 18 between the input port 800 and the second common gallery G2. Further, fluid 18 communication between the flow control cylinder 880 and the second common gallery G2 is enabled by the position of the support 840. Further, fluid communication between the second common gallery G2 and the reservoir 20 is inhibited since the solenoid S5 can be closed (see FIG. 15). Further, fluid communication between the common output gallery G3 and the second end 830 is inhibited since the solenoid S1 is closed (thus port P1 is cut off from port P2 and fluid 18 is inhibited from filling the control cylinder 880 adjacent to the second end 830). As such, port P3 of the solenoid S1 is connected to port P2 and therefore any fluid 18 resident in the control cylinder 880 adjacent to the second end 830 is facilitated to go to the reservoir 20 via legs 12, 10, 11.

Unlocked State of the Main Piston MP Due to Pressure Sensing

Referring to FIG. 14, when the control valve 36 is positioned away from the common output gallery G3, fluid 18 communication can be disabled (based on positioning of the solenoids S4, S5) between the second common gallery G2 and the first portion 810. In this manner, the pressure of the fluid 18 in the common output gallery G3 overcomes the bias of the biasing element 860. Due to the fluid 18 pressure in the bore B (produced by the charge pump CP connected to the inlet port 800, recognizing that as produced by the work the charge pump CP is limited to very low pressure at all time, e.g. 200 PSI or less) being now greater than the pressure of the fluid 18 in the first portion 810, the main piston MP is moved away from the bore B and thus is allowed to reciprocate R in the main cylinder MC due to influence of the cam 122 on the piston head H. Accordingly, a pressure rise in bore B can shift the flow control valve 36 away from the common output gallery G3 which allows for the flow control valve 36 to open leg 6 and close leg 2. In this position referred to as the unlock position, the flow control valve 36 allows the first portion 810 to drain to the reservoir 20 past the legs 5, 4, 6, 7. The draining of the first portion 810 allows the incoming volume from charge pump CP to engage the piston MP to the actuator/cam 122.

Accordingly, in this position the fluid 18 is expelled from the first portion 810 (as facilitated by the position of the control valve 36 and the legs 5,4,6,7) during the reciprocation R to the reservoir 20. While in this unlocked state, the hydraulic device 12a remains in a pressure sensing mode, such that the hydraulic device 12a remains in this unlocked state until the fluid 18 pressure in the common output gallery G3 drops and thus the control valve 36 returns to the position shown in FIG. 13 when the bias of the biasing element is strong enough to overcome the reduced pressure of the fluid 18 in the common output gallery G3. In the unlocked state, with the reciprocation R enabled, the fluid 18 continues to enter bore B via common input gallery G1 (supplied via the input port 800 under influence of the charge pump CP) and then exit out common output gallery G3 (and thus to the output port 24) as driven by the reciprocation R of the main piston MP. Further, any fluid 18 communication between the control cylinder 880 and the second common gallery G2 is blocked by the position of the support 840. Further, fluid communication between the second common gallery G2 and the reservoir 20 can be facilitated when the solenoid S5 is open. Further, fluid communication between the common output gallery G3 and the second end 830 is inhibited since the solenoid S1 is closed (thus port P1 is cut off from port P2 and fluid 18 is inhibited from filling the control cylinder 880 adjacent to the second end 830). As such, port P3 of the solenoid S1 is connected to port P2 and therefore any fluid 18 resident in the control cylinder 880 adjacent to the second end 830 is facilitated to go to the reservoir 20 via legs 12, 10, 11.

Thus in view of FIGS. 13, 14, the main piston MC of the hydraulic device 12a is shown in a pressure sensing mode operation, Thus as the fluid 18 pressure rises in the common output gallery G3, the control valve 36 is moved away from the common output gallery G3 (as the fluid 18 pressure counteracts the bias of the biasing element 860) and the main piston MP is allowed to reciprocate R and thus contribute to the pumped fluid 18 flow exiting the common output gallery G3. On the contrary, in the pressure sensing mode, as the fluid 18 pressure drops in the common output gallery G3, the control valve 36 is moved towards the common output gallery G3 (as the fluid 18 pressure is no longer high enough to counteract the bias of the biasing element 860) and the main piston MP is moved towards the bore B and thus decoupled from the cam 122 (i.e. the main piston MP becomes locked and thus does not contribute to the pumped fluid 18 flow exiting the common output gallery G3).

Figure 18:
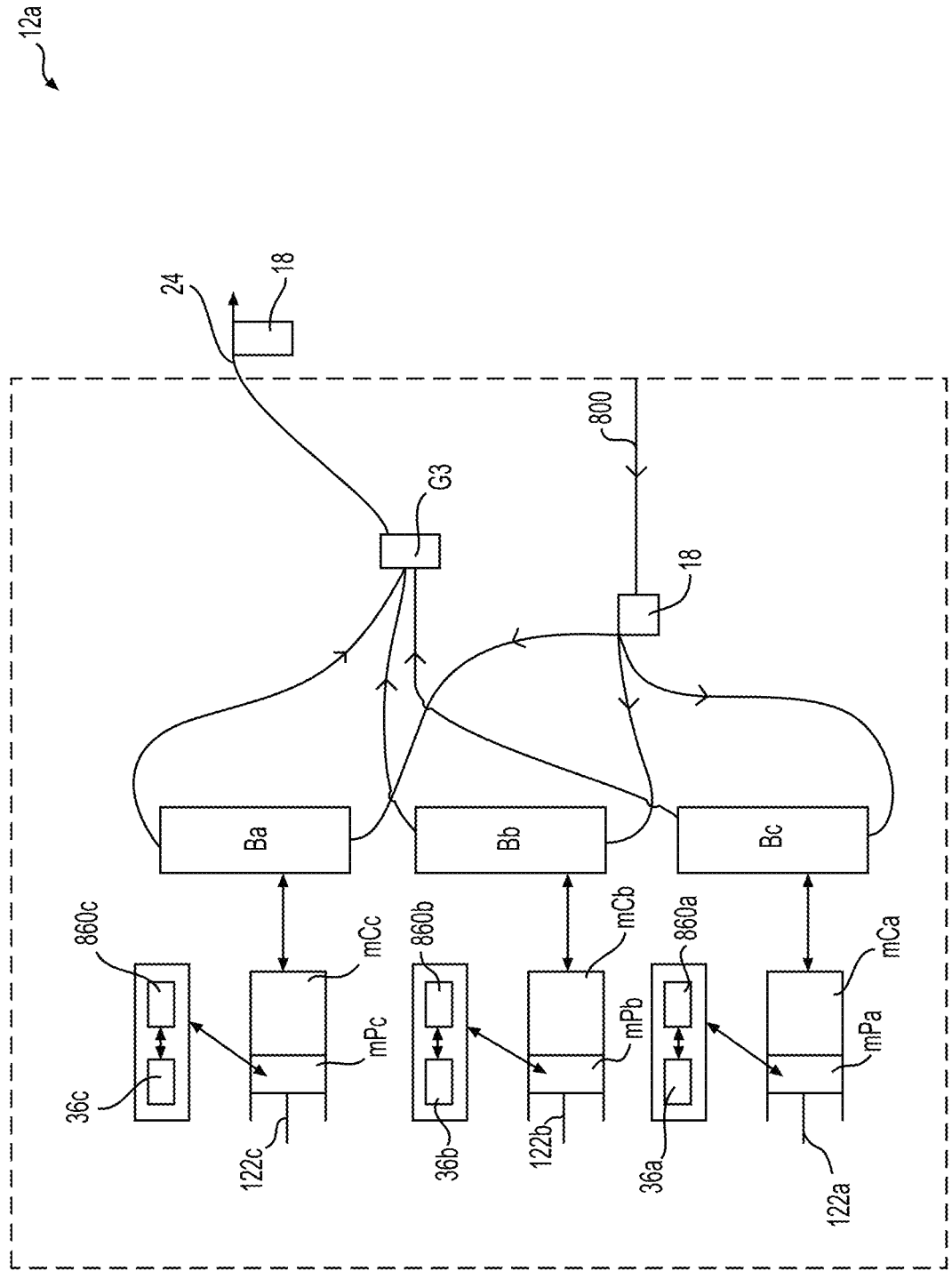
FIG. 18 is an example of a multi-main piston hydraulic device of the device of FIG. 13.

Referring to FIG. 18, due to the different biasing strengths of the biasing elements 860a,b,c for each of the control valves 36a,b,c, e.g. the biasing element 860a is greater than the biasing element 860b, which is greater that the biasing element 860*c* (see FIG. 18 as a descriptive example of a multi-main piston MP hydraulic device 12*a*), for a condition where the fluid 18 pressure of the common output gallery G3 is low and thus cannot overcome any of the biasing elements 860*a*, 860*b*, 860*c*, then the main pistons MPa, MPb, MPc would all be in the lockdown state and thus would be inhibited from reciprocation R. As the fluid 18 pressure rises in the common output gallery G3, first the biasing element 860*c* would be overcome and the control valve 36*c* would open, thus facilitating the unlocking of main piston MPc while the main pistons MPa,b remain locked. As the fluid 18 pressure further rises in the common output gallery G3, then next the biasing element 860*b* would be overcome and the control valve 36*b* would open, thus facilitating the unlocking of main piston MPb while the main piston MPa remains locked. As the fluid 18 pressure further rises in the common output gallery G3, then next the biasing element 860*a* would be overcome and the control valve 36*a* would open, thus facilitating the unlocking of main piston MPa to facilitate all main pistons MPa,b,c reciprocating R and thus contributing to pumping of the fluid 18 through their respective bores Ba,b,c and into the common output gallery G3. Thus, as the fluid 18 pressure rises, more main pistons MP become unlocked and thus available to contribute pumped fluid 18 to the common output gallery G3. Similarly in reverse, as the fluid 18 pressure decreases, first the main piston MPa would become locked as the control valve 36*a* is closed due to the biasing element 860*a*, then next the main piston MPb would become locked as the control valve 36*b* is closed due to the biasing element 860*b*, then next the main piston MPc would become locked as the control valve 36*c* is closed due to the biasing element 860*c*.

Induced Flow State of Hydraulic Device 12*a*

Figure 15:
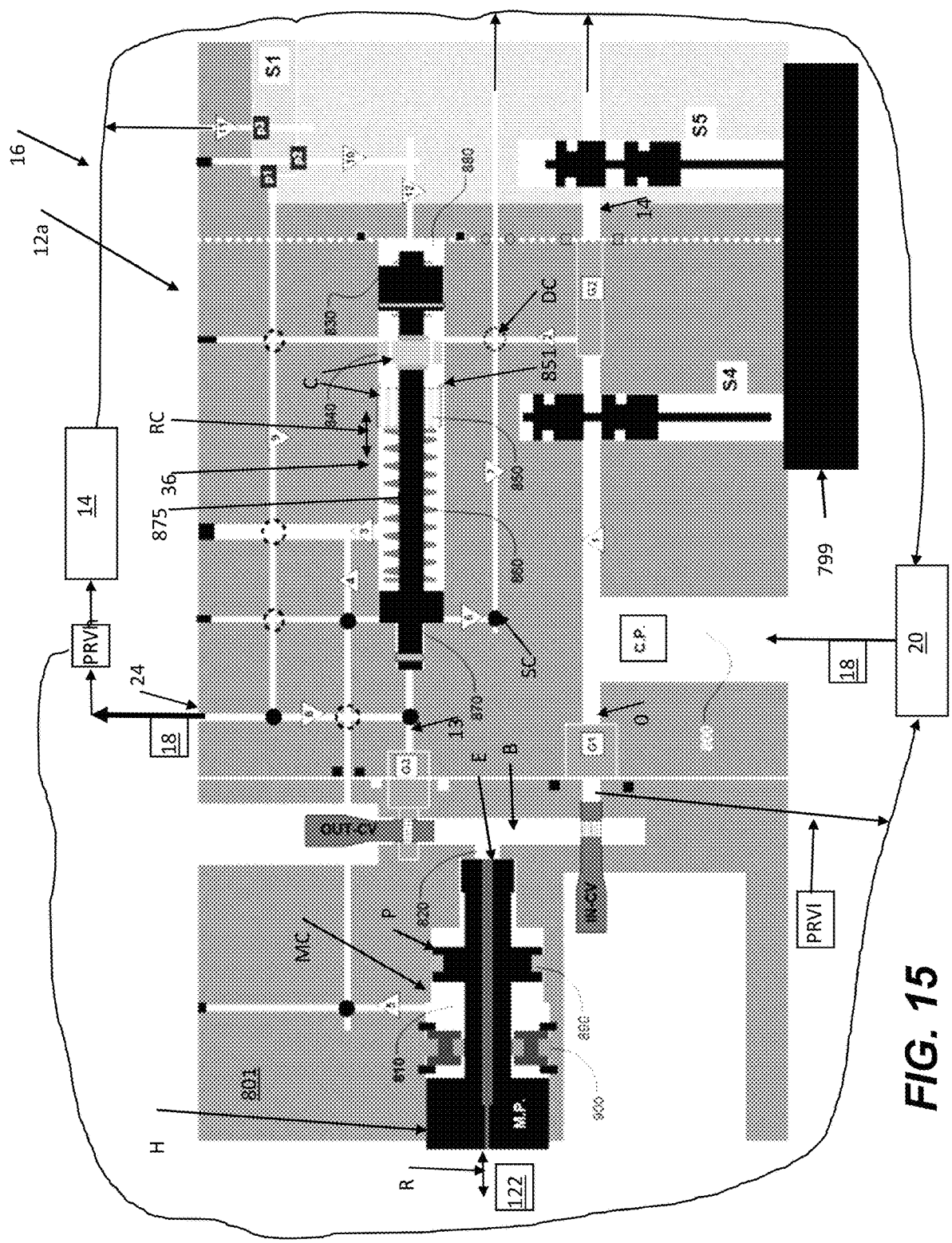

Referring to FIG. 15, shown is an operational state hydraulic device 12*a* where solenoid S1 is activated/opened, thus opening port P1 to port P2 (while closing port P2 from communicating with port P3). In this manner, the fluid 18 communication is facilitated between the common output gallery G3 and the control cylinder 880 adjacent to the second end 830 (via legs 8,9,10,12). This places the fluid 18 pressure acting on first end 870 as similar to the pressure acting on the second end 830. As such, the influence of the biasing element 860 would bias the control valve 36 towards the common output gallery G3 (e.g. combined with the force working on a larger surface area of end 830, this action means the hydraulic device 12*a* can work at high pressure and reduced flow) and thus force the main piston MP into a locked state, irrespective of any magnitude difference between the force exerted on the first end 870 by the pressure of the fluid 18 in the common output gallery G3 and the force exerted by the biasing element 860 opposite thereto. In other words, once solenoid S1 is activated, the control valve 36 will be induced to move towards the common output gallery G3 and thus enable fluid communication between the second common gallery G2 and the first portion 810 (e.g. via legs 5,4,3,2 and the conduits C). It is understood that the strength of the biasing element 860 itself can be used to induce movement of the control valve 36 in order to lock the main piston MP from reciprocating R, once the solenoid S1 is opened. As a further embodiment, the surface area of the second end 830 can be greater than the surface area of the first end 870, e.g. as shown by example, thus promoting movement of the control valve 36 into the lock position in view of the similar fluid 18 pressure at the ends 870,830. Also, as shown, the provision of fluid 18 from the inlet port 800 (used to fill the first portion 810) can be supplied via the second common gallery G2 when the solenoid S4 is open and the solenoid S5 is closed.

It should be recognized that when in the induced state, the main piston MP is in essence decoupled from the ability of fluid 18 pressure to counteract the bias of the biasing element 860, as the fluid 18 pressure supplied to both ends 870,830 is similar (e.g. functionally equal/equivalent). Therefore, the operational advantage of the main piston MP (when in the induced state) is that the main piston MP is decoupled from the cam 122 and thus inhibited from contributing to the flow of the fluid 18 from the output port 24. In this manner, the hydraulic device 12*a* can operate at the same (or higher) pressure and reduced flow volume as compared to operation of the hydraulic device 12*a* when in the pressure sensing mode. In other words, in the case where the main piston MP is in an unlocked state for a specified fluid 18 pressure (i.e. the main piston MP is reciprocating R and thus contributing to the flow volume output from the output port 24 while the solenoid S1 is closed), once the solenoid S1 is opened, the control valve 36 will move to the lock position (as well as the main piston MP itself accordingly) irrespective of the actual value of the fluid 18 pressure experienced by the first end 870 (e.g. even when higher than the actual set bias of the biasing element 860).

Figure 16:
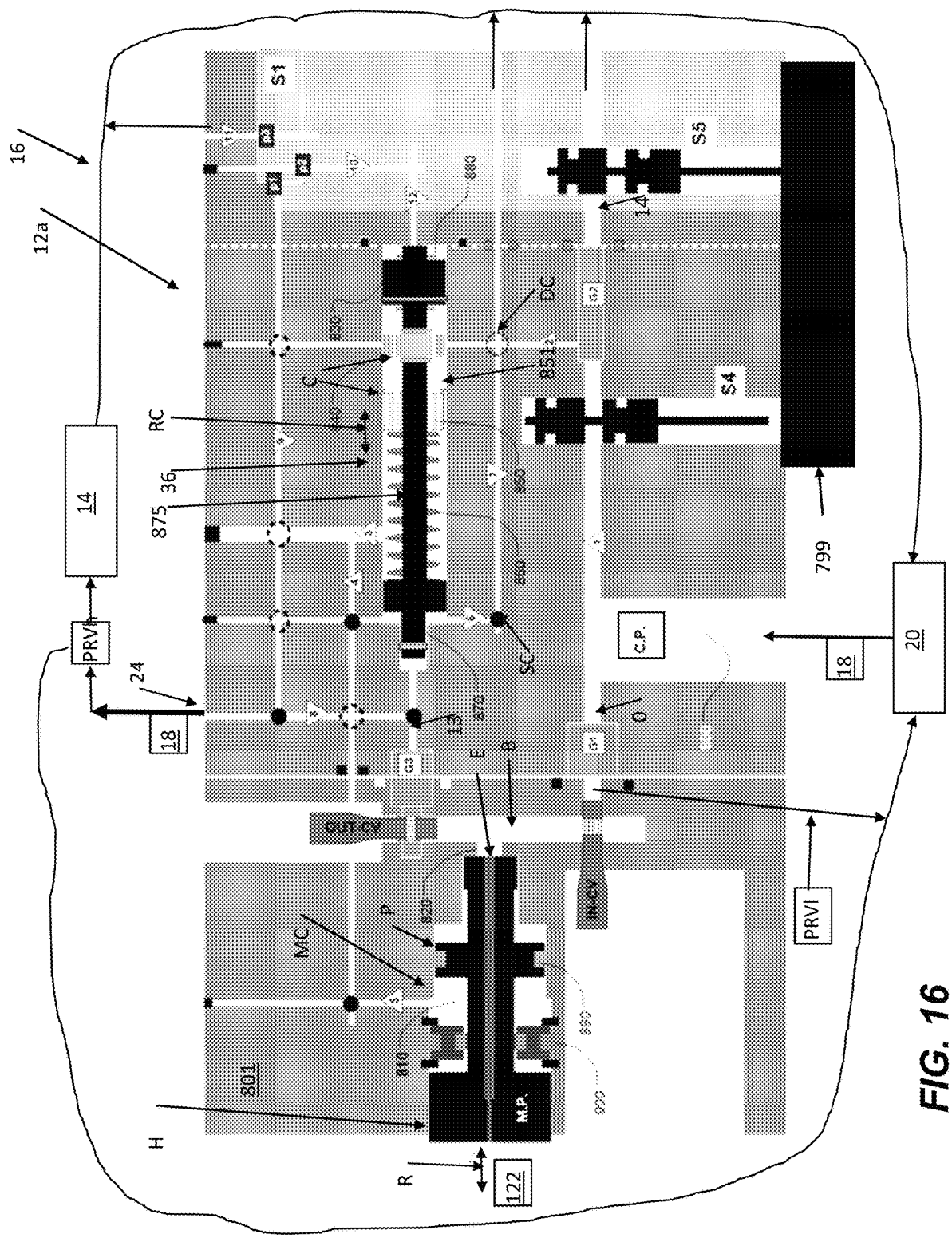

Referring to FIG. 16, shown is where the solenoid S1 of FIG. 15 is shifted from open to closed, thus removing the main piston MP from the induced state and back into the pressure sensing operational state (ability to shift between the positions shown in FIGS. 13,14, depending upon the instantaneous magnitude of the fluid 18 pressure in opposition to the set bias of the biasing element 860). In the case shown in FIG. 16, it is recognized that once the solenoid S1 is closed, the fluid 18 pressure in the common output gallery G3 is at a value higher than the set bias of the biasing element 860 and thus closing of the solenoid S1 resulted in the control valve 36 moving into the unlock position. However, it is also recognized that once the solenoid S1 is closed, the fluid 18 pressure in the common output gallery G3 can be at a value the same or lower than the set bias of the biasing element 860 and thus closing of the solenoid S1 would result in the control valve 36 staying into the locked position.

Figure 17:
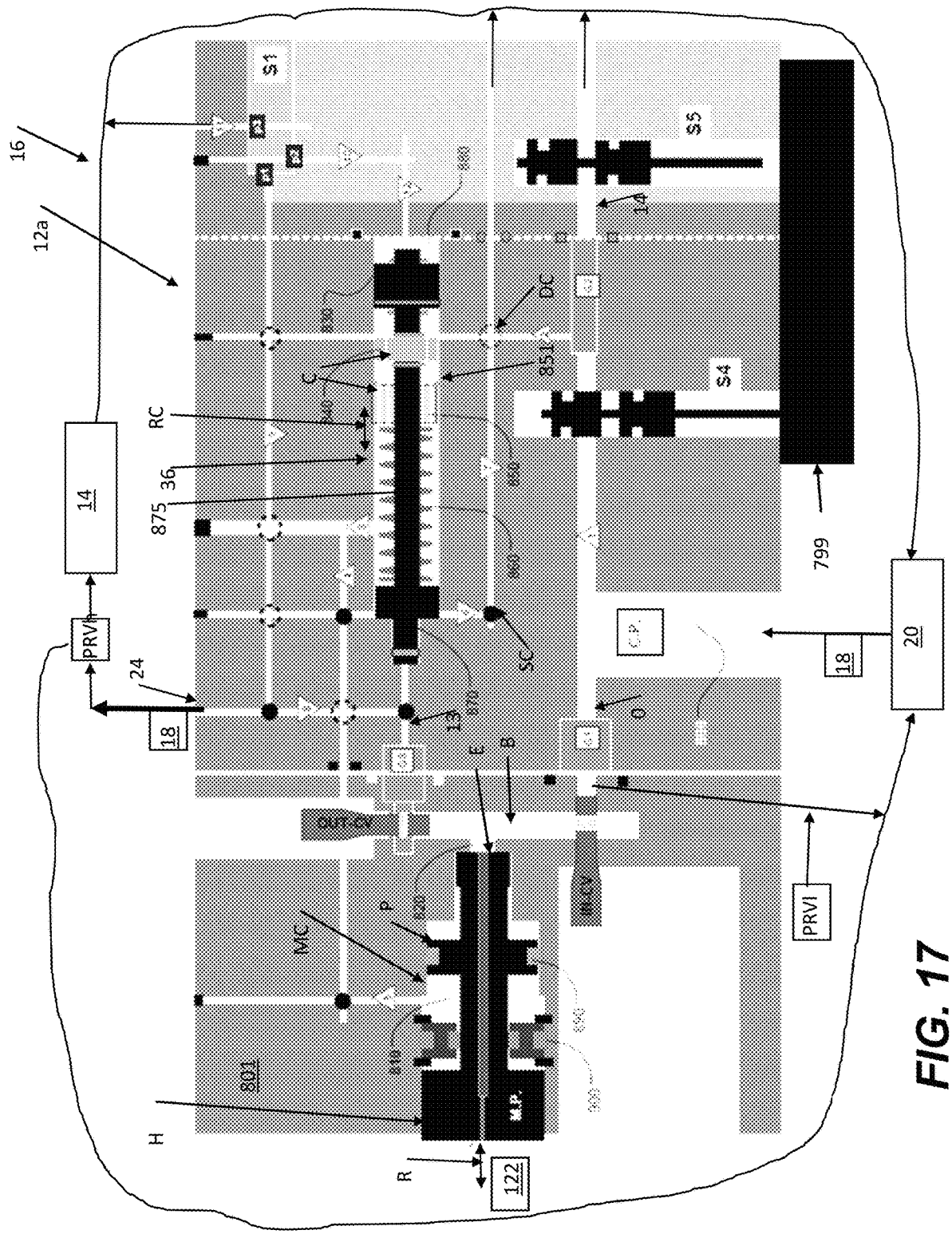

The reciprocation of the pistons MP within their respective cylinders MC can be driven by the cam 122 mounted on the crankshaft 123, see FIG. 17. It is recognized that the pistons MP have a fixed stroke length when reciprocating in their respective bores (i.e. cylinders MC). As such, a distance between a Top Dead Center TDC and Bottom Dead Center BDC (see FIG. 2) remains constant when flow control valves 36 are operated between their lock position and unlock position. The position TDC can be defined as when the piston MP reaches the end of the exhaust stroke for ejecting fluid out of the cylinder MC, and thus the beginning of the intake stroke for injecting fluid into the cylinder MC. The position BDC can be defined as when the piston MP reaches the end of the intake stroke for injecting fluid into the cylinder MC, and thus the beginning of the exhaust stroke for ejecting fluid out of the cylinder MC. The configuration of the piston MP-cylinder MC arrangements can be referred to as an axial configuration.

As such, in view of the above, while work is being done using the fluid 18 from the output port 24, there are many instances when precision and muscle are a must have. To do this, two things can be facilitated, e.g. increased or otherwise maximized output port 24 pressure and lowered/reduced output flow.

Current axial piston pumps can provide this functionality by way of the mechanical compensation system (e.g. via a wobble plate and thus varying the stroke length of the pistons), however this way of pressure compensation is not desired. We have found a different and effective way to provide increased pressures at lower/reduced volumes, made possible by the use of a selectively activated solenoid S1.

For example, the operator of the hydraulic device 12a can choose to slow down speeds for many different reasons, one of which is, lining-up a piece of machinery or a turbine head on a tower and so forth. While the hydraulic device 12a is in operation, it is very likely running at full capacity, to slow the speeds and hold pressure; an operator would do the following to reduce the number of working (e.g. reciprocating R) main pistons MP. Reduce the number of working cylinders 880 by activating solenoid(s) S1 and thus cutting off the ability of the common output gallery G3 pressure to counteract the bias of the biasing element(s) 860 of the control valve(s) 36 (e.g. to influence the lockdown/unlock state of the main piston(s) MP). As such, for each control valve 36 affected by the activated solenoid(s) S1, the control valve 36 is then shifted by spring 860 (as well as pressure from the common output gallery G3) back to the lock position. The closed control valve 36 then results in charge flow into first portion 810 of main piston(s) MP. The main piston(s) MP is therefore, in lockdown state and the output flow of the output port 24 is thereby reduced proportionally to the number of main piston(s) MP locked down. The operation of reducing flow at higher pressure can occur at any RPM of the prime mover, using the solenoid(s) S1.

Fixed Displacement State of the Hydraulic Device 12a

A further fixed displacement state (see FIG. 17) of the hydraulic device 12a can be achieved when the solenoid S4 is closed and solenoid S5 is open. In the fixed displacement state, supply of fluid 18 from the input port 800 to the second common gallery G2 is inhibited, as solenoid S4 closed. Further, the second common gallery G2 is fluidly coupled to the reservoir 20, as the solenoid S5 is open. In this circumstance, all fluid 18 supplied by the charge pump CP is directed to the common inlet gallery G1 and thus to all the main pistons MP. Further, all the main pistons MP would be reciprocating R, as any fluid 18 in the first portion 810 (for each of the main pistons MP) would be allowed to drain to the reservoir 20 when the control valve 36 was in the lock position (e.g. flow from first portion 810 via legs 5,4,3,2 and conduits C to the gallery G2). Alternatively, in the unlock position of the control valve 36, any fluid 18 in the first portion 810 (for each of the main pistons MP) would be allowed to drain to the reservoir 20 (e.g. flow from first portion 810 via legs 5,6,7 to the reservoir 20). Thus when solenoid S4 for each of the main pistons MP are closed and S5 is open, influences of the control valves 36 (in either position) are decoupled from all of the main pistons MP (irregardless of the fluid 18 pressure in the common output gallery G3). In other words, either in the lock or unlock position, the control valve 36 would facilitate draining fluid 18 from the first portion 810 (or otherwise inhibit maintaining of fluid 18 in the first portion 810) during reciprocation R of the main pistons MP. In the fixed displacement state, it is recognized that the fluid 18 flow from the output port 24 of the hydraulic device 12a would be proportional to the speed (e.g. RPM) of the cam shaft 123 and as such independent of fluid 18 pressure. It is recognized that when the solenoid S4 is open, solenoid S5 must be closed in order to inhibit a short circuit in the fluid flow of the hydraulic device 12a (e.g. fluid flow being diverted from the common input gallery G1 and instead being directed to the reservoir 20 via the legs 1,14). This short circuit state can be viewed as a zero flow mode of the hydraulic device 12a.

In view of the above, the hydraulic device 12a has the advantage of being operated in a number of different modes/states, such as but not limited to: a) Load/pressure sensing; b) Variable displacement; c) High/increased displacement at low/reduced pressure at any RPM; d) High/increased pressure at low/reduced displacement at any RPM; e) Full displacement at high/increased pressure; f) coordinated Cylinder(s) MC deactivation; or g) Zero displacement (e.g. short circuit state).

In view of the above described operation, the need for additional output flow is controlled by head pressure sensing of the common output gallery G3. As the pressure inside common output gallery G3 rises, it is an indication that work is being done and pump (e.g. hydraulic device 12a) flow is being resisted (e.g. using a flow control valve such that pressure is a result of resistance to flow-work). The rising resistance will cause selected main piston(s) MP to be activated by releasing them from the lockdown state, as long as the fluid 18 pressure is of a magnitude able to overcome the bias strength of the biasing element 860 for one or more of the main pistons MP, recognizing that each of the main pistons MP can have biasing elements 860 of different set strengths. Accordingly, each of the main pistons MP have a dedicated lockdown control valve 36 and when this is held in the lock position by spring force of its biasing element 860, it means the related main piston MP is in the lockdown state (i.e. not reciprocating R) and therefore not producing/contributing to the flow of the fluid 18 out of the output port 24. If the pressure in common output gallery G3 is sufficient to overcome the bias of the biasing element 860, it will cause control valve 36 to shift against spring 860 which blocks off leg 2 and unblocks leg 6, which releases the main piston MP from the lockdown state and the outlet volume from the output port 24 would increase accordingly under the influence/contribution of the released main piston MP. Therefore, then unlocked, the main piston MP is now driven against the actuator cam 122 by charge or inlet pressure from inside bore B, hence the main piston MP is now reciprocating R and providing additional flow to the circuit. In contrast, if the pressure inside common outlet gallery G3 drops below any biasing element 860 setting, then the spring of the biasing element 860 will force the control valve 36 back into the lock position (as long as the solenoid S1 is closed as discussed above).

Figure 19:
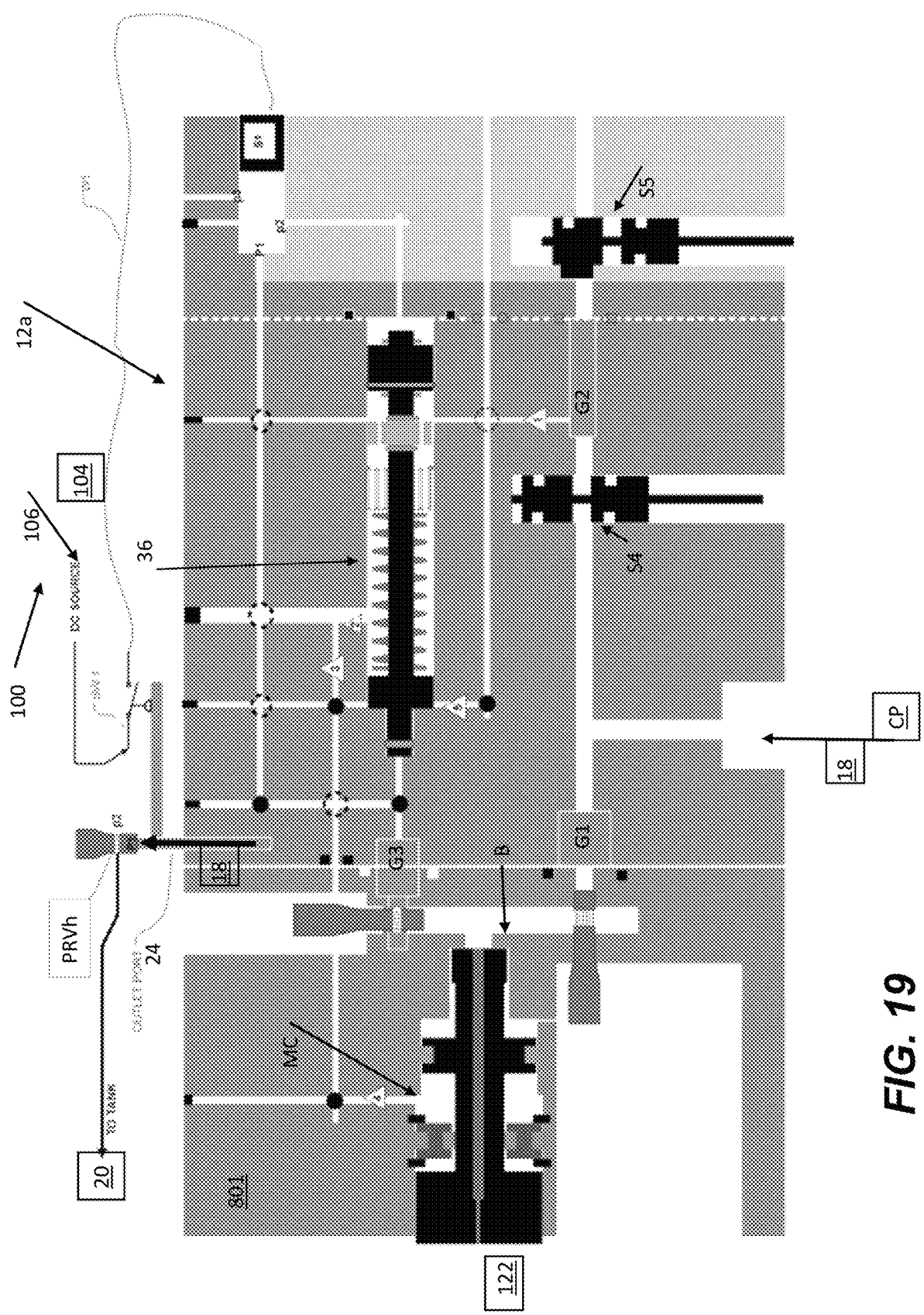
FIG. 19 is an alternative embodiment of the hydraulic device of FIG. 13.

Further, referring to FIG. 19, a further embodying of the hydraulic device 12a is shown with a reduction system 100 to provide a mechanism for automatically reducing the number of working main pistons MP as a maximum pressure setting of a pressure sensor (e.g. a switch SW-1 associated with a pressure transducer) is reached (e.g. the pressure of the fluid 18 of the output port 24 reaches the maximum pressure setting of the switch SW-1). The maximum pressure setting of the switch SW-1 is ideally set lower than a pressure setting of the high pressure relief valve PRVh.

For example, the reduction system 100 is intended to kick-in at say, at an example 5 k PSI as the maximum pressure setting, while the PRVh may be set for say, at an example 5200 PSI. Therefore the reduction system 100 inhibits the PRVh from being activated as the pressure rises (i.e. activation of the reduction system 100 occurs at a fluid 18 pressure lower than a fluid 18 pressure needed to activate the PRVh). Further, the PRVh is there in the fluid circuit of the hydraulic device 12a for safety considerations, thereby facilitating that excess pressures do not damage the hydraulic device 12a in the event that the reduction system 100 fails to decrease the working pressure of the hydraulic device 12*a* through cylinder MC deactivation, as further discussed below.

An advantage for using the reduction system 100 is that protecting the hydraulic device 12*a* (e.g. integrity of housing seals, etc.) by releasing excessive pressure of the fluid 18 (detected at the fluid outlet port 24 by the PRVh and simply returning to the reservoir 20) can be less efficient than automatically reducing outlet flow of the outlet port 24 from the output common gallery G3 by using the solenoid(s) S1 to reduce the number of working (i.e. reciprocating R) main pistons MP, upon reaching the maximum pressure threshold. In other words, the reduction system 100 operates to reduce flow from the output port 24 in order to reduce fluid 18 pressure at the outlet port 24, rather than only dumping excess fluid 18 flow to the reservoir 20 via the PRVh.

Referring to FIG. 19, the reduction system 100 can include the switch SW-1 (e.g. an electronic switch) for generating a signal 104 (e.g. electronic signal) generated when the fluid 18 pressure exposed to the pressure sensing portion of the switch SW-1 reaches the maximum set pressure threshold. A power source 106 can be used to generate the signal 104 upon operation of the switch SW-1. A signal line W1 can be used to conduct the signal 104 to the solenoid valve(s) S1, thereby causing opening port P1 to port P2 (while closing port P2 from communicating with port P3). In this manner, the fluid 18 communication is facilitated between the common output gallery G3 and the control cylinder 880 adjacent to the second end 830 (via legs 8,9,10,12)—see FIG. 13. This places the fluid 18 pressure acting on first end 870 as similar to the pressure acting on the second end 830. As such, the influence of the biasing element 860 would bias the control valve 36 towards the common output gallery G3 (e.g. combined with the force working on a larger surface area of end 830, this action means the hydraulic device 12*a* can work to reduce excess flow at the outlet port 24 in response to the reduction in working main piston(s) MP as controlled by the solenoid valve(s) S1 in conjunction with their flow control valve(s) 36) and thus force the main piston MP into a lockdown state, irrespective of any magnitude difference between the force exerted on the first end 870 by the pressure of the fluid 18 in the common output gallery G3 and the force exerted by the biasing element 860 opposite thereto.

As such, it is recognized that that a particular solenoid valve S1 can be connected via signal line W1 on a one-to-one basis with a corresponding flow control valve 36, effectively making operation of the solenoid valve S1 to result in locking up a working single main piston MP (i.e. switch the state of the main piston MP from the unlock state to the lockdown state). Also. It is recognized that multiple flow control valves 36 can be coupled (via multiple signal lines W1—not shown) to one solenoid valve S1, in order to induce multiple main pistons MP to their lockdown state simultaneously upon activation of the many-to-one configured solenoid valve S1 by operation of the switch SW-1.

Figure 20:
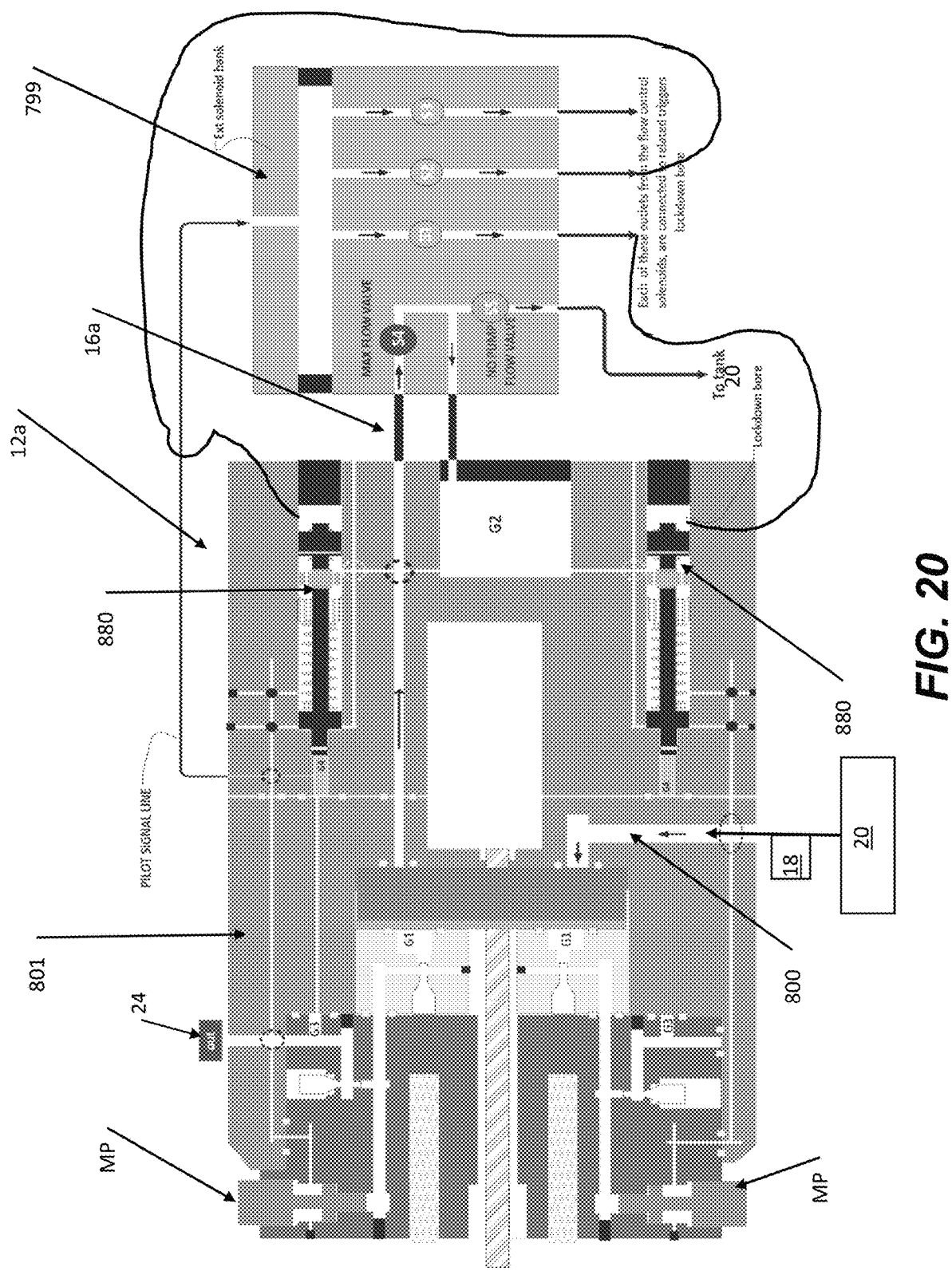
FIG. 20 is a further embodiment of the hydraulic device of FIG. 13.

Referring to FIG. 20, shown is a further embodiment of the hydraulic device 12*a*, showing by example at least a pair of main pistons MP. As such, this embodiment can have a header portion 799 coupled to the main housing 801, by fluid connections 16*a*. The fluid connections 16*a* are used to fluidly couple the solenoid valves S4, S5 respectively to the inlet port 800 and the common second inlet gallery G2. Further, the fluid connections 16*a* can be used to fluidly couple the solenoid valve(s) S1 to the flow control cylinder(s) 880. Further, the common output gallery G3 (coupled to the bores B and the outlet port 24) can be coupled to a further common gallery G4 by leg 15. The further common gallery G4 is therefore used to expose the end 870 of the flow control valve 36 to the fluid 18 pressure resident in the common output gallery G3.

As discussed above, the common galleries G1, G2, G3, G4 are shared between all the main pistons MP and the flow control valves 36, depending upon the state of the solenoid valves S1, S4, S5 and the blocking or unblocking of respective fluid legs (e.g. leg 2,3,4, etc.) as described above. For example, in a circular configuration of the main pistons MP in the housing 801, the common galleries G1, G2, G3, G4 could also be of circular design extending about the circumference of the housing 801, in order to be fluidly coupled simultaneously to the main pistons MP and flow control valves 36 as demonstrated above.

I claim:

1. A variable flow hydraulic device having a plurality of cylinders for varying a flow of hydraulic fluid between a fluid reservoir and a load, the device comprising:

a housing having the plurality of cylinders with a plurality of corresponding pistons configured for reciprocation of a constant stroke length;

a main shaft mounted in the housing, such that each of the plurality of corresponding pistons is coupled to and thus driven by rotation of the main shaft by a respective cam of a set of cams mounted on the main shaft, such that at least one piston of the plurality of corresponding pistons is decoupled from the respective cam when the at least one piston is placed into a locked state and the at least one piston is coupled to the respective cam when the at least one piston is placed in an unlocked state, such that when placed in the locked state reciprocation of the at least one piston is inhibited during the rotation and when placed in the unlocked state reciprocation of the at least one piston is facilitated during the rotation;

an input port of the housing fluidly connected to each cylinder of the plurality of cylinders, the input port facilitating introduction of the hydraulic fluid into said each cylinder;

an output port of the housing connected to said each cylinder, the output port facilitating the ejection of the hydraulic fluid from said each cylinder during the reciprocation, the output port configured for fluidly coupling said each cylinder to the load;

the fluid reservoir fluidly connected to the input port by an input fluid pathway and for fluidly connecting to the load by an output fluid pathway, the fluid reservoir containing the hydraulic fluid;

a charge pump associated with the fluid reservoir such that the charge pump supplies the hydraulic fluid from the fluid reservoir via the input fluid pathway to the input port, such that the charge pump is mechanically coupled to the main shaft and supplies the hydraulic fluid to the input port during both the locked state and the unlocked state of the at least one piston;

wherein the charge pump supplies at least a portion of the hydraulic fluid to the input port in order to facilitate the reciprocation of one or more of the plurality of corresponding pistons.

2. The device of claim 1, wherein the input port is connected to a first common input gallery of the housing, the first common input gallery fluidly coupled to said each cylinder of the plurality of cylinders.

3. The device of claim 1, wherein the output port is connected to a common output gallery of the housing, the common output gallery fluidly coupled to said each cylinder of the plurality of cylinders.

4. The device of claim 1 further comprising a flow control device coupled to the at least one piston of the plurality of corresponding pistons, such that activation of the flow control device inhibits the at least one piston from the reciprocation during operation of the charge pump and places the at least one piston in the locked state, such that the at least one piston becomes decoupled from the main shaft coupled to the plurality of corresponding pistons.

5. The device of claim 4 further comprising a further flow control device coupled to a further respective piston of the plurality of corresponding pistons, such that activation of the further flow control device inhibits the further respective piston from further respective reciprocation during operation of the charge pump.

6. The device of claim 1, wherein the charge pump is selected from the group consisting of a gear pump and a gerotor.

7. The device of claim 1 wherein the supply of the hydraulic fluid to the input port is a combination of fluid supplied by the charge pump obtained from the fluid reservoir and additional fluid from the output port using a fluid pathway which bypasses the fluid reservoir.

8. The device of claim 7 further comprising a pressure relief valve fluidly coupled to the input port, such that when the hydraulic fluid having a pressure greater than a set pressure the hydraulic fluid is released to the fluid reservoir.

9. The device of claim 7, wherein a volume of the fluid supplied by the charge pump is moderated based on the fluid being supplemented by the additional fluid via the fluid pathway which bypasses the fluid reservoir.

10. The device of claim 9 further comprising a further charge pump fluidly coupled between the fluid reservoir and the input port.

11. The device of claim 1, wherein the charge pump supplies the hydraulic fluid as a startup volume to the input port in order to facilitate initial reciprocation of at least one of the corresponding plurality of pistons.

12. The device of claim 1, wherein said at least one of the corresponding plurality of pistons is fitted with a respective return spring having a bias less that of any other return springs associated with other pistons of the corresponding plurality of pistons.

13. The device of claim 4, wherein the respective piston is inhibited from assisting the charge pump in driving the hydraulic fluid between input port and output port.

14. The device of claim 1, wherein when at least one piston of the plurality of corresponding pistons is in the unlocked state, the at least one piston assists the charge pump in driving the hydraulic fluid between input port and output port.

15. The device of claim 1, wherein a respective piston of the plurality of corresponding pistons is configured for respective reciprocation on a full time basis as supplied by the charge pump, such that the respective piston is unconnected to a flow control device, the flow control device for inhibiting reciprocation of the respective piston when the flow control device is activated.

16. The device of claim 4 further comprising a pressure relief valve fluidly coupled to the input gallery, the pressure relief valve configured to release excess fluid pressure of the input port when a plurality of respective pistons are in the locked state and thus are decoupled from the main shaft of the device, the plurality of respective pistons are of the plurality of the corresponding pistons.

* * * * *